US008711436B2

(12) United States Patent
Kobayashi et al.

(10) Patent No.: US 8,711,436 B2
(45) Date of Patent: Apr. 29, 2014

(54) TINT BLOCK IMAGE GENERATION PROGRAM AND TINT BLOCK IMAGE GENERATION DEVICE

(75) Inventors: Makoto Kobayashi, Shiojiri (JP); Nobuhiro Karito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1284 days.

(21) Appl. No.: 12/231,776

(22) Filed: Sep. 4, 2008

(65) Prior Publication Data

US 2009/0067006 A1    Mar. 12, 2009

(30) Foreign Application Priority Data

Sep. 6, 2007  (JP) ................................. 2007-231403
Jul. 11, 2008  (JP) ................................. 2008-181688

(51) Int. Cl.
*H04N 1/405* (2006.01)
*H04N 1/40* (2006.01)

(52) U.S. Cl.
USPC ....... 358/3.26; 358/3.28; 358/3.23; 358/3.14; 358/3.13; 358/1.2; 382/237; 399/366

(58) Field of Classification Search
USPC ............. 358/3.06, 3.28, 3.23, 3.14, 3.13, 1.2, 358/3.17, 3.18; 382/237; 399/366
See application file for complete search history.

(56) References Cited

U.S. PATENT DOCUMENTS

| 7,168,868 | B2 * | 1/2007 | Uchida et al. ................... 400/62 |
| 8,049,933 | B2 * | 11/2011 | Murakami ................... 358/3.23 |
| 2006/0256355 | A1 * | 11/2006 | Karito ........................... 358/1.9 |
| 2007/0046767 | A1 * | 3/2007 | Toyama et al. ............... 347/233 |

FOREIGN PATENT DOCUMENTS

| JP | 04-170569 | 6/1992 |
| JP | 2005-151456 | 6/2005 |
| JP | 2007-194904 | 8/2007 |

* cited by examiner

*Primary Examiner* — Quang N Vo
(74) *Attorney, Agent, or Firm* — DLA Piper LLP (US)

(57) ABSTRACT

A image generation device generates, on a print medium, an image including a first image portion and a second image portion. The device has a first screen processing unit which generates image data by an area modulation screen having a first screen ruling, for pixels of the first image portion; and a second screen processing unit which generates image data by an area modulation screen or a density modulation screen having a second screen ruling which is higher than the first screen ruling for pixels of the second image portion. And the first screen processing unit generates a halftone dot at a center of gravity position of an image of the first image portion in a cell corresponding to a halftone dot formation area in the area modulation screen processing.

13 Claims, 42 Drawing Sheets

FIG.10B

Latent Image Portion Basic Dither Matrix (53lpi)

FIG.10A

Background Portion Basic Dither Matrix (212lpi)

Latent Image Portion
Grayscale Value = 13

Latent Image Portion
Grayscale Value = 12

Latent Image Mask Pattern

FIG.18
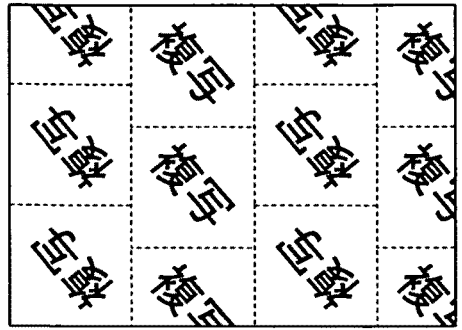
(a) Squared Arrangement
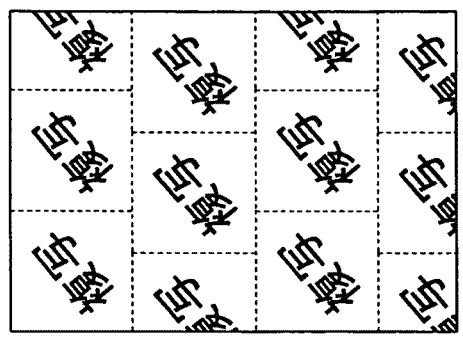
(b) Oblique Arrangement
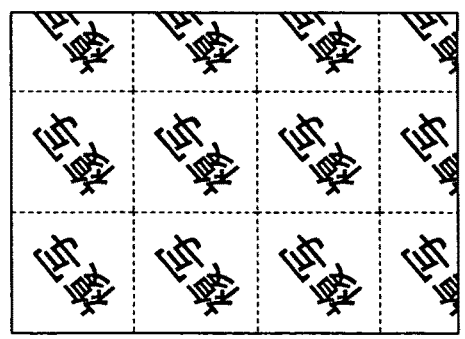
(c) Inverted Arrangement

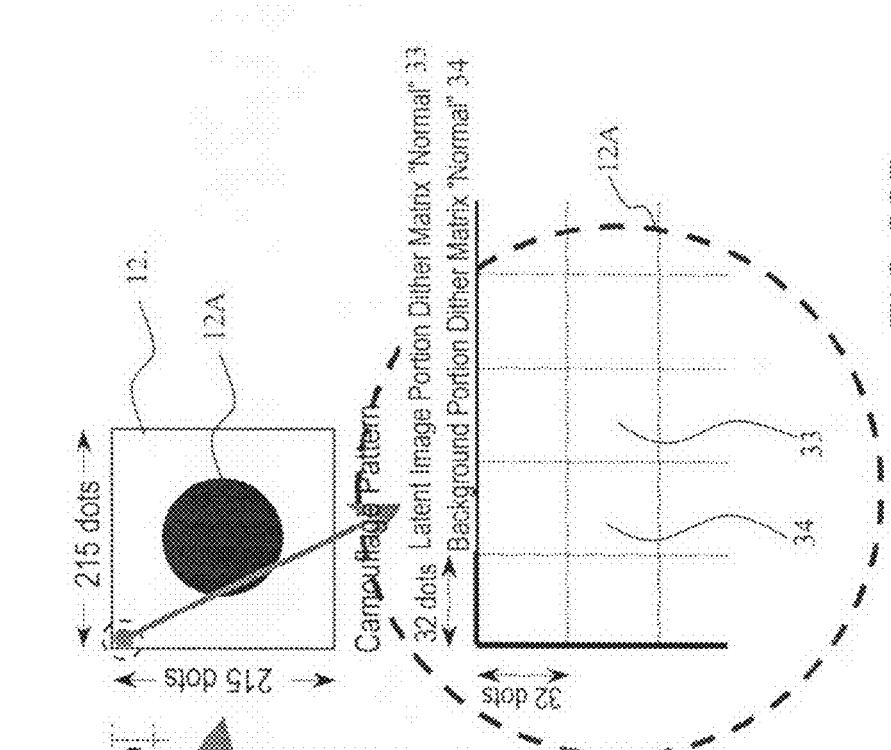
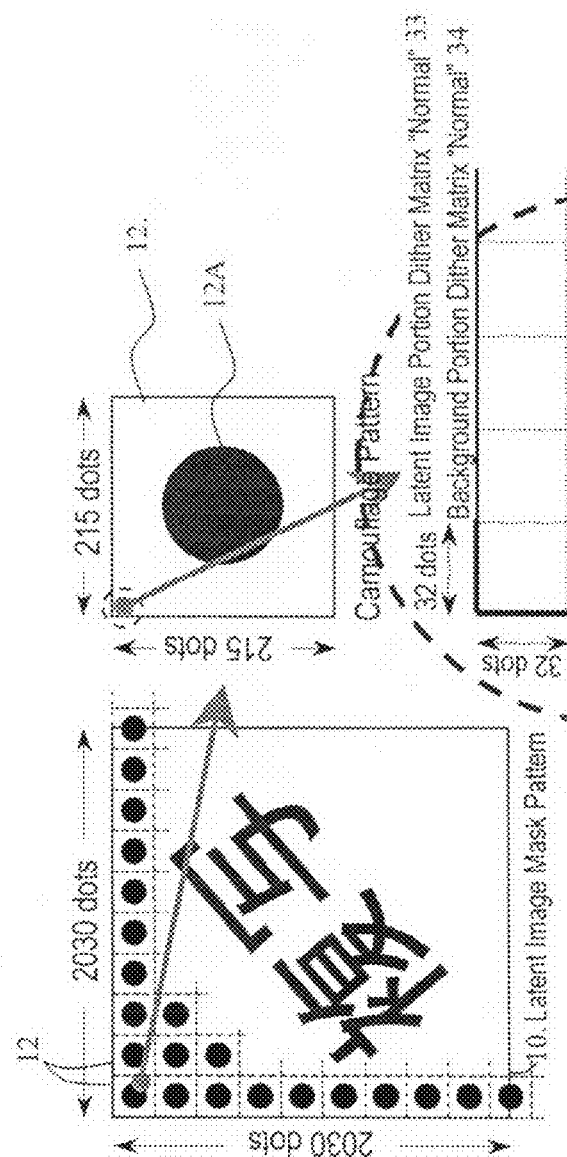
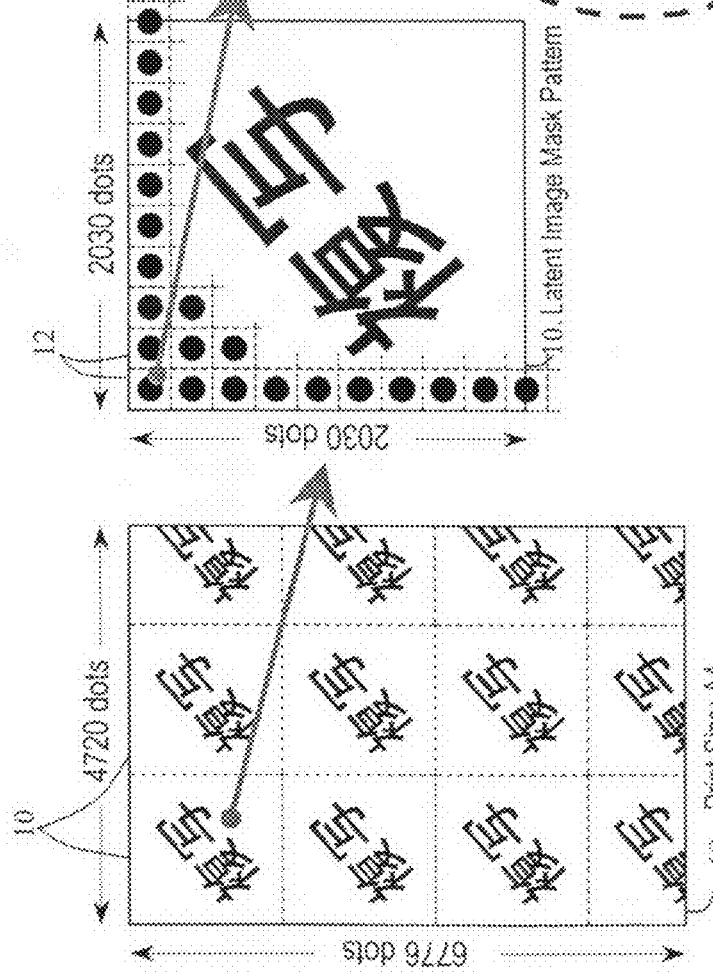

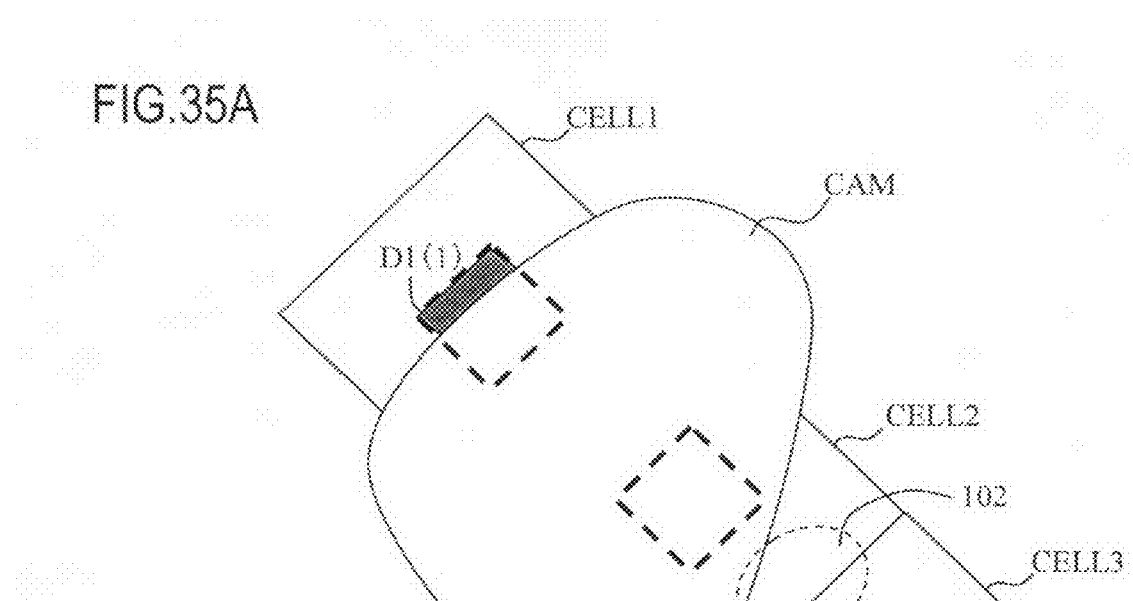
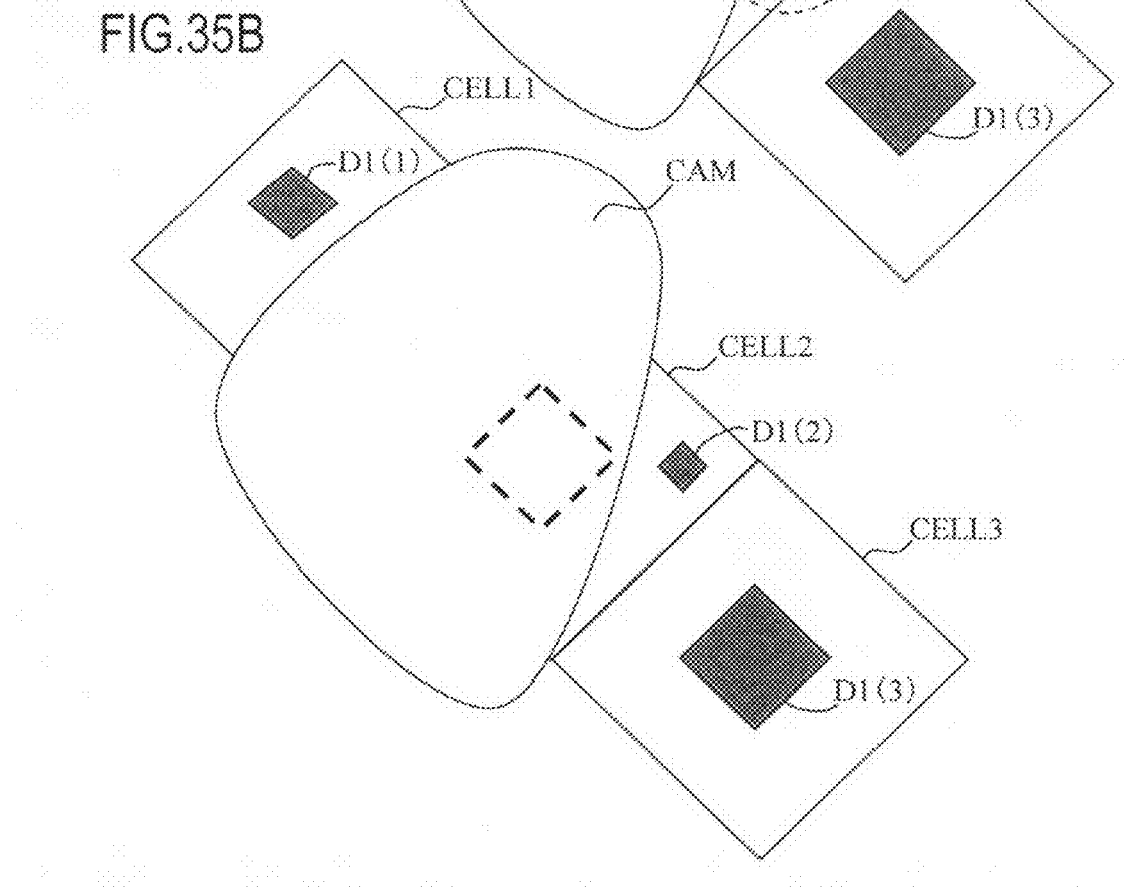

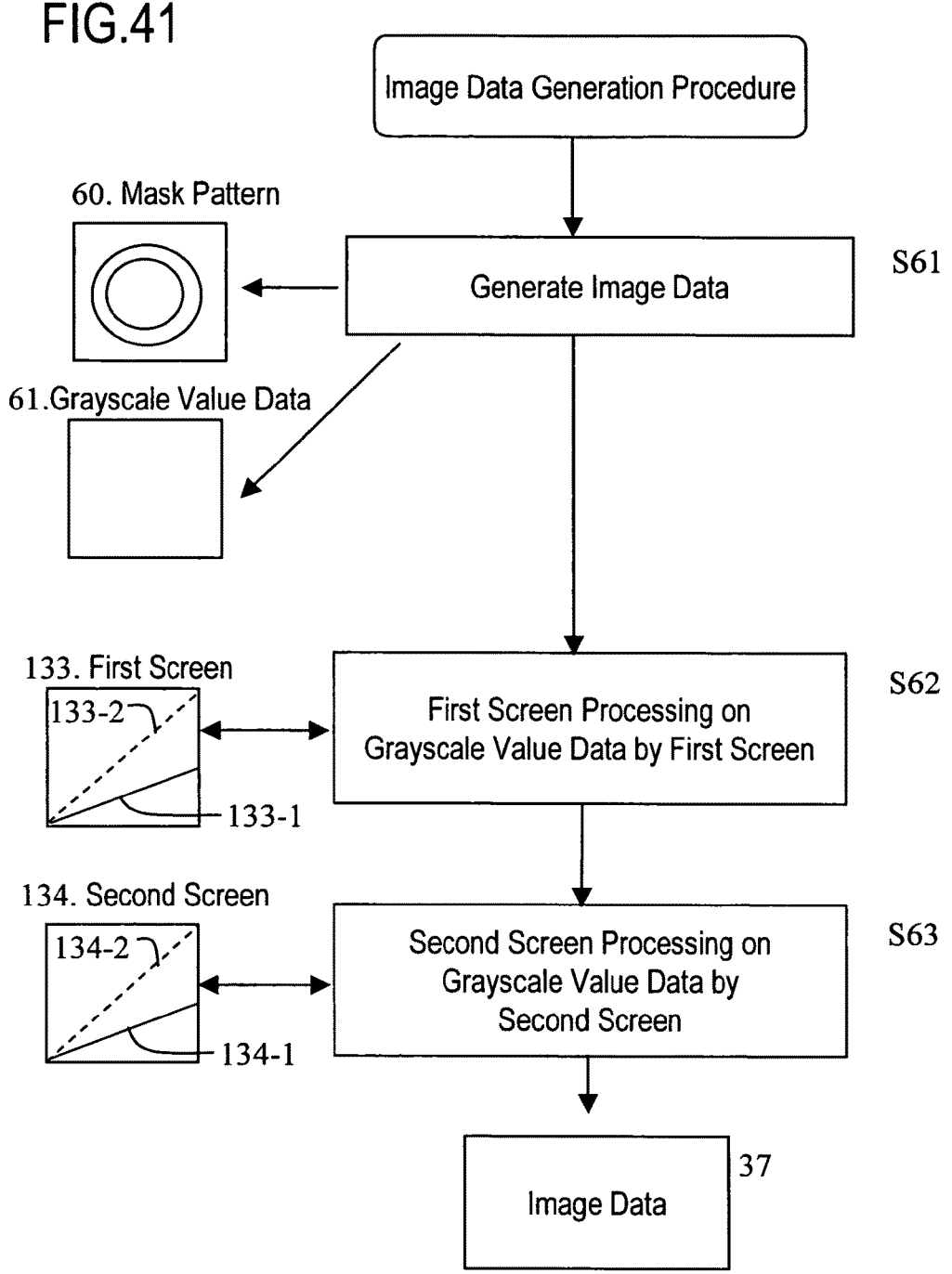

TINT BLOCK IMAGE GENERATION PROGRAM AND TINT BLOCK IMAGE GENERATION DEVICE

CROSS-REFERENCE TO RELATED APPLICATIONS

This application is based upon and claims the benefit of priority from the prior Japanese Patent Applications No. 2007-231403, filed on Sep. 6, 2007, and No. 2008-181688, filed on Jul. 11, 2008, the entire contents of which are incorporated herein by reference.

BACKGROUND OF THE INVENTION

1. Field of the Invention

The present invention relates to a tint block image generation program and a tint block image generation device, and more particularly to a program and device for generating tint block image data to be printed on a print medium. The present invention also relates to a tint block image generation program and generation device which has an effect to inhibit forgery by copying a print medium (original) on which a tint block image is printed based on the tint block data or an effect to distinguish between the original and the copy.

2. Description of the Related Art

The tint block is combined with the original image as background, and allows distinguishing whether the print document is the original or the copy. Characters or images in the forgery inhibited tint block can hardly be identified in the original but if copied, the characters or images in the tint block emerge. Using this, the original and the copy can easily be distinguished. Also the characters or images in the tint block emerge in copying, so if an original is generated combining with the forgery inhibited tint block, an attempt to copy the original is psychologically discouraged.

The tint block is disclosed in Japanese Patent Application Laid-Open No. 2005-151456, and details follow according to this description.

Generally a tint block is comprised of two areas: a "latent image portion" where dots printed in the original remain or decrease little by copying, and a "background portion" where dots printed in the original are lost or greatly decreased by copying. In other words, in the latent image portion, density changes little by copying, and the original image is reproduced as is, and in the background portion, density changes considerably by copying, and the original image disappears. The characters or images of the tint block are generated by these two areas, and the characters and images of the tint block are called the "latent image".

The densities of the latent image portion and the background portion are roughly the same, and in the original state, it is visually difficult to find such characters or images as "COPIED" of Japanese character are concealed in the tint block, but at the micro level, the background portion and latent image portion have different characteristics. When the tint block is copied, a density difference is generated between the latent image portion and the background portion, because of the difference of the respective change of density, which makes it easier to discern the characters or images of the tint block created by these two areas.

The latent image portion is comprised of clustered dots so that dots can be easily read when copying (scanning by copying), whereas the background portion is comprised of dispersed dots so that dots cannot be easily read when copying. By this, dots tend to remain in the latent image after copying, and dots tend to disappear in the background portion more easily than the latent image portion. Clustered dots or dispersed dots can be implemented by half tone processing using a different number of lines of half tone dots. In other words, half tone dots of which screen ruling is low are used to obtain a clustered dot arrangement, and half tone dots of which screen ruling is high are used to obtain a dispersed lot arrangement.

Generally a copier has a limitation in image reproducing capability, which depends on the input resolution in a step of reading the micro dots of a copy target original by a scanner, and the output resolution in a step of reproducing micro dots, read by the scanner, using a print engine. Therefore if isolated micro dots exist in the original, exceeding the limitation of the image reproducing capability of the copier, the micro dots cannot be perfectly reproduced in a copy, and the portions of the isolated micro dots disappear. In other words, if the background portion of the tint block is created so as to exceed the limitation of the dots that the copier can reproduce, then large dots (clustered dots) in the forgery inhibited tint block can be reproduced by copying, but small dots (dispersed dots) cannot be reproduced by copying, and a concealed latent image appears in the copy. Even if the dispersed dots in the background portion do not disappear completely by copying, a density difference is generated between the background portion and the latent image portion after copying if the degree of loss of dots is high, compared with the clustered dots in the latent image portion, then a concealed latent image appears in the copy.

In the tint block, a technology called "camouflage" is used to make it more difficult to discern characters or images concealed as a latent image. This camouflage technology is a method for arranging patterns, of which density is different from the latent image portion and the background portion, in the entire tint block image, and in a macro view, the camouflage patterns, of which density is different from the latent image portion and the background portion, standout, making the latent image even more obscure. In other words, the contrast of the camouflage patterns is high, and the contrast of the latent image portion and the background portion is smaller than this, so the latent image is more effectively concealed because of optical illusion. Also the camouflage pattern can give a decorative impression on printed matter, and allows creating an artistically designed tint block. Generally a camouflage pattern is created in binary, and the camouflage pattern is formed by not generating dots of the tint block in an area corresponding to the camouflage pattern. The camouflage pattern with two grayscales is disclosed in Japanese Patent Application Laid-Open No. H04-170569. The above is an overview of the tint block.

FIG. 1 shows an example of a latent image of a tint block and a camouflage pattern. In a latent image mask pattern 10 of the Japanese character "COPY", the black portion corresponds to the latent image portion LI of the tint block, and the white portion corresponds to the background portion BI of the tint block, for example, as the enlarged view 10× shows. In the camouflage pattern 12, on the other hand, the black portion CAM becomes an area where the dots of the tint block are not formed, and the white portion becomes an area where dots of the tint block are formed, for example, as the enlarged view 12× shows. In other words, the data of the camouflage pattern is binary image data where each pixel indicates a portion to print the tint block image and a portion not to be printed.

FIG. 2 is a diagram depicting an example of an original in which a tint block is printed. In the tint block 14, a latent image portion LI and a background portion 5. BI are formed based on the latent image mask pattern 10 in FIG. 1. The latent image portion LI is formed by dots with low screen ruling (53 lpi) based on a clustered dot dither method, and the background portion BI is formed of dots with high screen ruling (212 lpi) based on the dispersed dot dither method. As the enlarged tint block 14X shows, the entire tint block has a predetermined output density, but the dots in the latent image portion LI are large dots formed by a screen with low screen ruling, and the dots in the background portion BI are small dots formed by a screen with high screen ruling.

In the tint block 16, the latent image portion LI and the background portion BI are formed, excluding a black area CAM of the camouflage pattern, based on the latent image mask pattern 10 and the camouflage pattern 12 in FIG. 1. As the enlarged tint block 16× shows, the entire tint block has a predetermined output density, where dots are not formed in the area CAM of the camouflage pattern, and in another area, the latent image portion LI formed by large dots and the background portion BI formed by micro dots are formed just like FIG. 1. Since the contrast of the camouflage pattern is high, the latent image (the Japanese character "COPY"), comprised of the latent image portion LI and the background portion BI, of which contrast is low, does not stand out.

In the original of the forgery inhibited tint block in FIG. 2, the output density of the latent image portion LI and the background portion BI are the same, whereby the latent image of the Japanese character "COPY" formed by these portions is concealed. This is referred to as the "concealment capability for a latent image in the original is high".

FIG. 3 is a diagram depicting an example of a copy of the forgery inhibited tint block. The copy 18 is created via a scanning step and dot generation step (step of printing the print media based on the scan data generated in the scanning step) by copying, and as the enlarged view 18× shows, large dots in the latent image portion LI are hardly lost, but many micro dots in the background portion BI are lost. As a result, in the copy 18, the output density of the latent image LI hardly drop, but the output density of the background portion BI drop considerably, and the latent image of the Japanese character "COPY" emerges. In other words, the latent image of the copy is more easily identified.

The copy 20 is the same as the copy 18, except for the area CAM of the camouflage pattern. The contrast of the camouflage pattern drops because of the drop in the output density of the background portion BI, and the latent image COPY emerges.

FIG. 4 are diagrams further enlarging the enlarged view of the original in FIG. 2 and the enlarged view in the copy in FIG. 3. In the original shown in (a), the latent image portion LI is formed by dots (halftones), with low screen ruling and a large area, and the background portion BI is formed by micro dots with high screen ruling. No dots are formed in a black portion CAM of the camouflage pattern. In the copy (b), on the other hand, the size of the large dots (halftones) in the latent image portion LI do not change much, but a considerable number of micro dots in the background portion BI are lost. As a result, in the copy, the output density of the latent image portion LI hardly drops, while the output density of the background portion BI drops considerably where the latent image "COPY" of the tint block emerges clearly.

SUMMARY OF THE INVENTION

As mentioned above, implementing both high concealment capability for the latent image in the original and the high identification capability for a latent image in the copy is demanded for tint blocks. In an example in FIG. 2, data is binarized with a dither matrix of which screen ruling is high in the background portion BI, and with a dither matrix of which screen ruling is low in the latent image portion LI respectively, according to the latent image mask 10.

However, a first problem is that an area 21 where dots in the background portion BI and dots in the latent image portion LI are combined, and high density is enhanced, and an area 22 where the space between dots in the background portion BI and dots in the latent image portion LI are widened, and where low density (white) is enhanced, are generated in a boundary between the background portion and the latent image portion of the original 14X, as shown in FIG. 2 and FIG. 4. Because of these areas 21 and 22, the latent image stands out, which diminishes the concealment capability for the latent image in the original.

The above mentioned Japanese Patent Application Laid-Open No. 2005-151456 proposes that boundary processing is performed so that the dots generated in the background portion are not combined with the latent image portion in the boundary area of the latent image mask pattern.

FIG. 5 shows an original and a copy of a tint block when the boundary processing according to Patent Document 1 is performed. FIG. 6 are enlarged views thereof. In FIG. 5 and FIG. 6, the combining of dots is prevented in area 23 in the original 14 and enlarged views 14X thereof, but a white area where dots are separated is still formed in area 24. In other words, area 24, where white is enhanced, is a problem that remains unsolved.

A second problem is that when the camouflage pattern of which resolution is low, as shown in FIG. 1 and FIG. 2, is used, the area of the pattern where the dots of a tint block are OFF is wide and contrast is high. This increases the concealment capability for the latent image, but the camouflage pattern has excessively high contrast so as to stand out more than the original print image. One method to solve this problem is to use a camouflage pattern of which resolution is relatively high.

FIG. 7 shows a camouflage pattern of which resolution is high and a tint block that uses this pattern. The camouflage pattern 25 has higher resolution than the camouflage pattern 12 in FIG. 1. In the original 26 of the tint block that uses the camouflage pattern 25, the black portion of the camouflage pattern is a portion where the dots of the tint block are not formed (dots OFF). FIG. 7 also shows the enlarged views 25× and 26× thereof. If the camouflage pattern 25 with high resolution is used, the pattern does not stand out very much, so identification capability for the original print image does not drop.

However, in the case of this second problem, dots are formed at high screen ruling in the background portion BI, so the dots OFF area is generated corresponding to the camouflage pattern with high resolution, and the pattern is reproduced at relatively high accuracy in the background portion BI, whereas in the latent image portion LI, dots are formed at low screen ruling, so the dots OFF area generated corresponding to the camouflage pattern becomes rough, and appearance of the pattern becomes different from the background portion. For example, the dots OFF area is generated relatively large in area 27 in FIG. 7. If the appearance of the camouflage pattern is different between the background portion and the latent image portion, the latent image stands out, and concealment capability for the latent image of the original is diminished.

As mentioned above, the first problem is that the high density enhanced area and the low density enhanced area are generated due to the combining or the separation of dots at the boundary area between the latent image portion and the background portion, since the latent image portion and the background portion are formed by screen processing using dither matrices having different screen rulings. This problem is limited not only to a tint block, but is also generated in a boundary portion of a plurality of areas which are formed by screen processing using dither matrices having different screen rulings. A similar problem also occurs in the boundary portion of an image area generated by a first processing using an area modulation (AM) screen with low screen ruling, and a second processing using an area modulation (AM) screen with high screen ruling, or a density modulation (FM) screen based on an error diffusion method or a dispersed dither matrix.

The second problem is that when the high resolution camouflage pattern is superimposed on a tint block comprised of a latent image portion and a background portion, the appearance of the camouflage pattern is different between the latent image portion and the background portion due to the difference in screen rulings, which diminishes the concealment capability for the latent image.

With the foregoing in view, it is an object of the present invention to provide a program and a device for generating a tint block whereby a high density enhanced area or a low density enhanced area is not generated in a boundary between a latent image portion and a background portion.

It is another object of the present invention to provide a program and a device for generating an image whereby a high density enhanced area or a low density enhanced area is not generated in a boundary between a first and second image areas.

It is still another object of the present invention to provide a program and a device for generating a tint block whereby the appearance of the camouflage patterns are equalized between a latent image portion and a background portion.

A first aspect of the invention is a computer-readable medium which stores a tint block image generation program for causing a computer to execute a tint block image generation step of generating tint block image data which forms, on a print medium, a tint block image including a latent image portion and a background portion, having different output densities to be reproduced by copying, wherein the tint block image generation step comprises:

a first screen processing step of generating latent image portion image data by an area modulation screen having a first screen ruling, for pixels of the latent image portion; and a second screen processing step of generating background portion image data by an area modulation screen or a density modulation screen having a second screen ruling which is higher than the first screen ruling, for pixels of the background portion, and wherein in the first screen processing step, the latent image portion image data is generated to form a halftone dot with a position shifted from the center of a cell corresponding to a halftone dot formation area in the area modulation screen, as the center.

In the first aspect, it is preferable that the position shifted from the center of the cell is a center of gravity position in an image of the latent image portion in a cell corresponding to a halftone dot formation area in the area modulation screen.

In the first aspect, it is preferable that the halftone dot formed in the first screen processing step has a size corresponding to grayscale values of the latent image portion in the cell as the upper limit.

In the first aspect, it is preferable that the first screen processing step further comprises:

a center of gravity position generation step of determining a center of gravity position of the image in the latent image portion in the cell;

an average input grayscale value generation step of determining an average input grayscale value by dividing the total of grayscale values of the image in the latent portion in the cell by a number of pixels in the cell;

an ideal output dot count generation step of determining, as an ideal output dot count, a number of dots generated when an image in which all the pixels have the average input grayscale value is screen-processed using the area modulation screen; and a halftone dot generation step of generating a halftone dot having a size of which upper limit is the ideal output dot count at the center of gravity position.

In the first aspect, it is preferable that the area modulation screen having the first screen ruling is a dot clustered dither matrix, and the latent image portion image data is image data for forming a halftone dot having a size corresponding to the input grayscale values of the latent image portion, and the area modulation screen having the second screen ruling is a dot dispersed dither matrix, and the background portion image data is image data for forming a halftone dot which has a density corresponding to the input grayscale values of the background portion and is smaller than the halftone dot of the latent image portion image data.

In the first aspect, it is preferable that the tint block image is combined with a camouflage pattern in the latent image portion and background portion of the tint block image, the tint block image generation program further comprises a step of generating a corrected camouflage pattern grayscale value by correcting the grayscale value of the camouflage pattern according to the input grayscale values of the latent image portion and background portion, in the first screen processing step, the latent image portion image data is generated referring to the dither matrix of the area modulation screen having the first screen ruling, for the corrected camouflage pattern grayscale value, and in the second screen processing step, the background portion image data is generated referring to the dither matrix of the area modulation screen having the second screen ruling, for the corrected camouflage pattern grayscale value.

A second aspect of the invention is a computer-readable medium which stores a image generation program for causing a computer to execute an image generation step of generating image data for forming, on a print medium, an image including a first image portion and a second image portion, wherein the image generation step comprises:

a first screen processing step of generating image data by an area modulation screen having a first screen ruling, for pixels of the first image portion; and a second screen processing step of generating image data by an area modulation screen or a density modulation screen having a second screen ruling which is higher than the first screen ruling, for pixels of the second image portion, and in the first screen processing step, a halftone dot is generated at a center of gravity position of an image of the first image portion in a cell corresponding to a halftone dot formation area in the area modulation screen processing.

A third aspect of the invention is a image generating device of the above first or second aspect.

BRIEF DESCRIPTION OF THE DRAWINGS

FIG. 10 shows an example of a background portion screen and a latent image portion screen;

FIG. 18 shows examples of a tint block arrangement;

FIG. 23 describes the tint block image generation processing in FIG. 18;

is FIG. 35 shows a functional effect of the present embodiment on an example of a tint block image with a camouflage pattern;

FIG. 41 is a flow chart depicting an image data generation procedure according to the second embodiment.

DESCRIPTION OF THE PREFERRED EMBODIMENTS

Embodiments of the present invention will now be described with reference to the drawings. The technical scope of the present invention, however, shall not be limited to these embodiments, but extend to matters stated in the Claims and equivalents thereof.

Figure 8:
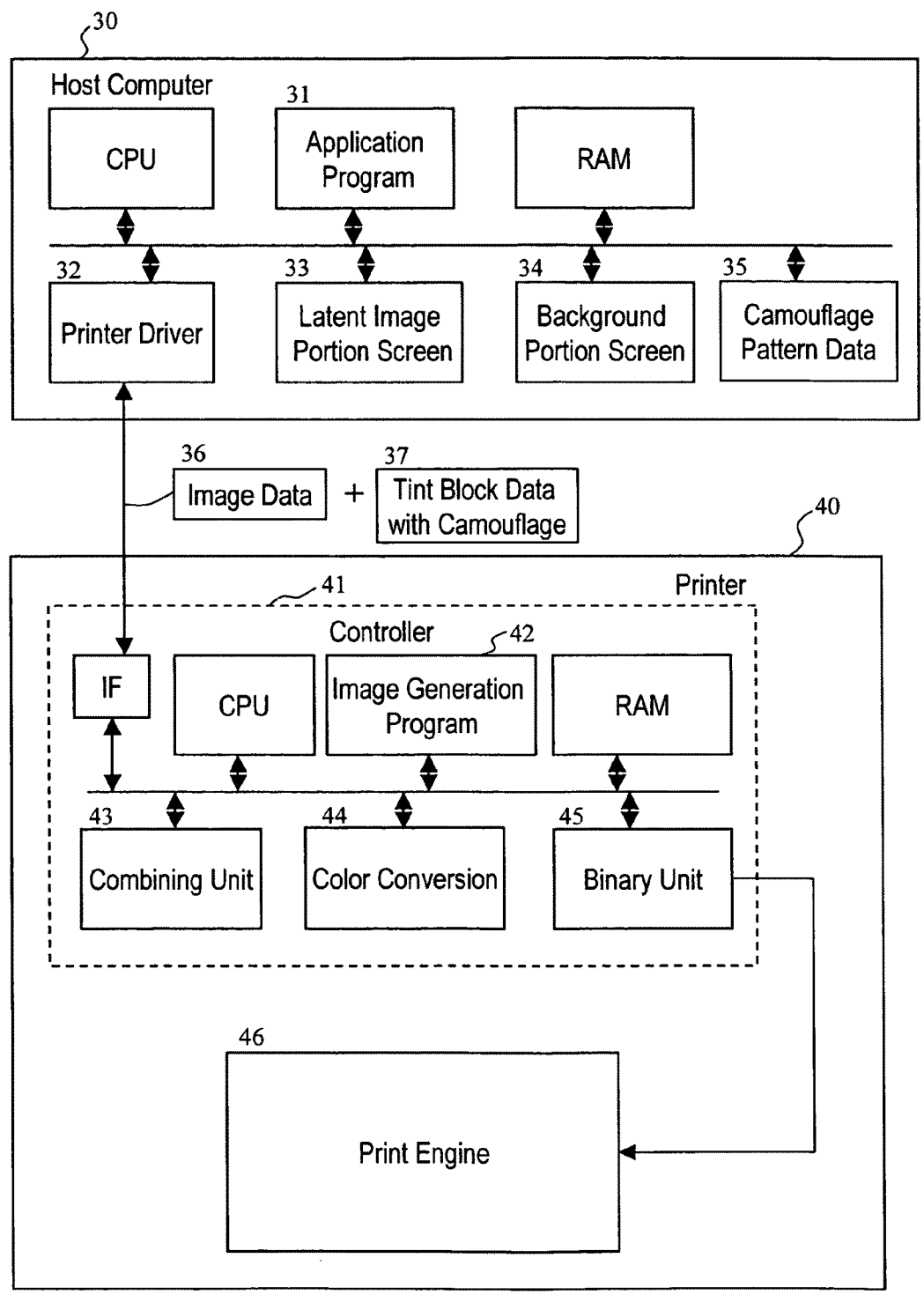
FIG. 8 is a diagram depicting a configuration of a tint block image generation device according to the present embodiment.

FIG. 8 is a diagram depicting a configuration of a tint block image generation device according to the present embodiment. The tint block image generation device comprises a printer driver program 32, a latent image portion dither matrix 33, a background portion dither matrix 34, a camouflage pattern data 35 which are installed in a host computer 30, and a printer 40. The latent image portion dither matrix 33 and the background dither matrix 34 are included in a printer driver program 32, which the printer manufacturer distributes to users via a recording media or via such a network as the Internet, and are stored in a recording media in the host computer when the printer driver program 32 is installed in the host computer. The host computer 30 further comprises a CPU, a RAM and an application program 31, and generates image data comprised of text, images and graphics, by executing the application program 31.

The host computer 30 also generates tint block data with camouflage pattern 37 using the printer driver 32 in response to a request from user. When a print request is received from the user for the image data generated by the application 31, the printer driver generates a print job of the printing target image data 36 based on a printer control language which the printer device 40 can interpret. If the print request from the user includes a request to add the tint block data to the printing target image data 36, then the printer driver 32 generates the tint block data, includes the tint block data 37 in the print job, and sends this data to the interface IF of the printer 40.

The image data 36 could take various forms, such as data described by a page description language, data developed into the intermediate code of a printer, and RGB bit map data developed into pixels. The tint block data with camouflage pattern 37 is an image data generated by screen-processing the grayscale data of a binary (0 or 255) camouflage pattern corrected (or modulated) by input grayscales of the tint block using the dither matrices 33 and 34. The tint block data with camouflage pattern 37 may be represented by a binary value, 0 or 1, for each pixel, or if the print target image data is represented by an 8-bit grayscale value for each R, G and B color, then the data may be represented by 8 bits, regarding a value corresponding to the maximum grayscale value as 255 and a value corresponding to the minimum grayscale value as 0 for each pixel.

The printer 40, on the other hand, comprises a print engine 46, which comprises a print medium providing unit, a print execution unit for generating an image on a print medium, and a print medium discharge unit, and a controller 41 for performing a predetermined image processing on a received image data 36 and tint block data 37, and controlling the print engine 42. A CPU of the controller 41 executes an image generation program 42 and generates bit map data by developing the received image data 36 into pixels. If the received image data 36 is already in bit map data format, this bit map data can be directly used.

A combining unit 43 combines bit map data which has a grayscale value for each pixel of the image data 36, and dot data of the tint block data 37. The combining process is a superimposing an image of tint block data 37 with an image of the image data 35 for example. A color conversion unit 44 converts the color of combined RGB data into CMYK data, a binary unit 45 converts the CMYK bit map data into a data of dots in a pixel using a predetermined screen, and outputs the result to the print engine 46. As a result, the print engine 46 prints a combined image of the image generated by the application program and the tint block image on the print media. This is the original.

According to another combining method, before combining the bit map data of the image data 36 and the tint block image data, the color of RGB bit map data of the image data 36 is converted into CMYK bit map data, and the tint block data 37 is combined with a bit map data having any one color of CMYK. In this case, the dot ON/OFF information for each pixel of the tint block data 37 is used as the maximum grayscale value/minimum grayscale value of the bit map data, and this bit map data of any one color of CMYK of the image data 36 is overwritten by this tint block 37. For example, if the image data 36 is text data of black K, the bit map data of any one color of CMY is converted into tint block data 37. Or the pixels of which grayscale value is the minimum density of the bit map data of any one color of the image data 36 is overwritten by the tint block data 37.

In the embodiment in FIG. 8, the printer driver 32 of the host computer 30 corresponds to the tint block image generation program, and generates the tint block data 37. As a variant form, the tint block data and camouflage pattern data may be generated in the printer, so that the tint block image is generated based on this data. In this case, the printer driver 32 generates a print job data, including the specifications of combining the tint block image with the print target image data 36, and printing the combined image, and the controller 41 of the printer 40 executes the tint block image generation program, and generates the tint block data with a camouflage pattern from the print job data instructing a generation of tint block with camouflage pattern, using the latent image portion dither matrix and the background portion dither matrix stored in the printer 40. The print job data for tint block generation is data including information required to generate the tint block data with a camouflage pattern, such as the specifications of characters and patterns which are lost or reproduced by copying, the specifications of the density of the tint block, and the specifications of a camouflage pattern. The tint block generation processing in the printer 40 may be performed by the CPU of the printer executing an image generation program, or by being executed in such a dedicated image processing generation device that is ASIC-based.

[Overview of Tint Block Generation Procedure]

The tint block generation method by the tint block image generation device according to the present embodiment will now be described in brief. The tint block image generation device is a host computer in the case of the tint block image being generated by the printer driver 32, or a printer 40 in the case of the tint block image being generated by the image generation program 42. In the present embodiment, the tint block image generation device generates tint block image data comprised of a latent image portion and a background portion, corresponding to a latent image mask pattern which the user selected from default patterns, or a latent image mask pattern which the user originally generated. A camouflage pattern may be combined with the tint block image data.

Figure 1:
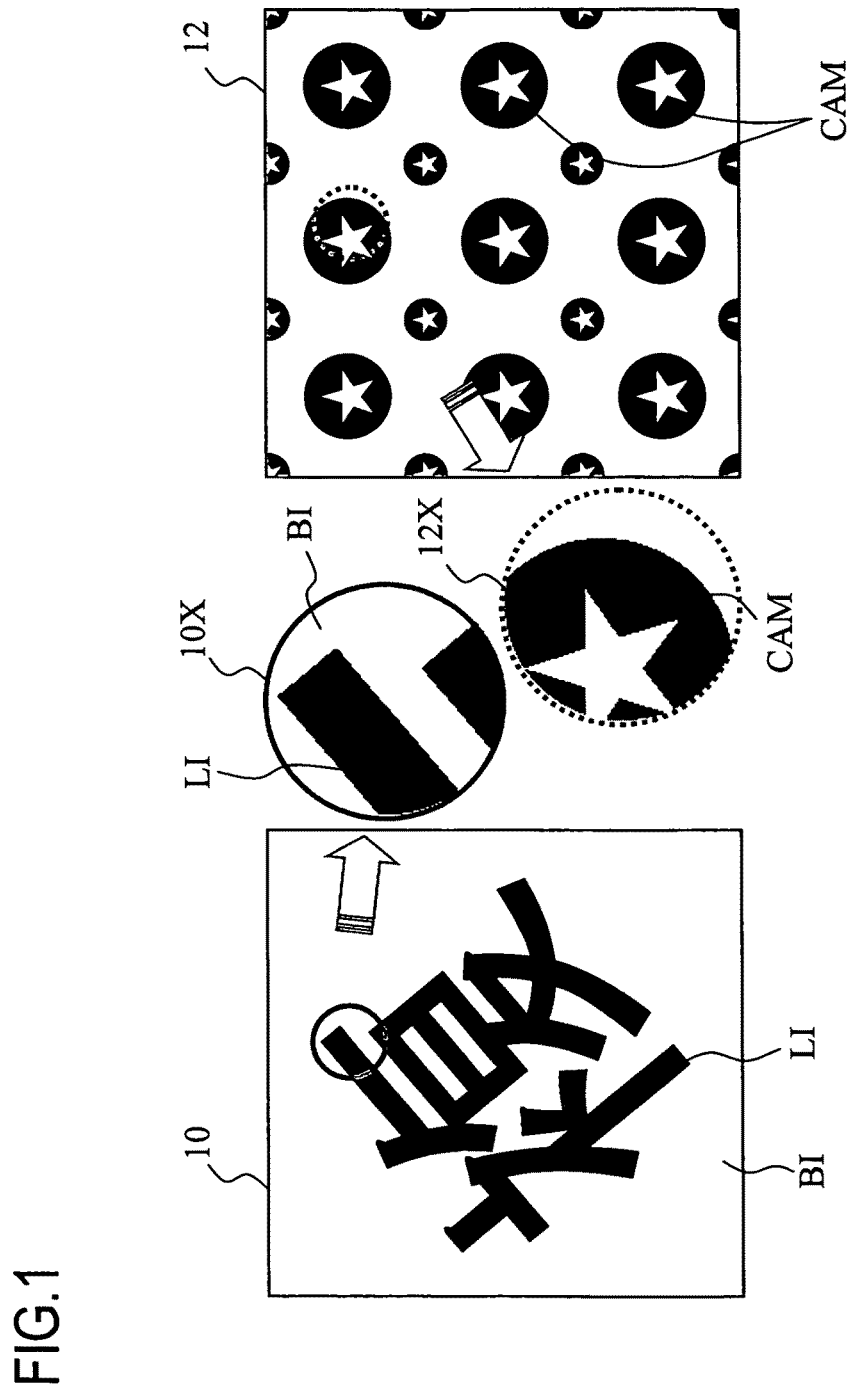
FIG. 1 is a diagram depicting an example of a latent image of a tint block and a camouflage pattern.
Figure 2:
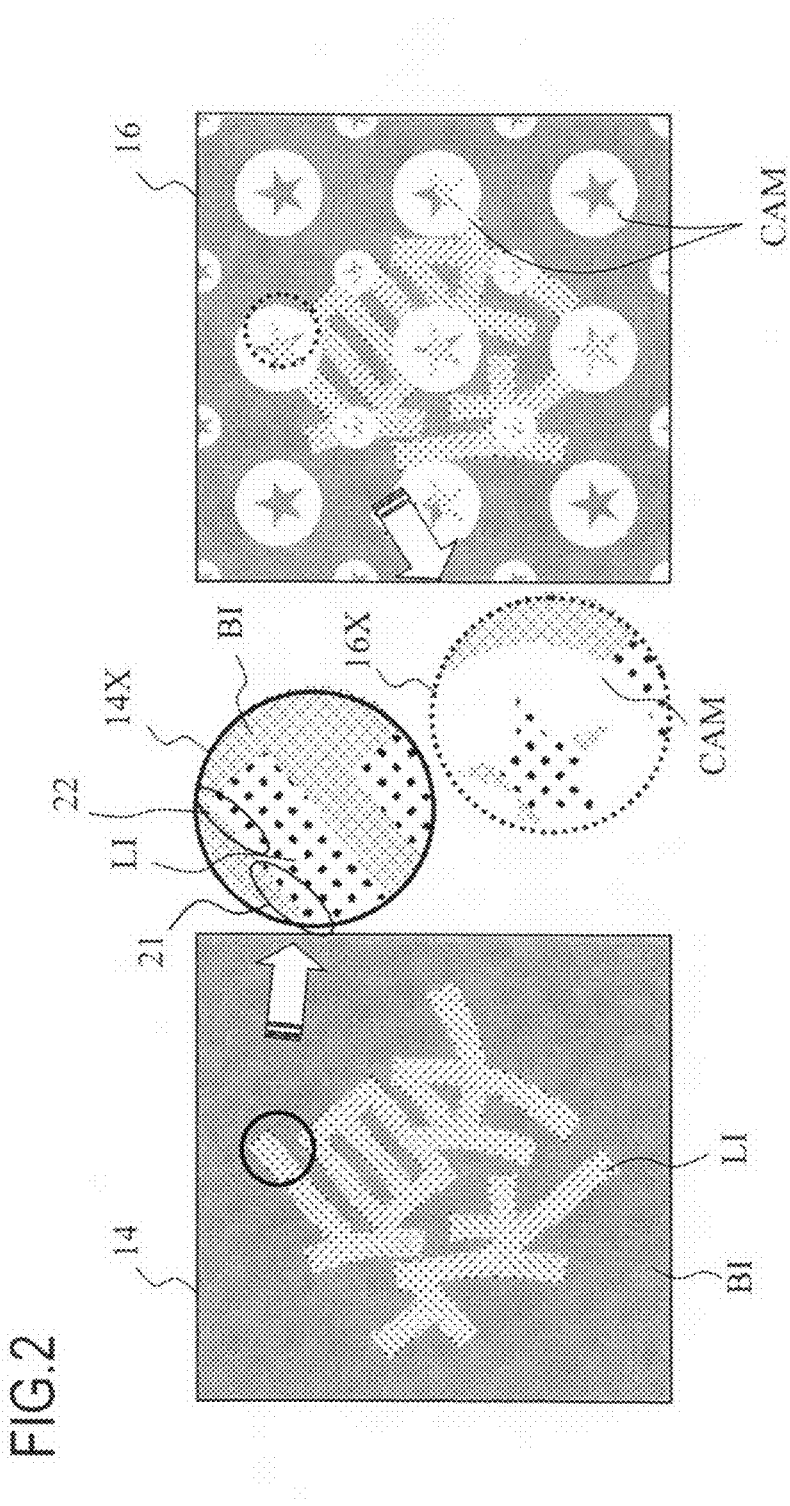
FIG. 2 is a diagram depicting an example of an original of a tint block.
Figure 3:
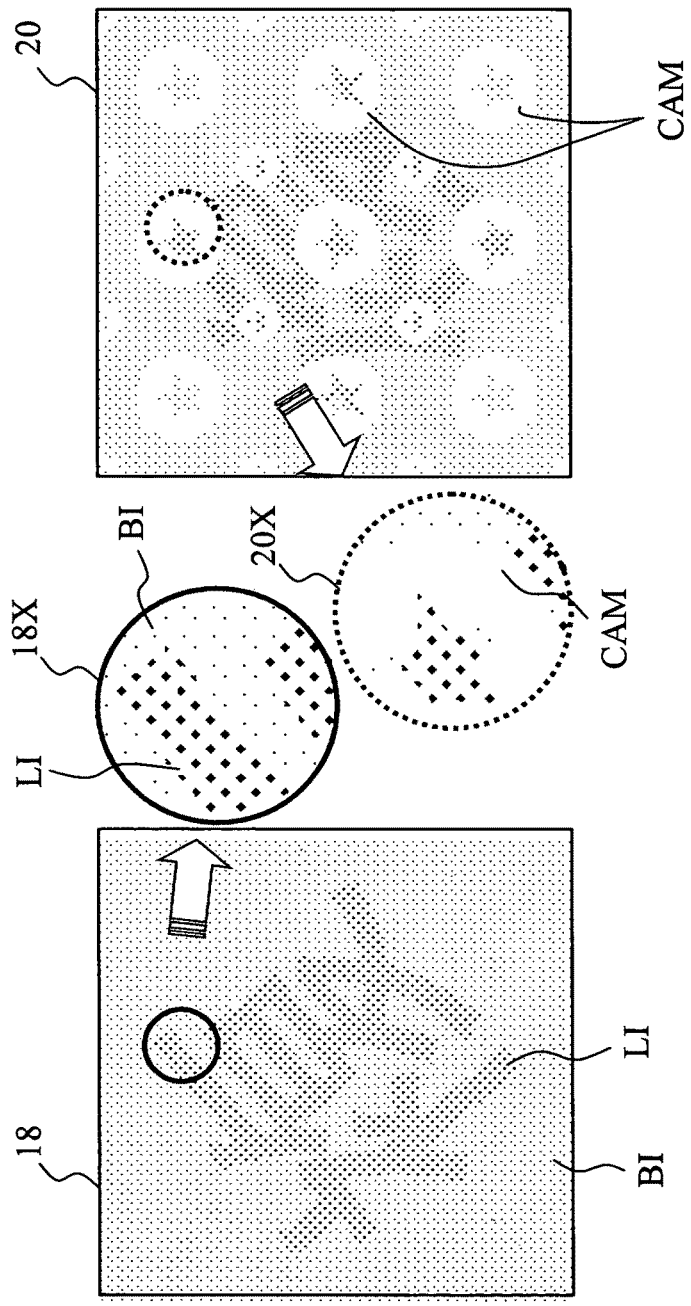
FIG. 3 is a diagram depicting an example of a copy of a tint block.
Figure 7:
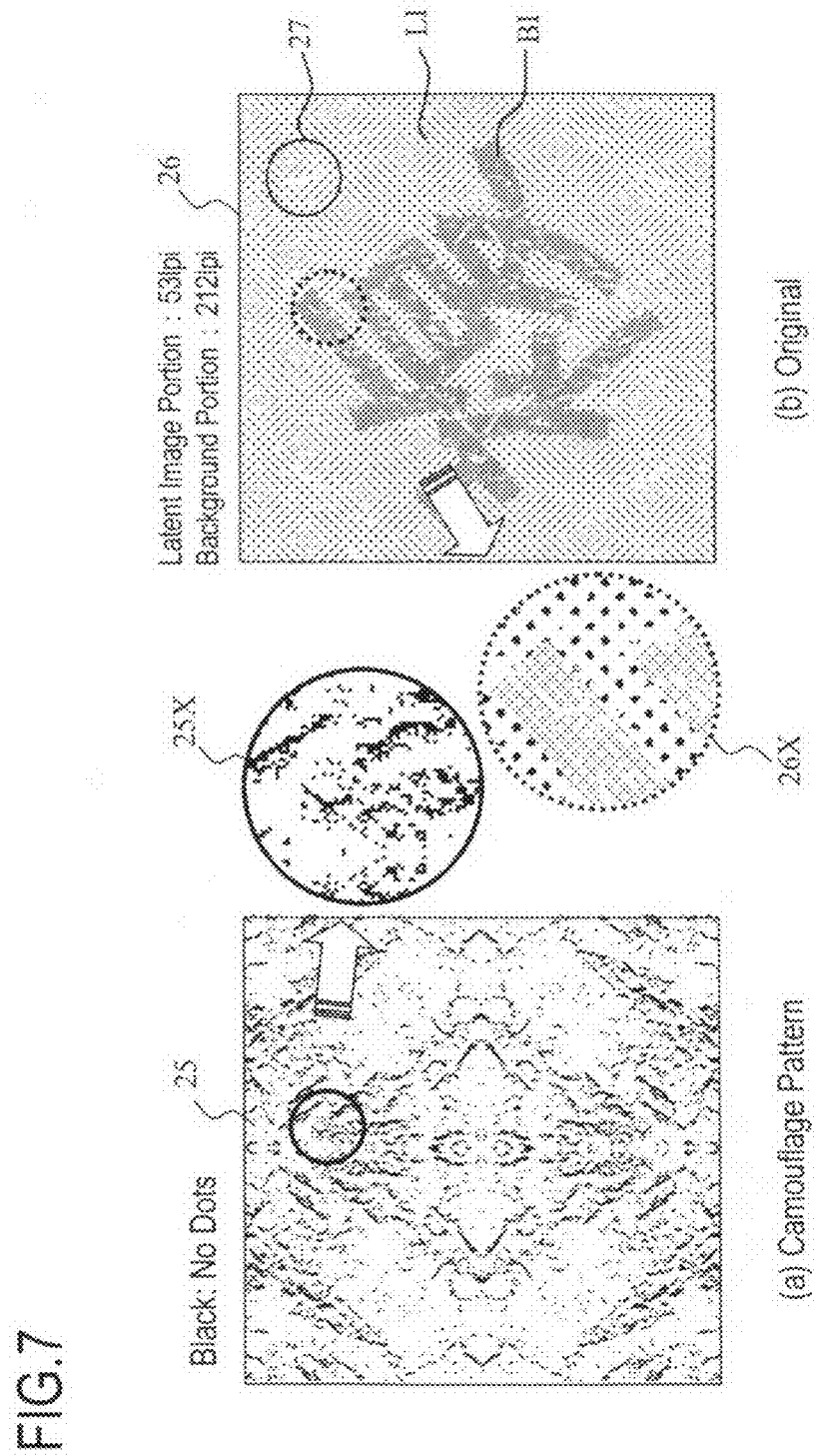
FIG. 7 is a diagram depicting a camouflage pattern with high resolution and a tint block when this pattern is used.
Figure 9:
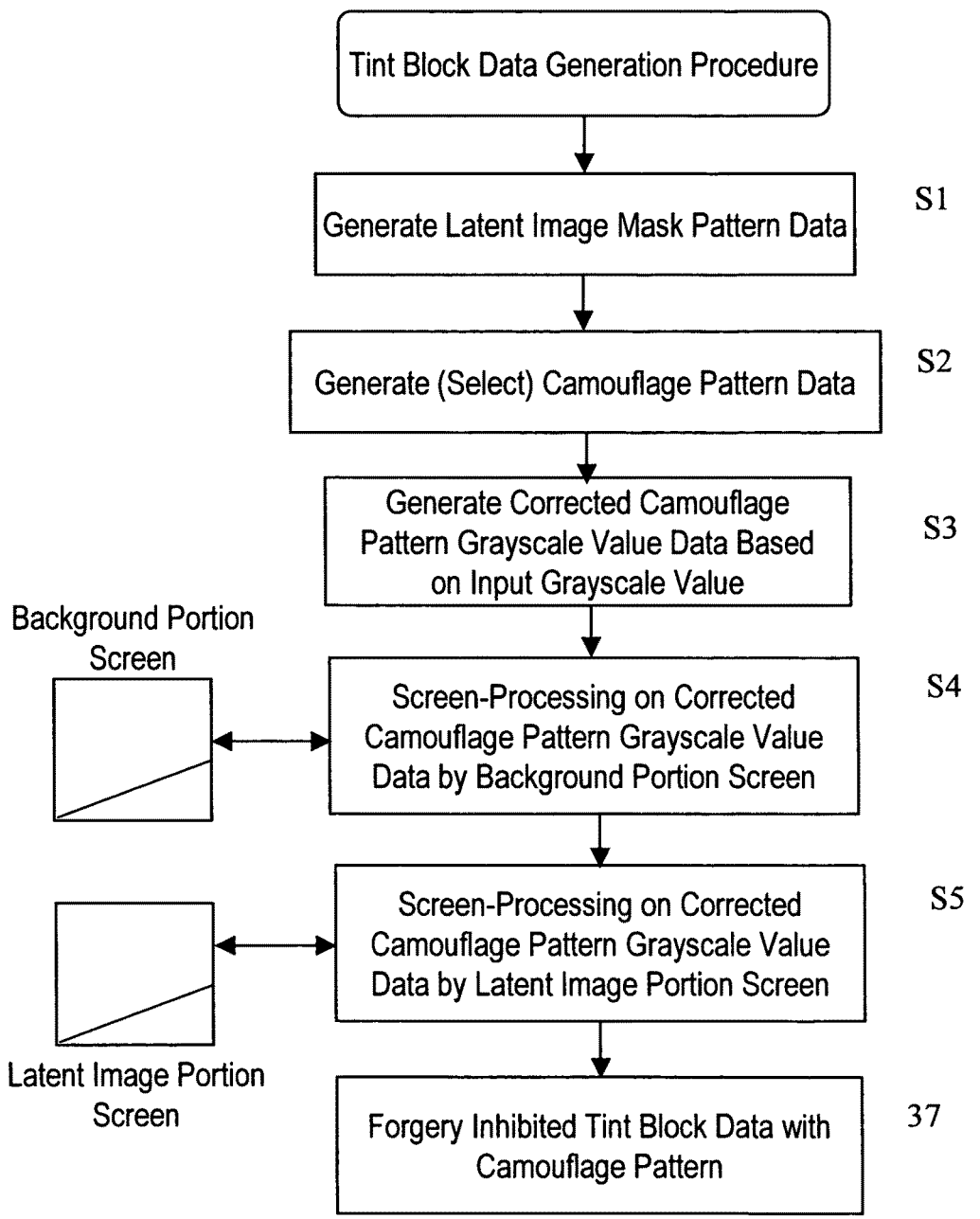
FIG. 9 is a flow chart depicting a tint block data generation procedure according to the present embodiment.

FIG. 9 is a flow chart depicting the tint block data generation procedure according to the present embodiment. The tint block image generation device generates a latent image mask pattern data (S1). The latent image mask pattern data is data on the latent image mask pattern 10, that is, the character "COPY" shown in FIG. 1, for example, and each pixel is comprised of data, 0 or 1, which indicates whether each pixel is the latent image portion LI or the background portion BI. The tint block image generation device acquires a camouflage pattern data (S2). Data selected from a plurality of camouflage pattern data 35, which is stored in the memory of the host computer 30 in advance, becomes the camouflage pattern data. For the camouflage pattern, various patterns, such as a low resolution pattern shown in FIG. 1 and a high resolution pattern shown in FIG. 7, can be used.

The camouflage pattern data according to the present embodiment is 8-bit grayscale value data for each pixel, and is a binary data of black (grayscale value 0) and white (grayscale value 255). Dots of the tint block are not generated in a portion where the camouflage pattern is black, while dots of the tint block are generated in a portion where the camouflage pattern is white. The camouflage pattern data may have more grayscale values than binary values. In other words, the camouflage pattern data may be comprised of 8-bit grayscale data, and have grayscale values 0 to 255, that is, 256 grayscales.

In order to combine the above mentioned camouflage pattern with the tint block, the tint block image generation device generates corrected camouflage pattern grayscale data based on the input grayscales of the latent image portion and the background portion (S3). The input grayscale values ($0 \leq In < 255$) of the latent image portion and background portion correspond to the output density of the tint block image, and are grayscale values determined by default, or grayscale values corresponding to the output density of the tint block image which the user selected arbitrarily. The camouflage pattern, on the other hand, is comprised of black (grayscale value 0) and white (grayscale value 255), where black indicates dots OFF. Therefore if the grayscale value of the camouflage pattern is A (=0, 255), the grayscale value Ai of the corrected camouflage pattern, in which the input grayscale values In of the latent image portion and the background portion are considered, is determined by the following Expression (1).

$$Ai=(A/255)\times In \quad (1)$$

The tint block image with a camouflage pattern is an image generated by modulating the tint block image comprised of the latent image portion and the background portion with the grayscale values of the camouflage pattern. In other words, the tint block image with a camouflage pattern is an image generated by modulating the grayscale values of the camouflage pattern with the input grayscale values of the tint block image. In the above mentioned procedure S3, the corrected camouflage pattern grayscale value is determined by performing this modulation processing.

If the camouflage pattern is not used, all grayscale values A of the camouflage pattern are set to white (255). In this case, the memory capacity for the camouflage pattern can be minimized by making the size of the camouflage pattern one pixel.

Then for the pixels of the background portion, screen processing is performed using a background screen 34, such as an area modulation (AM) screen having a high screen ruling, or a density modulation (FM) screen based on error diffusion or dispersed dither matrix, according to the latent image portion mask pattern (S4). For example, pixel data having dot ON or OFF for each pixel is generated referring to the dither matrix constituting the background portion screen 34 based on the corrected camouflage pattern grayscale value.

For the image of the latent image portion as well, screen processing is performed using a latent image portion screen 33, such as an area modulation (AM) screen having a low screen ruling, according to the latent image portion mask pattern (S5). In the case of the screen processing of the latent image portion, however, special screen processing, such as forming a center of a dot clustered halftone dot at the center of gravity position of the image of the latent image portion in a cell corresponding to the halftone dot formation area. This special screen processing will be described later, and by performing the special screen processing in a latent image portion having a low screen ruling, the generation of a high density enhanced area or low density enhanced area in the boundary of the latent image portion and background portion can be suppressed. Also the appearance of the camouflage pattern can be equalized between the latent image portion and background portion.

For the latent image portion screen 33, an AM screen having a low screen ruling is preferable, and this screen is a dot clustered dither matrix of a threshold matrix or grayscale conversion matrix, for example. For the background portion screen 34, an AM screen having a screen ruling higher than the latent image portion screen is preferable, and this screen is a dot dispersed dither matrix of a threshold matrix or grayscale conversion matrix, for example. The background portion screen 34 may be a density modulation (FM) screen based on the error diffusion method or dispersion dither matrix. As an original function of the tint block image, the output density to be reproduced by copying must be different between the latent image portion and background portion, so the screen to be used must implement this function.

By the above mentioned processing, tint block data 37 with a camouflage pattern or tint block data without a camouflage pattern 37 can be generated.

Now the generation procedure for tint block data with a camouflage pattern according to the present embodiment will be described.

[Latent Image Portion Dither Matrix and Background Portion Dither Matrix]

FIG. 10 shows an example of the background portion screen and latent image portion screen according to the present embodiment. As an example of the background portion screen and latent image portion screen for generating the images of the background portion BI and the latent image portion LI of the tint block, FIG. 10 shows the dither matrices of the AM screen with low screen ruling and the AM screen with high screen ruling to be a dispersed form.

Figure 4:
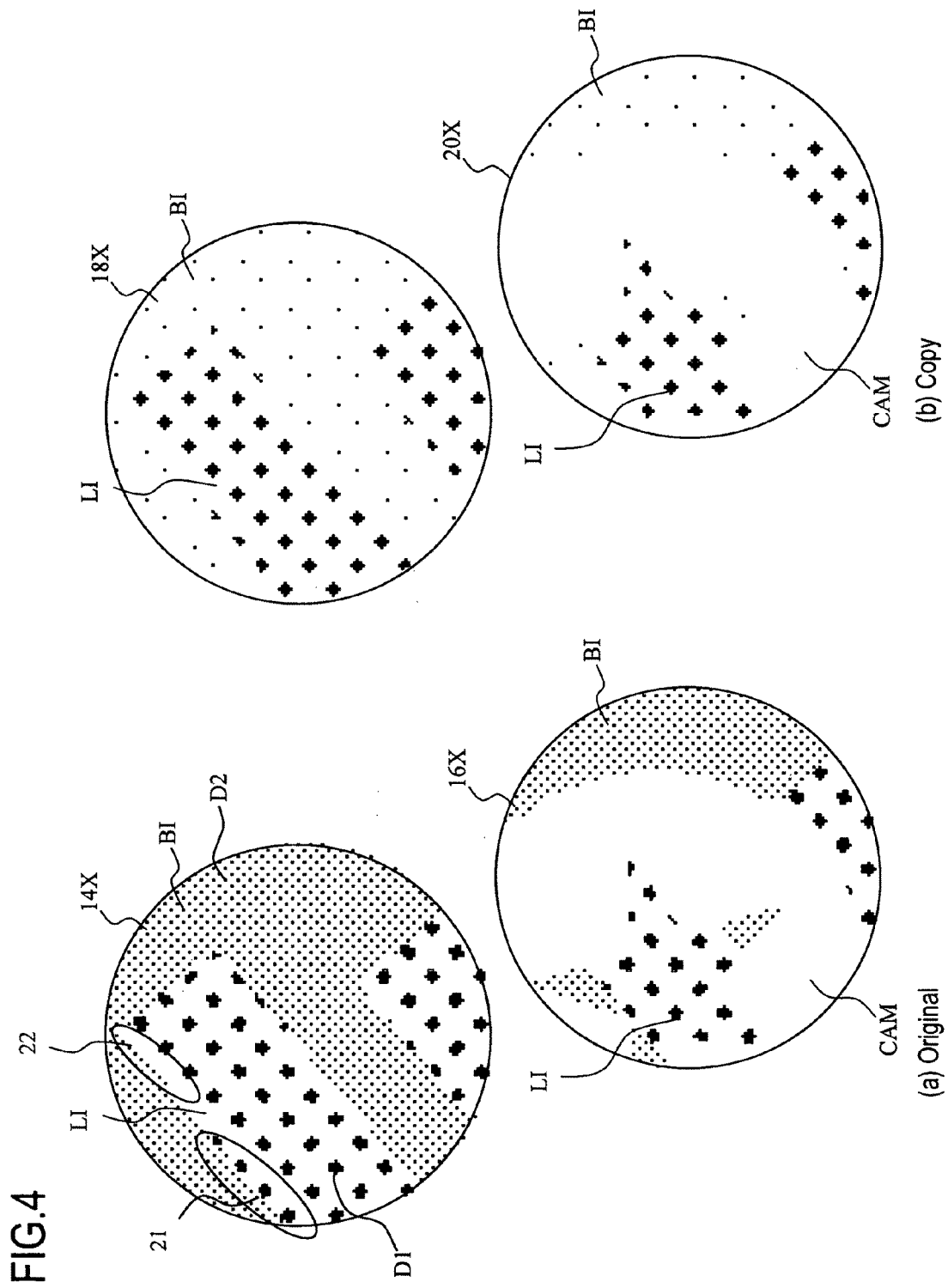
FIG. 4 are diagrams further enlarging the enlarged view of the original in FIG. 2 and the enlarged view of the copy in FIG. 3.
Figure 5:
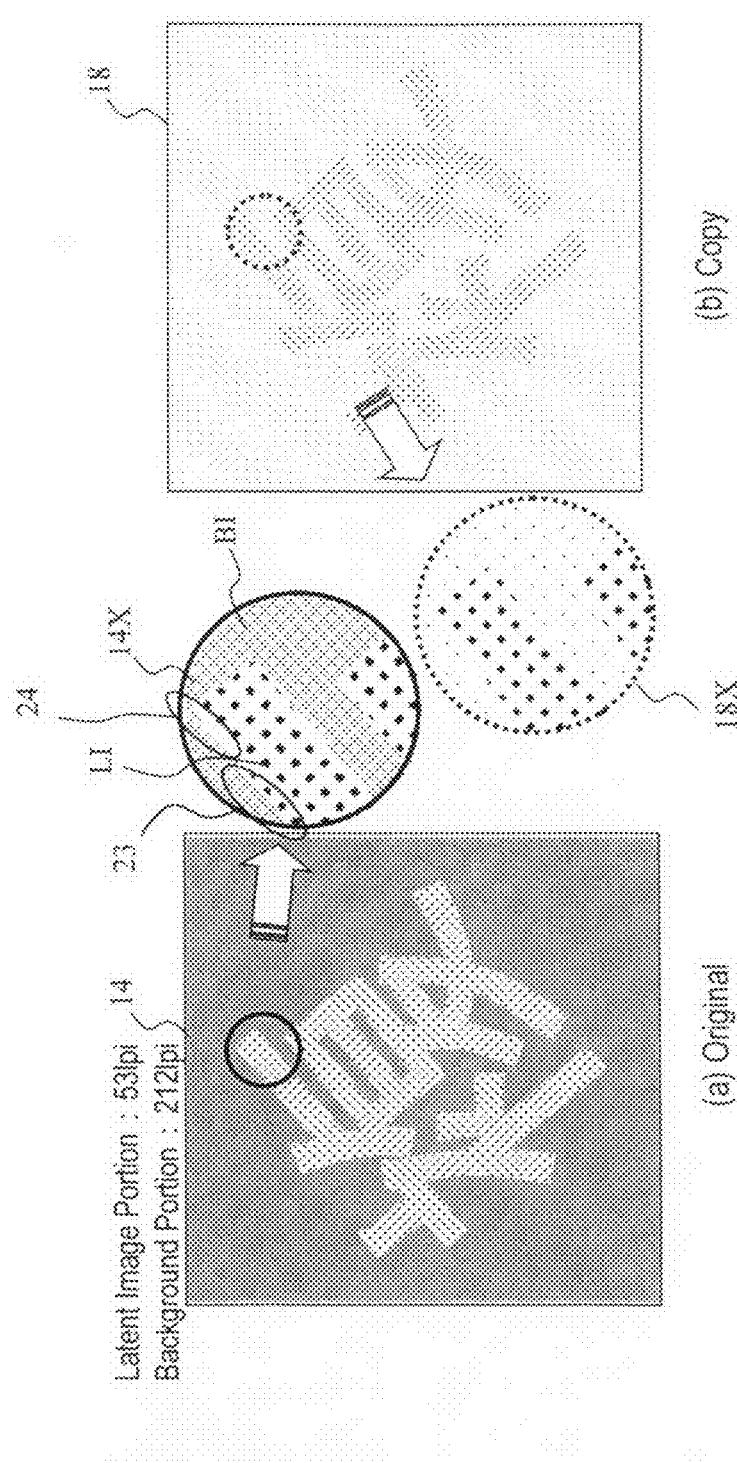
FIG. 5 is a diagram depicting an original and a copy of a tint block when the boundary processing according to Patent Document 1 is performed.

The background portion basic dither matrix DM-BI in FIG. 10A is a dot dispersed dither matrix where each element of the 4×4 matrix has a threshold of 1 to 8. Threshold "1" is assigned to elements at positions of the displacement vectors (−2, 2) and (2, 2), threshold "2" is assigned at positions distant from the elements with threshold "1", and thresholds "3 to 8" are arranged there between. In the tint block image generation step, the input grayscale value of the background portion and the threshold of each element of the background portion basic dither matrix DM-BI are compared, and if the input grayscale value is the threshold or more, a dot is formed in the pixel. For the background portion basic dither matrix DM-BI in FIG. 10A, the input grayscale value is set to "1", and the second dot D2 is formed at a position of the black pixel which has threshold "1". The enlarged view of this is shown in the background portion BI of FIG. 4A, and in the background portion BI, micro dots D2 are formed with screen ruling 212 lpi.

The latent image portion basic dither matrix DM-LI in FIG. 10B, on the other hand, is a dot clustered dither matrix, one of AM screen, where each element of a 32×32 matrix has a threshold of 1 to 128. Threshold "1" is assigned to elements at positions of the displacement vectors (−8, 8) and (8, 8), which correspond to the center position of a first dot (halftones) D1. Thresholds "2 to 128" are sequentially distributed from a pixel with a threshold of "1", which corresponds to the center position of the first dot (halftones) D1. In the tint block image generation step, the input grayscale value of the latent image portion and threshold of each pixel of the latent image portion basic dither matrix DM-LI are compared, and a dot is formed in the pixel if the input grayscale value is the threshold or more. In the latent image portion basic dither matrix DM-LI in FIG. 10B, the input grayscale value "31" is set, and a dot is formed at a position of an element which has a threshold of "1 to 13", whereby a large dot (halftones) D1 is formed. The enlarged view of this is shown in the latent image portion LI of FIG. 4A, and large dots D1 are formed with a screen ruling of 53 lpi.

The background portion basic dither matrix DM-BI may be a dot clustered dither matrix which forms micro halftone dots, just like the latent image portion basic dither matrix DM-LI. The halftone dot size generated in the background portion, however, must be smaller than the halftone dot size of the latent image portion.

As mentioned above, in the original, the tint block is demanded to keep concealment capability for the latent image high by equalizing output densities of the background portion and latent image portion. In the copy, it is demanded to increase the identification capability for the latent image by increasing the difference of output densities between the background portion and latent image portion, and increasing the output density of the latent image portion. The first dot D1, which is large, hardly disappears in the copy, but the second dot D2, which is small, easily disappears in the copy. Thereby the output densities by copying differs between the latent image portion and background portion.

However, in the image generated by the dither matrices DM-BI and DM-LI in FIG. 10, the number of grayscales (resolution) of the output density is limited in a low output density area used for a tint block, such as an area of which output density is 10 to 15%. In the case of the background portion basic dither matrix DM-BI, a micro dot D2 is formed at a position which has threshold "1", so the background portion is generated with an output density corresponding to this micro dot formation. Whereas in the case of the latent image portion generation step, an input grayscale value that can generate the output density which is the same as the output density of the background portion is selected, and the image in the latent image portion is generated by comparing this input grayscale value with the latent image portion basic dither matrix DM-LI. However, the number of grayscales (resolution) of the output density of the latent image portion LI is limited, as mentioned above, so in some cases, the latent image portion LI may not be generated with an output density matching the output density of the background portion.

Figure 11:
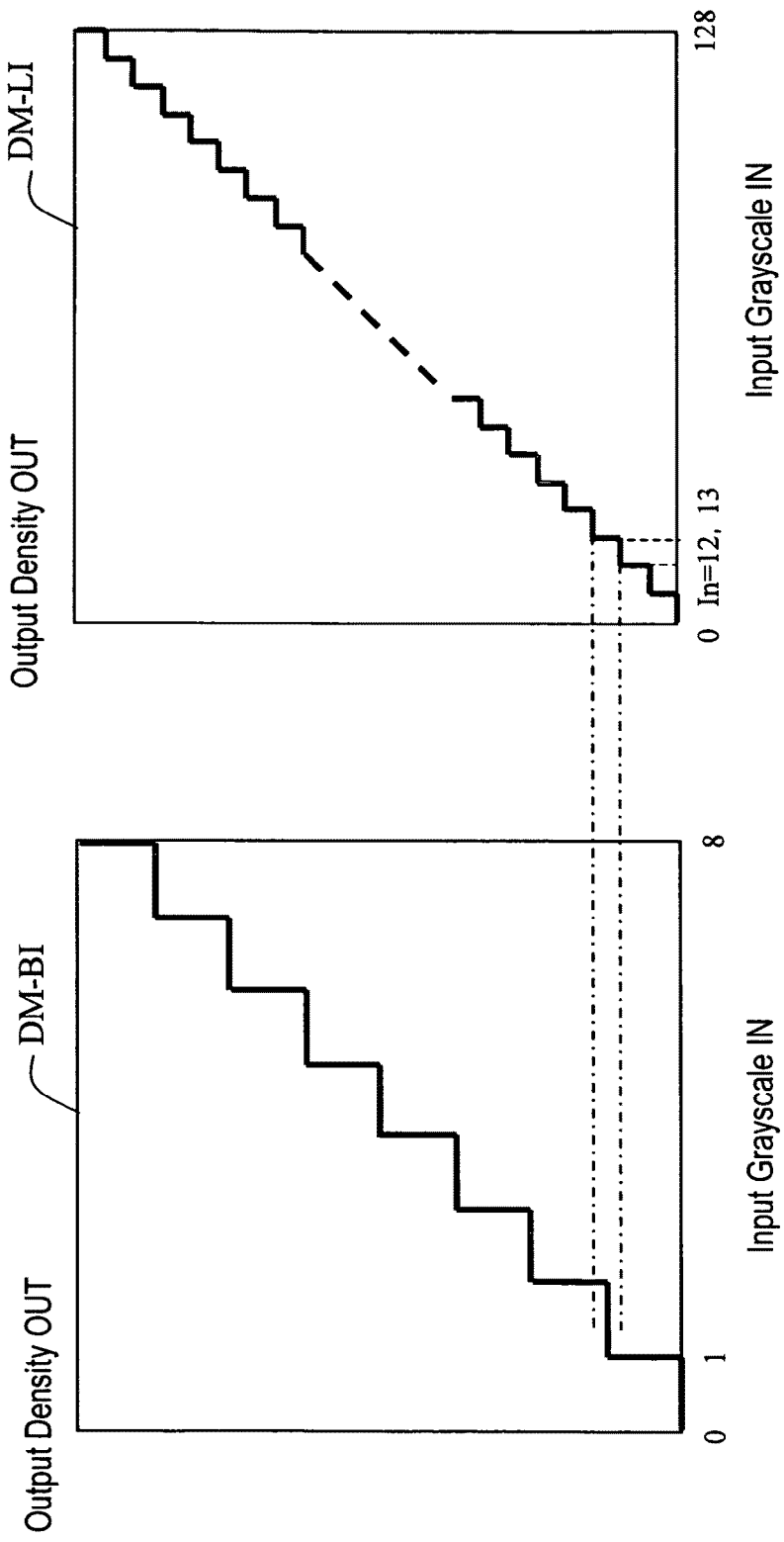
FIG. 11 shows the characteristics of an input grayscale and output density of the background portion basic dither matrix DM-BI and the latent image portion basic dither matrix DM-LI.

FIG. 11 shows the characteristics of the input grayscale and output density of the background portion basic dither matrix DM-BI and the latent image portion basic dither matrix DM-LI. The characteristics shown in FIG. 8 are based on the assumption that the number of dots generated in a pixel, of which threshold is less than the input grayscale value, and the output density of the tint block image generated by the printer engine, are in an ideal linear relationship in the basic dither matrix, to simplify description.

When the tint block image generation device uses the latent image portion basic dither matrix DM-LI shown in FIG. 10B as the latent image portion dither matrix 33 and the background portion basic dither matrix DM-BI shown in FIG. 10A as the background portion dither matrix 34, the characteristics of the input grayscale value and the output density of the corresponding latent image portion image data and background portion image data are as shown in FIG. 11. In other words, in the case of the background portion, the output density OUT with respect to the input grayscale value In=0 to 7 may possibly be one of 8 output density values, including "0". This means that the number of grayscales (or resolution) of the output density, from white, where all pixels dots are OFF, to the maximum output density, where all pixel dots are ON, is 8. And as shown in FIG. 10A, in the background portion, micro second dots D2 are dispersed in positions of pixels having threshold "1" of the dither matrix DM-BI with respect to the input grayscale value In=1. Whereas in the case of a latent image portion, the output density OUT may possibly be one of 128 output density values, including "0", with respect to the input grayscale value In=0 to 127. This means that the number of grayscales (or resolution) of the output density, from white to the maximum output density, is 128.

However, the output density corresponding to the input grayscale In=1 in the background portion is between two output densities corresponding to the input grayscales In=12 and 13 in the latent image portion. Therefore, it is not possible to make the output densities of the background portion and latent image portion the same.

The output density range that can be used as the tint block image is 10 to 15% of the maximum output density. In the range of the output density 10 to 15%, the number of grayscales of the output density that can be reproduced by the latent image portion basic dither matrix is at most 20. Although the number of grayscales of output density in the latent image portion by lowering the screen ruling, since the change of the output densities that can be adjusted by changing one step of the input grayscale value of the background image portion becomes greater than a predetermined value, it is difficult or impossible to match the output density of the latent image portion with the output density of the background portion at high precision, even if the screen ruling of the latent image portion dither matrix is increased, and the number of grayscales of the output density of the latent image portion is increased.

Even if the change of the output density of the tint block image is enabled within a 10 to 15% range by doubling or quadrupling the size of the background portion basic dither matrix, and increasing the number of grayscales of the output density of the background portion, it is still difficult or impossible to match the output density of the background portion and the output density of the latent image portion at high precision due to reasons similar to above.

Figure 12C:
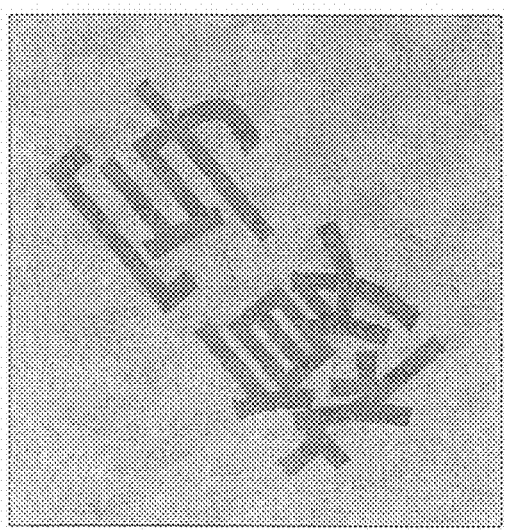
FIG. 12 shows the output density characteristics with respect to the input grayscale value of the background portion dither matrix and the latent image portion dither matrix according to the first embodiment.
Figure 12B:
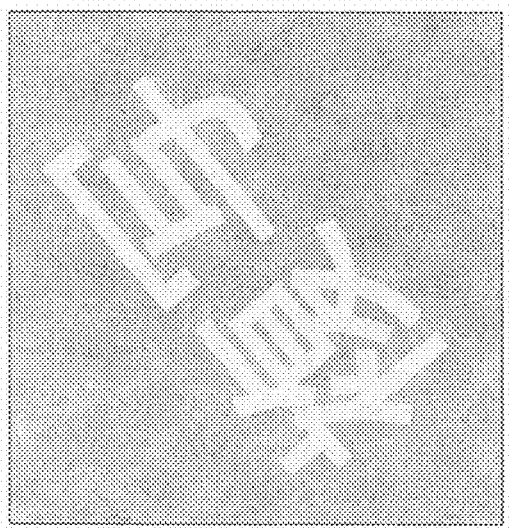
Figure 12A:
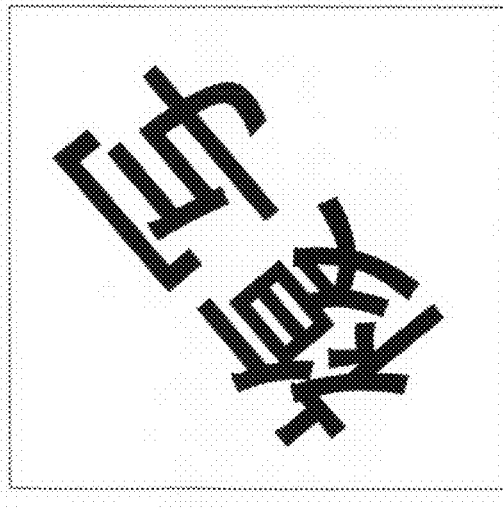

FIG. 12 shows an example when the concealment capability for the latent image in the original deteriorates. FIG. 12B shows a tint block image when the input grayscale value of the latent image portion is set to "12" in the latent image mask pattern "COPIED" in FIG. 12A, and FIG. 12C shows a tint block image when the input grayscale value of the latent image portion is set to "13". In FIG. 12B, the output density of the latent image mask pattern is lower than the background portion, therefore the concealment capability for the latent image "COPIED" has dropped. In FIG. 12C, the output density of the latent image mask pattern is higher than the background portion, therefore the concealment capability for the latent image "COPIED" has also dropped.

Therefore in the present embodiment, for the background portion dither matrix and latent image portion dither matrix, the dither matrices which are generated based on the basic dither matrix in FIG. 10, and have characteristics where the output density increases within a low density area, such as 0 to 15%, with respect to the input grayscale value 0 to 255, are used.

Figure 13:
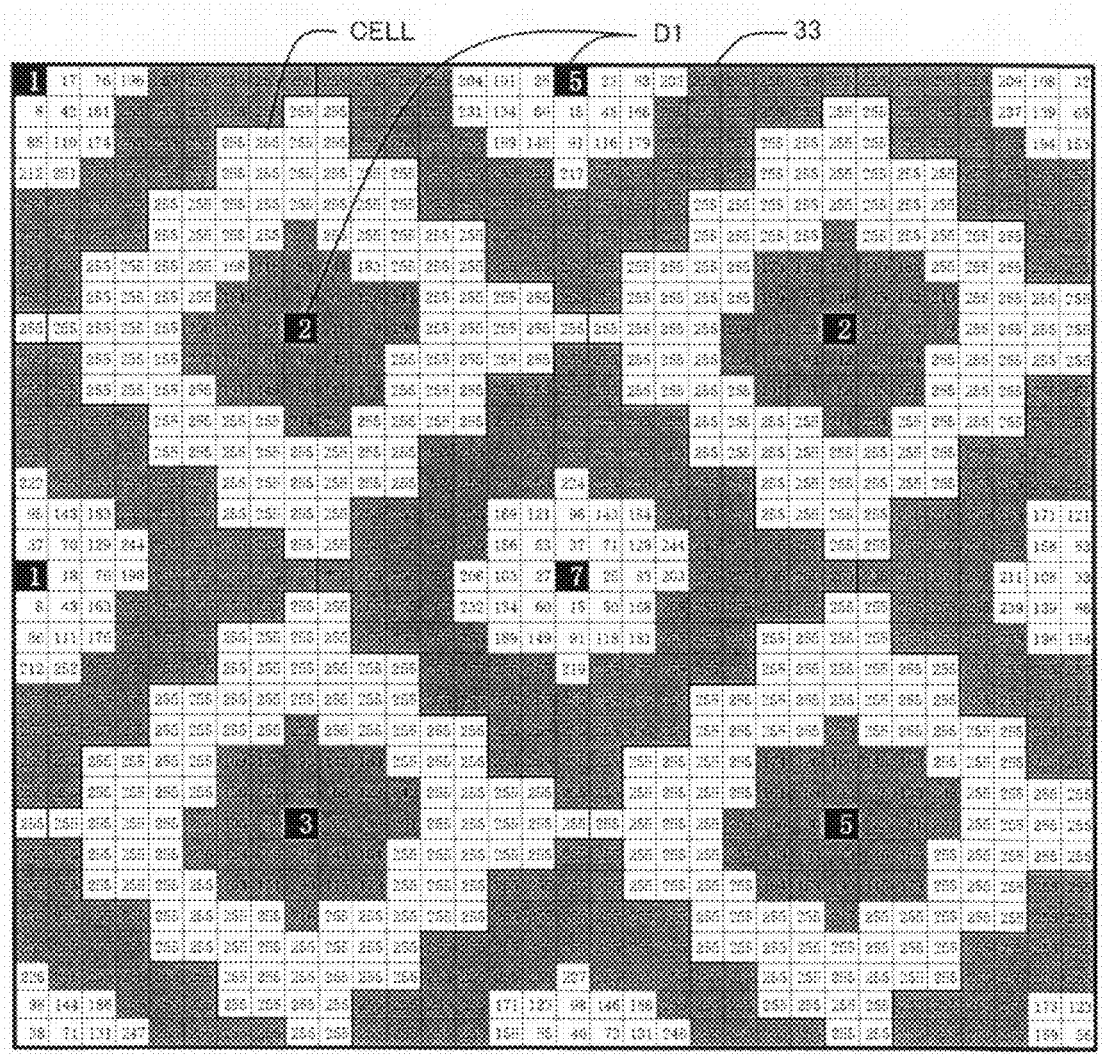
FIG. 13 shows a low density area expanded dither matrix 33 for the latent image portion used for the present embodiment.
Figure 14:
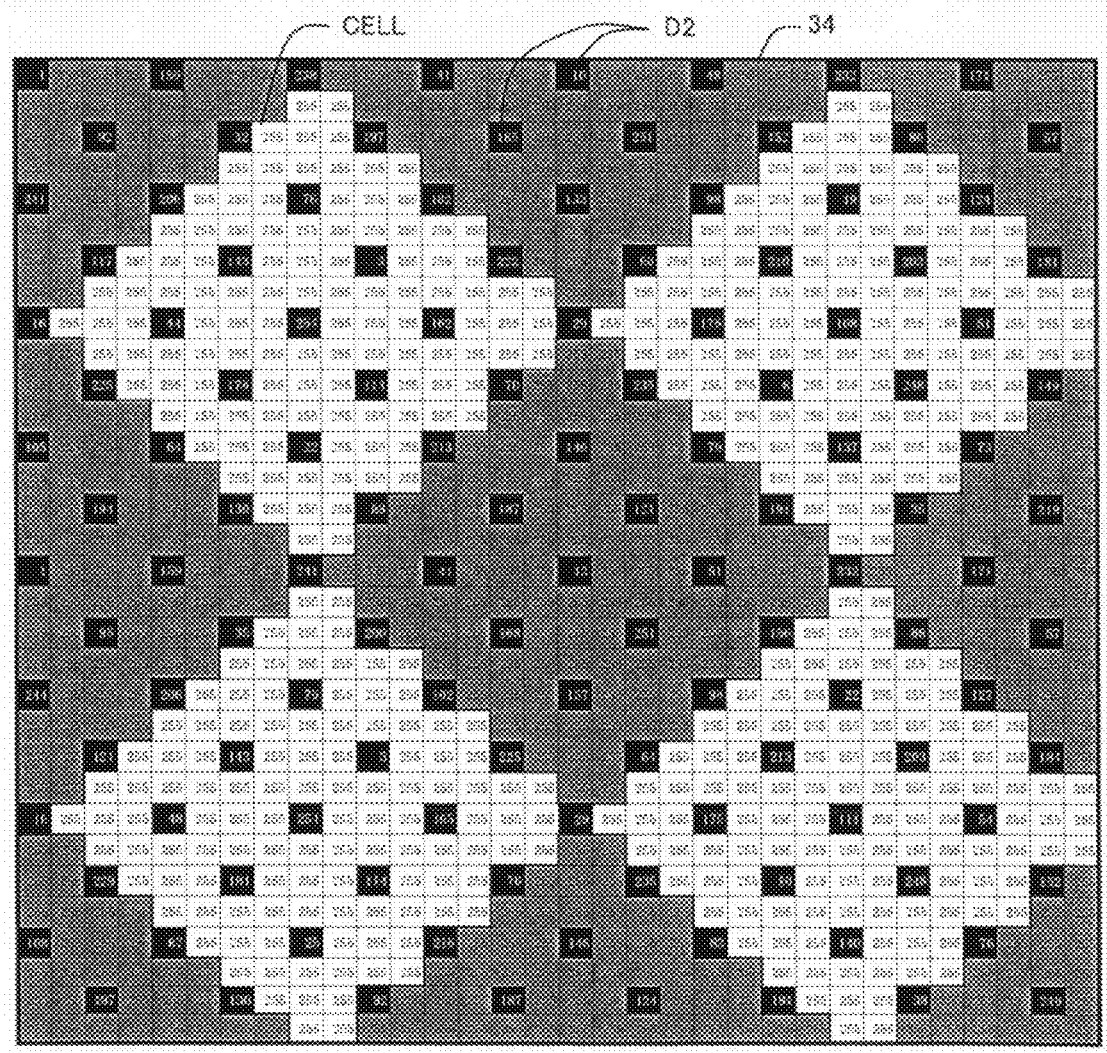
FIG. 14 shows a low density area expanded dither matrix 34 for the background portion used for the present embodiment.
Figure 15:
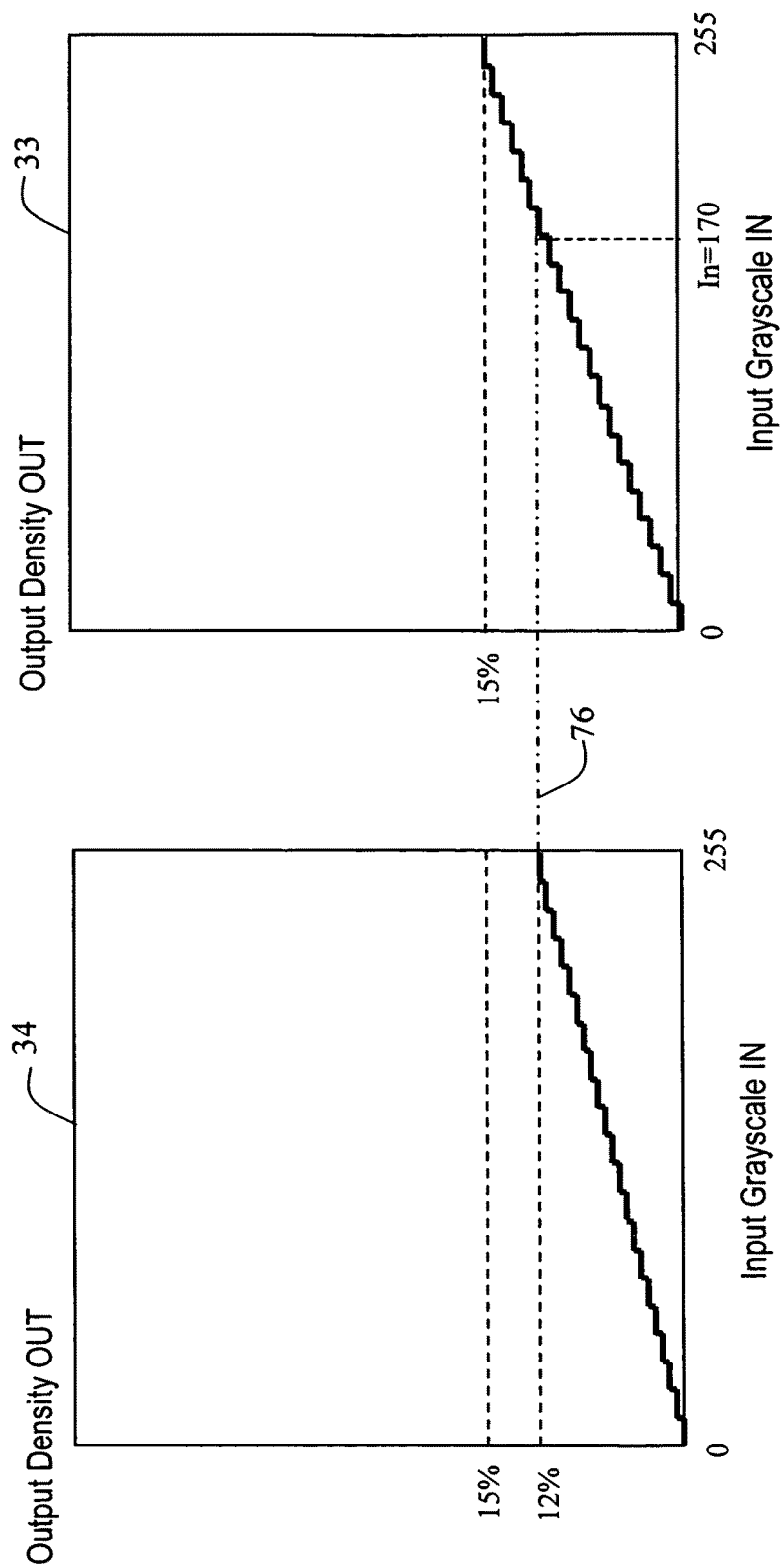
FIG. 15 shows the output density characteristics with respect to the input grayscale value of the latent image portion dither matrix 33 and the background portion dither matrix 34.

FIG. 13 and FIG. 14 show the latent image portion dither matrix 33 in which a low density area is expanded, and the background portion dither matrix 34 in which a low density area is expanded. FIG. 15 shows the output density characteristics of the latent image portion dither matrix 33 and background portion dither matrix 34 with respect to the input grayscale values.

In order to generate the dither matrix 33 34, the sizes of the basic dither matrices DM-BI and DM-LI in FIG. 10 are expanded until the number of grayscales becomes sufficient. For example, the matrix size is expanded to 128×128. In FIG. 10 and FIG. 11, however, a matrix size of 32×32 is shown for convenience. Then all thresholds of the expanded dither matrix are dispersed and diffused so that all thresholds are different in the sequence of dot generation, corresponding to the increase in the input grayscale value. This is called a "diffused dither matrix".

Then using the diffused dither matrix, a background portion and latent image portion, with respect to the plurality of input grayscale values, are printed by a printer, and the output density is measured by a calorimeter. Based on the measurement result of this output density, thresholds are corrected so as to be ideal output density characteristics, such as linear characteristics, with respect to the input grayscale 0 to 255. This correction is the same correction which is normally performed in the calibration step of the screen gamma table. As a result, a corrected and diffused dither matrix is generated.

Finally, the thresholds of the corrected and diffused dither matrix are multiplied by 15/100 so that the maximum value becomes about 15% of the maximum output density, whereby the low density area expanded dither matrices 33 and 34 are generated. In other words, if screen processing is performed using a low density area expanded dither matrix, the output density characteristics, where the output density increases to about 15% at maximum with respect to the input grayscale 0 to 255, are implemented.

In the case of the low density area expanded dither matrix 33 of the latent image portion in FIG. 13, a threshold 1 to 7 is assigned to elements (black element) at positions of the displacement vectors (−8, 8) and (8, 8), and a threshold 8 to 254 is assigned to peripheral gray elements (or white elements) thereof. In other words, the black pixels and gray (or white) pixels around the black ones correspond to the maximum size of the first dot D1. The threshold 255 is assigned to other elements. In this case, a dot is generated in pixels of which threshold is less than the input grayscale if the input grayscale is 0 to 254, but the dots of pixels of which threshold is the input grayscale 255 are controlled to be OFF. Or the input grayscale 255 is inhibited in the background portion.

Therefore, by using the low density area expanded dither matrix 33 of the latent image portion, in the image of the latent image portion, the first dot D1 changes from being at the minimum size of an element at positions of the displacement vectors (−8, 8) and (8, 8), to being at the maximum size of the black and gray (or white) elements with respect to the input grayscale 0 to 255. Since the output density when the first dot D1 is at the maximum size is 15% solid black, the output density changes in a 0 to 15% range with respect to the input grayscale 0 to 255. Therefore many grayscales (254 grayscales) exist in the output density 0 to 15% range.

In the latent image portion basic dither matrix DM-LI in FIG. 10B, the thresholds 1 to 31 are assigned to the gray elements where the first dot D1 at the maximum size is generated. Whereas in the low density area expanded dither matrix 33 in the latent image portion in FIG. 13, the thresholds 1 to 254 are assigned to the gray (or white) elements where the first dot D1 at the maximum size is generated. In other words, the number of grayscales (resolution) of the output density is far more than the case in FIG. 10B. This means that resolution in the density adjustment is high, and the output density of the latent image portion can be adjusted to be the same output density of the background portion at high precision.

In the low density area expanded dither matrix 34 of the background portion in FIG. 14, the thresholds 1 to 254 are dispersed in the elements at positions of the displacement vectors (−2, 2) and (2, 2), and the threshold 255 is assigned to other elements. In this case as well, a dot is generated in pixels of which threshold is less than the input grayscale with respect to the input grayscales 0 to 254, but the dots of the pixel of which threshold is the input grayscale 255 is controlled to be OFF. Or the input grayscale 255 is inhibited in the background portion.

If the low density area expanded dither matrix 34 of the background portion is used, micro dots D2 are sequentially generated only in pixels at the positions of the displacement vectors (−2, 2) and (2, 2) for the input grayscale values 0 to 255, and dots are not generated for other pixels. Therefore the image of the background portion has only the micro dots D2 dispersed at positions of a screen ruling of 212 lpi, and other dots are not generated. The output density, when micro dots D2 are generated in all pixels at the positions of the displacement vectors (−2, 2) and (2, 2), is about 12% solid black. In other words, the output density of the low density area expanded dither matrix 34 of the background portion increases or decreases within roughly a 0 to 12% range with respect to the input grayscales 0 to 255. As a result, a stable arrangement of micro dots, with which characteristics of the background portion can be exhibited the most, is guaranteed.

FIG. 15 shows the output density characteristics of the low density area expanded dither matrices 33 and 34 in FIG. 13 and FIG. 14 with respect to the input grayscale values. As mentioned above, the output density characteristics of the background portion dither matrix 34, with respect to the input grayscale value, is that the output density is roughly within a 0 to 12% range with respect to the input grayscales 0 to 255. The output density characteristics of the latent image portion dither matrix 33, with respect to the image grayscale value, is that the output density is in a 0 to 15% range with respect to the input grayscales 0 to 255. In both cases, the output density simply increases, with respect to the input grayscale value, that is, in a linear relationship, because of calibration.

The above is a description on the background portion and latent image portion dither matrices 33 and 34 according to the present embodiment.

[Tint Block Image Data Generation Method]

Now a method for generating the tint block image data with a multi-grayscale camouflage pattern according to the present embodiment will be described.

Figure 16:
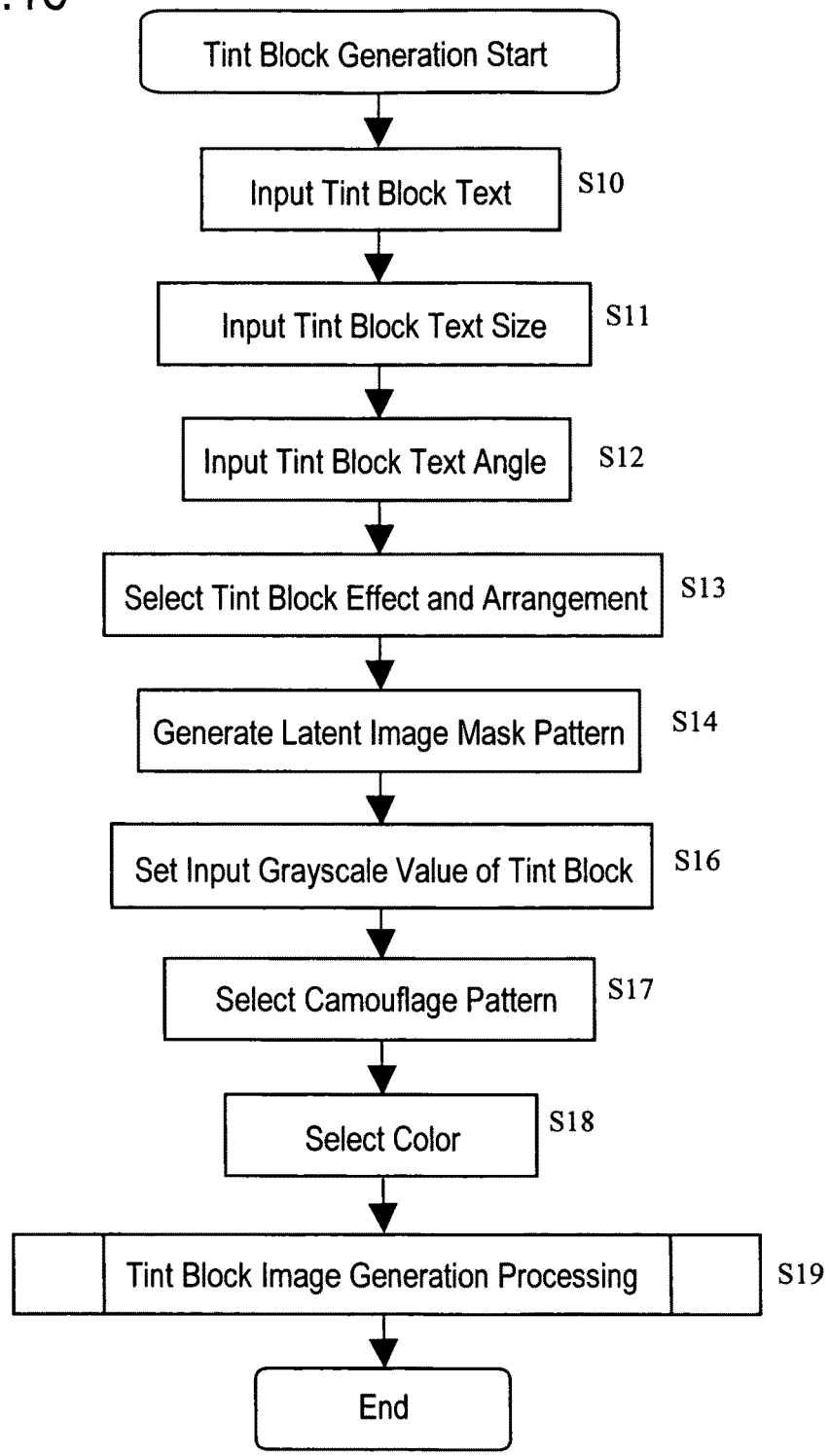
FIG. 16 is a flow chart depicting a tint block image data generation method according to the present embodiment.

FIG. 16 is a flow chart depicting the tint block image data generation method according to the present embodiment. In the printer driver 32 of the host computer 30, the printer user selects the tint block generation menu, and executes the generation of tint block image data according to the flow chart in FIG. 16. If the user generates an original latent image mask pattern, the user inputs the text of the tint block (S10). For example, the text "COPIED", "DUPLICATE" or "CONFIDENTIAL" and this text becomes the latent image of the tint block. Also the size of the tint block text, such as 48 point, is input (S11), an angle of the tint block text, such as 40 degrees, is input (S12), and the tint block effect and the arrangement are selected (S13). The tint block effect is twofold: the text is either void (text is white and surrounding is block) or embossed (text is black and surrounding is white). In the case of void, the text becomes the background portion, and the surrounding becomes the latent image portion, and in the case of embossed, the text becomes the latent image portion and the surrounding becomes the background portion. The arrangement of the tint block is square, oblique and inverted, for example.

Figure 17:
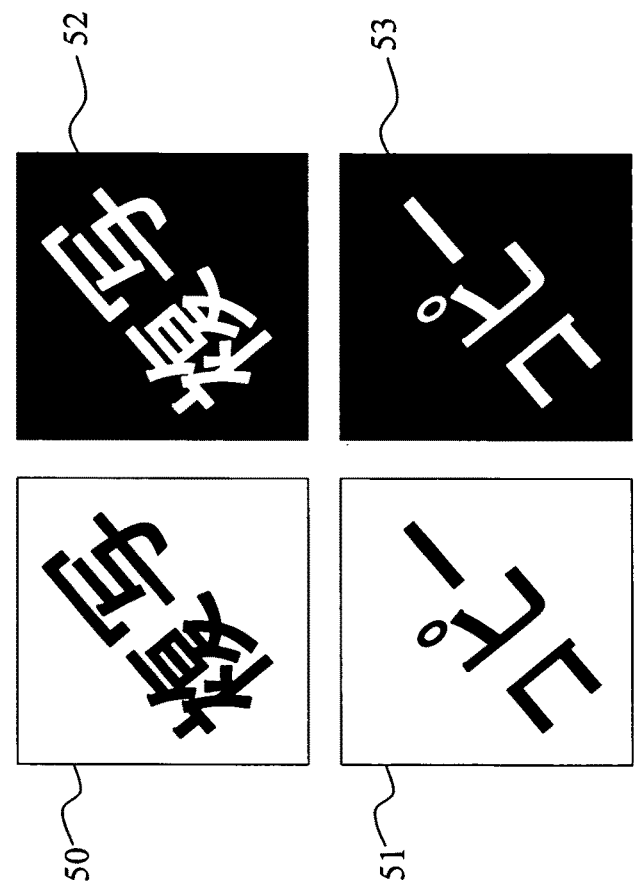
FIG. 17 shows examples of the tint block effect.

FIG. 17 shows an example of the tint block effect. The tint block patterns 50 and 51 are the text COPIED and DUPLICATE, the text is embossed in the original or in the copy thereof. The tint block patterns 52 and 53 are the same above text, but are examples of the tint block effect when the text is void in the original or in the copy. In both cases, the angle of the text is set to 40 degrees.

FIG. 18 shows examples of the arrangement of a tint block. In all these cases, the text is COPIED, the angle is 40 degrees, and the tint block effect is embossed. In the case of (a) square arrangement, the tint block image is generated so that the latent image mask pattern is attached like a tile. In the case of (b), an oblique arrangement, the latent image mask pattern is shifted by a predetermined phase at every line feed. And in the case of (c), an inverted arrangement, the latent image mask pattern is vertically inverted at every line feed.

When the user finishes input or selection in steps S10 to S13, the printer driver 32 generates a latent image mask pattern (S14). An example of the latent image mask pattern is a 1-bit data, where the latent image portion area and background portion area can be distinguished, as shown in FIG. 17.

Then the printer driver 32 sets the input grayscale value of the tint block (S16). If the latent image portion dither matrix 33 and background dither matrix 34 shown in FIG. 13 and FIG. 14 are used, the maximum value of "255" is selected as the input grayscale value for the background portion, and the input grayscale value In=170, which matches the output density of the background portion (12% of solid black), is selected for the latent image portion. In other words, in the background portion, where the input grayscale value is set to "255", the micro dot D2 is generated in all the black pixels at positions of the displacement vectors (−2, 2) and (2, 2) of the background portion dither matrix 34 (FIG. 14). The output density in this case is 12% of solid black, and a maximum number of dispersed second micro dots are generated, which is the optimum as a tint block image because of higher output density. In the latent image portion, where the input grayscale value is set to In=170, on the other hand, a number of dots corresponding to In=170 are generated in a half tone area comprised of pixels corresponding to the black elements and gray elements of the latent image portion dither matrix 33 (FIG. 13). As a result, the large dot D1 having a size corresponding to the input grayscale value In=170 is generated.

As the output density characteristics in FIG. 15 show, in the latent image portion dither matrix 33 and background portion dither matrix 34 in FIG. 10 and FIG. 11, the output density characteristics with respect to the input grayscale are different. In other words, the inclination of the output density with respect to the input grayscale is greater in the latent image portion dither matrix than in the background portion dither matrix. Therefore if the input grayscale "255", whereby an optimum output image can be reproduced in the background portion, is selected, the input grayscale In=170, of which the output density matches with the output density of the background portion, is selected in the latent image portion.

The printer driver 32 acquires the camouflage pattern data according to the selection request from the user (S17). The camouflage pattern data is stored in a memory of the host computer or external memory, and the printer driver acquires the camouflage pattern according to the selection request from the user.

Then the printer driver 32 selects a color of the tint block (e.g. black, cyan, magenta) (S18) according to the selection request of the user. It is desirable that the color of the tint block is a single color.

When S10 to S17, including input by the user, ends, the printer driver 32 executes the tint block image generation processing (S19). The tint block image generation processing is performed according to the flow chart in FIGS. 19 and 20.

Figure 19:
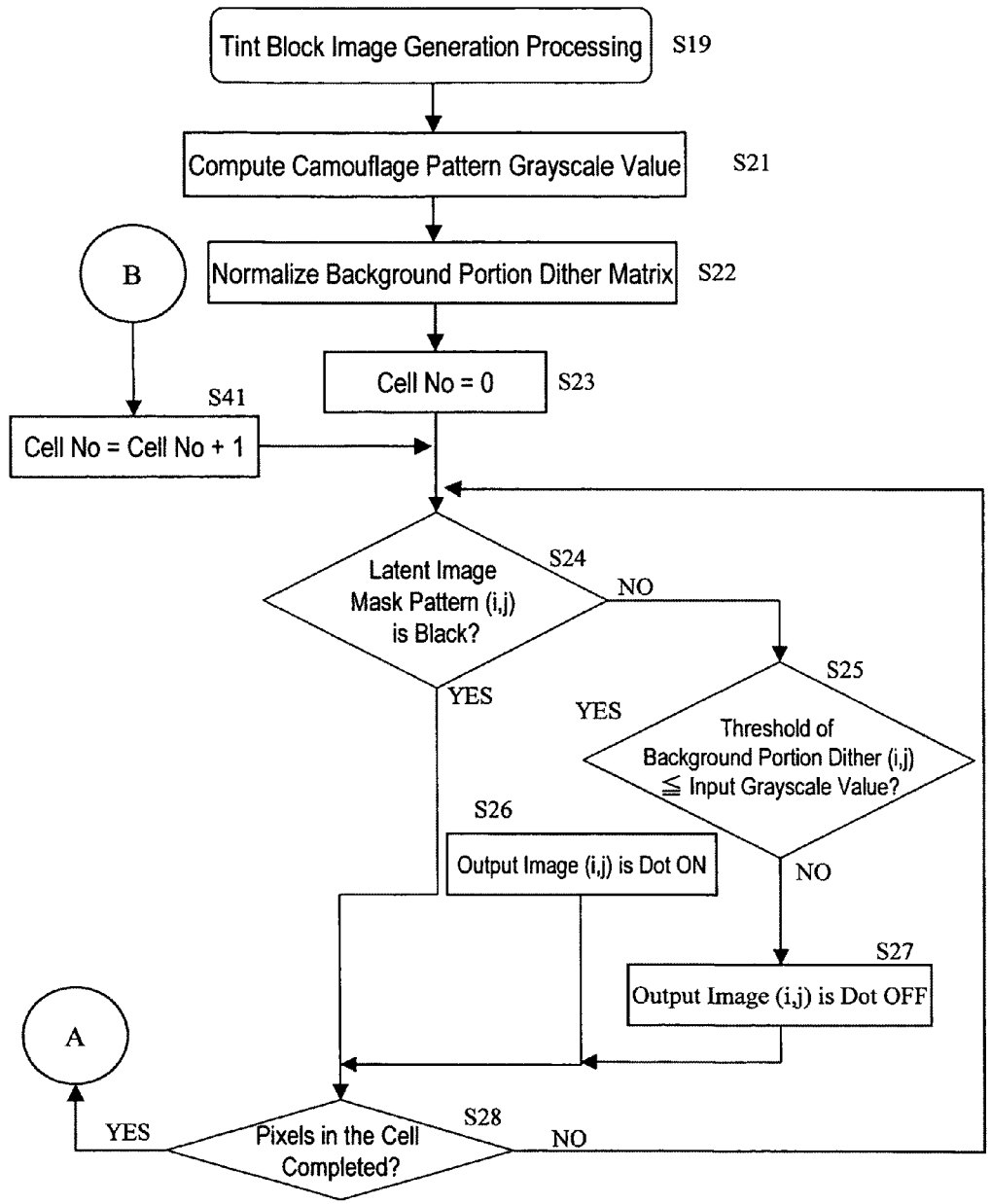
FIG. 19 is a flow chart depicting a tint block image generation processing according to the present embodiment.
Figure 20:
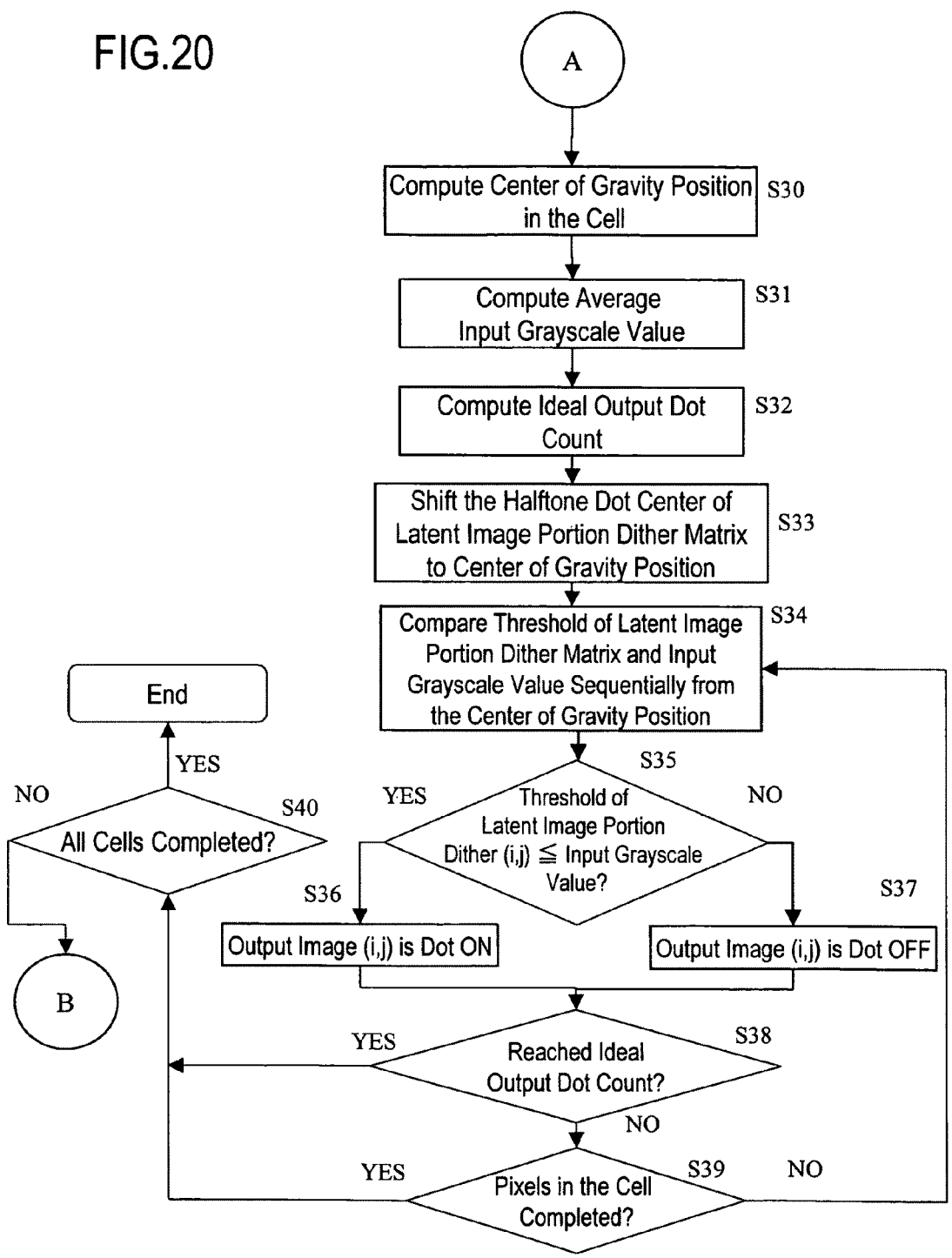
FIG. 20 is a flow chart depicting a tint block image generation processing according to the present embodiment.

FIG. 19 and FIG. 20 are flow charts depicting the tint block image generation processing according to the present embodiment. The tint block image generation processing S19 in FIG. 16 is shown in the flow charts in FIG. 19 and FIG. 20. First the corrected camouflage pattern data is generated by correcting the grayscale values of the camouflage pattern data based on the input grayscale values of the latent image portion and the background portion (S21). This procedure corresponds to the procedure S3 in FIG. 9. In other words, if a grayscale value of the camouflage pattern is A (0, 255), and an input grayscale value of the latent image portion and the background portion constituting the tint block is In (1≤In≤254), then the grayscale value Ai of the corrected camouflage pattern is computed by the above Expression (1). If the camouflage pattern is not used, the grayscale value of the camouflage pattern is set to "255", so that the corrected camouflage pattern grayscale value becomes the same as the input grayscale value In in the computation of Expression (1).

In step S16 to set the input grayscale values of the tint block image in FIG. 16, the input grayscale was set to "255" in the background portion, and the input grayscale was set to In=170 in the latent image portion. If different input grayscales are set for the background portion and the latent image portion in this way, input grayscales In to be modulated must be different between the latent image portion and background portion according to the latent image mask pattern, when the corrected camouflage pattern grayscale data is computed by Expression (1). This is because the latent image portion dither matrix 33 and background portion dither matrix 34 have different output density characteristics as shown in FIG. 15.

Therefore according to the present embodiment, a common input grayscale In=170 is used for both the latent image portion and background portion to simplify the computation. However, the background portion dither matrix 34 is normalized so that the maximum output density (12%) is implemented when the input grayscale is In=170 (e.g. FIG. 20), and screen processing is performed referring to the normalized background portion dither matrix.

Or, as in the later mentioned variant form of the present embodiment (FIG. 37), the input grayscales are set to the maximum value of the possible grayscale values (e.g. 255) for both the latent image portion and background portion, and the latent image portion dither matrix 33 is normalized so that the output density (12%) corresponding to the input grayscale value In=170 is implemented at the input grayscale value "255". In other words, the characteristics of the input grayscale values 0 to 170 of the latent image portion dither matrix and output densities thereof in FIG. 13 and FIG. 15 are normalized by the input grayscale value 0 to 255.

Now the case when the input grayscale In=170 is set will be described. In step S21, the grayscale value data of the corrected camouflage pattern, when the input grayscale In=170, is computed based on Expression (1). Then the printer driver 32 normalizes the background portion dither matrix 34 in FIG. 14 and FIG. 15 so as to generate the normalized background portion dither matrix (S22).

Figure 21:
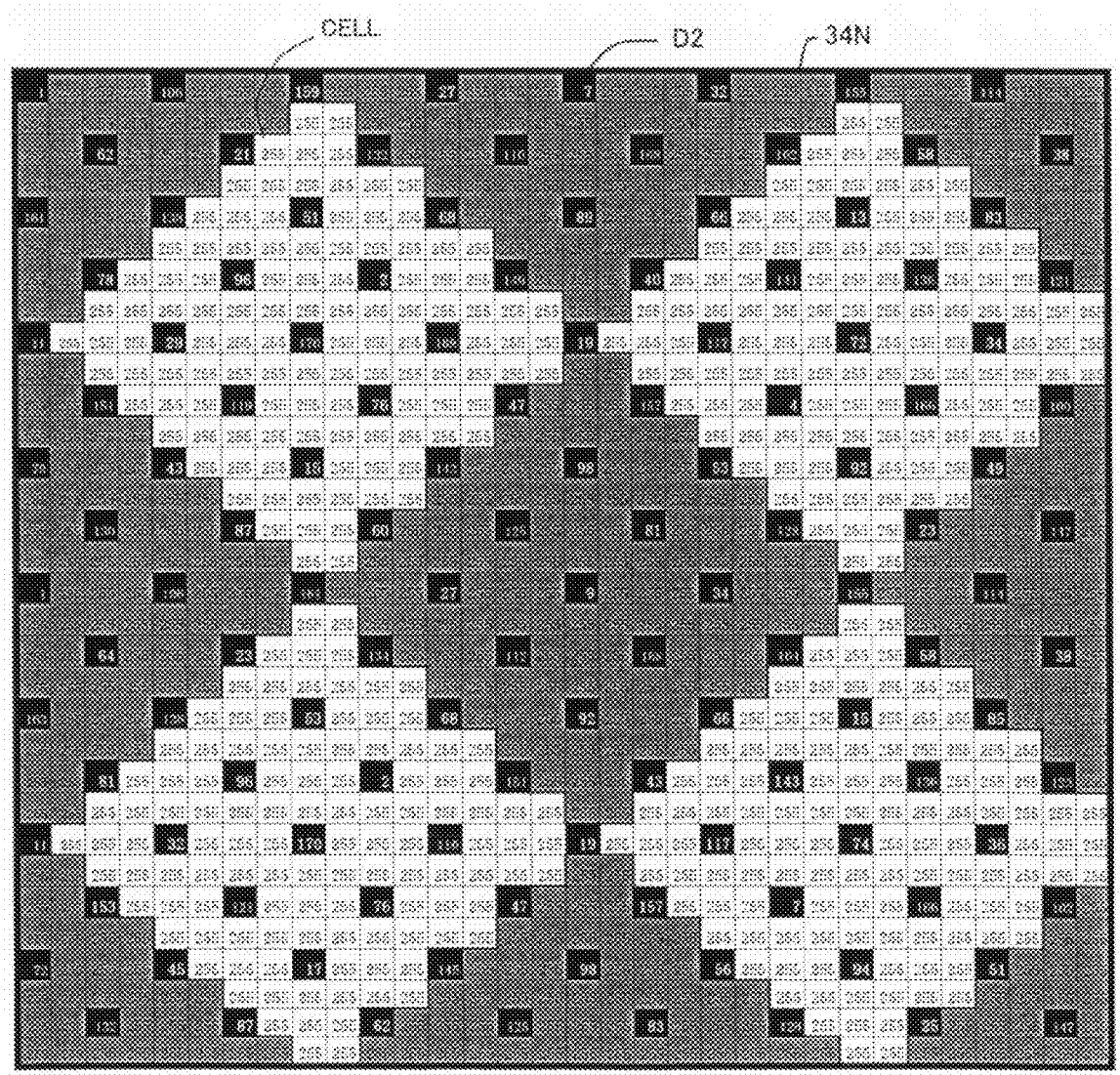
FIG. 21 shows a normalized background portion dither matrix 34N.

FIG. 21 shows the normalized background portion dither matrix 34N. The thresholds 0 to 254 in the black pixels at the positions of the displacement vectors (−2, 2) and (2, 2) of the background portion dither matrix 34 in FIG. 14 are normalized to new thresholds 0 to 170 (=In) using the following Expression (2).

$$\text{Normalized threshold} = (\text{threshold}/254) \times In \qquad (2)$$

Therefore in the normalized background portion dither matrix 34N in FIG. 21, the thresholds in the black pixels are replaced with 0 to 170, and a dot is generated in all the black pixels and the output density becomes the maximum output density (12% of solid black) when the input grayscale value is "170".

Figure 22:
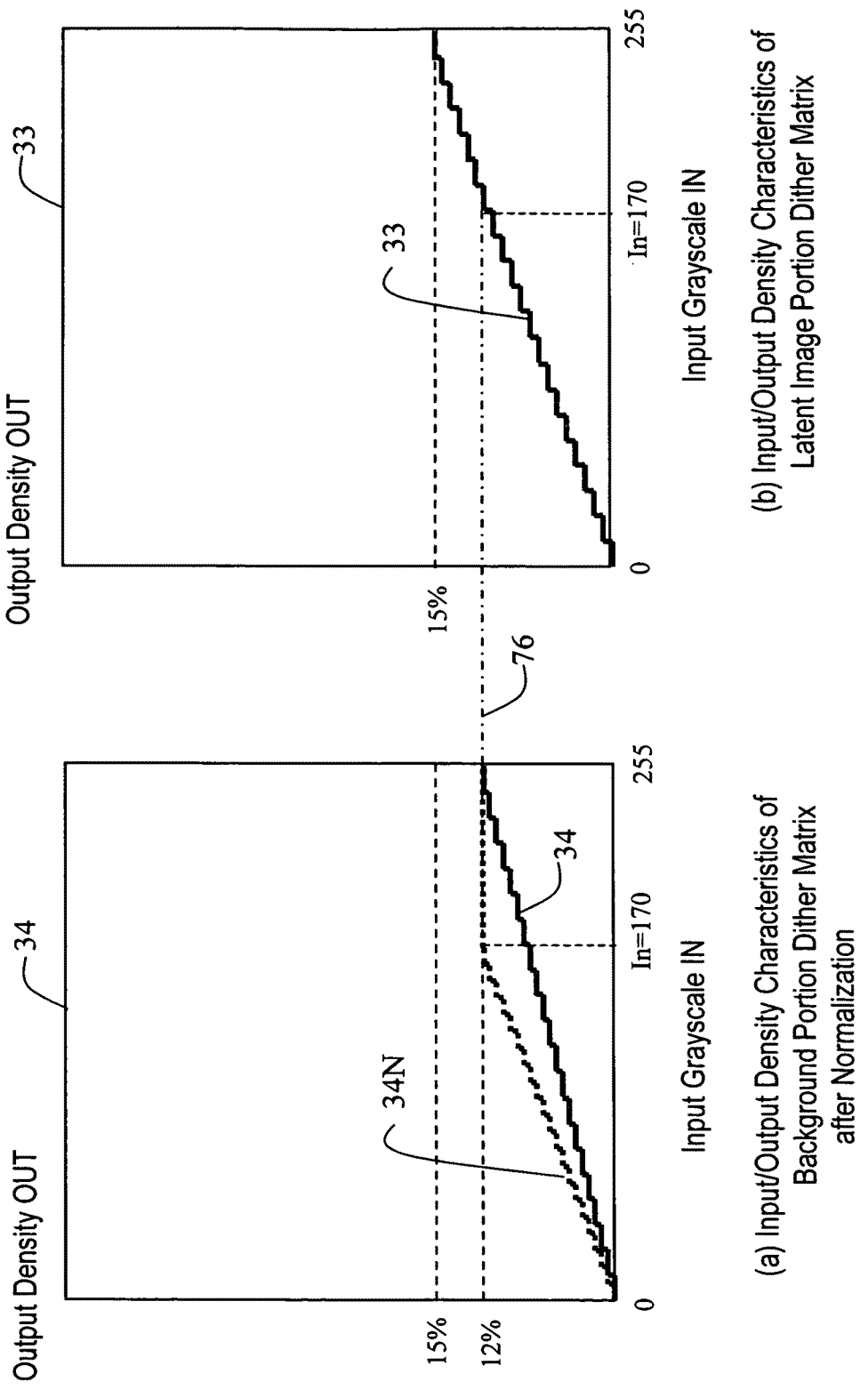
FIG. 22 shows the input/output density characteristics of the normalized background portion dither matrix and background portion dither matrix before normalization, and the latent image portion dither matrix.

FIG. 22 shows the input/output density characteristics of the normalized background portion dither matrix, the background portion dither matrix before normalization, and the latent image portion dither matrix. The output density characteristics of the background portion dither matrix 34 and the latent image portion dither matrix 33 are the same as FIG. 15. In the above mentioned example, the input grayscale "255", to generate a dot in all the pixels corresponding to the elements on the displacement vectors, is used for the background portion, and the input grayscale value In=170, which can generate the same output density as the background portion, is used for the latent image portion. Therefore, in order to use the input grayscale value In=170 for the background portion as well, the background portion dither matrix 34 is normalized with the input grayscale value In=170 so as to generate the normalized background portion dither matrix 34N shown by the characteristics of the broken line 34N in FIG. 22. The normalized background portion dither matrix 34N can be easily computed using the above mentioned Expression (2).

The input grayscale value In of the latent image portion may fluctuate due to age deterioration of the engine. By generating the normalized background portion dither matrix 34N using the input grayscale value In when fluctuation occurs, age deterioration can be absorbed.

Referring back to FIG. 19 and FIG. 20, screen processing is performed on the corrected camouflage pattern grayscale data referring to the latent image portion dither matrix 33 or normalized background portion dither matrix 34N according to the latent image mask pattern, so as to generate the tint block image data with a camouflage pattern (S23 to S41). This tint block image data with a camouflage pattern is image data which indicates dot ON or dot OFF for each pixel. The screen processing is performed for each cell which partitions the halftone dot generation area of the latent image portion dither matrix 33.

The latent image portion dither matrix 33 in FIG. 13 is comprised of 8 cells CELL, which do no overlap, with the black element of the 2 displacement vectors (8, 8) and (−8, 8) as a center (halftone dot center). And in each cell CELL, a large dot D1, which is a halftone dot, is formed. Cells CELL shown in the latent image portion dither matrix 33 in FIG. 13 are 8 rhombus areas, each of which is formed of 128 elements, of which centers are coordinate positions (0, 0), (16, 0), (8, 8), (8, 24), (0, 16), (16, 16), (8, 24) and (24, 24) as indicated by a black element D1, when the upper left corner element of the latent image dither matrix 33 is an origin (0, 0). The cell areas A to H are shown in the matrix, which indicates the latent image mask pattern 10 in FIG. 24. Areas other than A to H form cells together with adjacent areas at the dither matrix side. The cells CELL are also shown in the normalized background portion dither matrix 34N in FIG. 21.

FIG. 23 is a diagram depicting the tint block image generation processing in FIG. 19 and FIG. 20. FIG. 23A shows a tint block image where a plurality of latent image mask patterns 10 are arranged in a square in an A4 print size 60. In the case of the pixels in the A4 size, there are 4720 dots in the horizontal direction and 6776 dots in the vertical direction. FIG. 23B shows the positional relationship of the latent image mask pattern 10 at the upper left of FIG. 23A, and the camouflage pattern 12 arranged as tiles. The latent image mask pattern 10 is a square pattern having 2030 dots of pixels in the horizontal direction and 2030 dots of pixels in the vertical direction. The camouflage pattern 12, on the other hand, is a square pattern having 215 dots of pixels in the horizontal direction, and 215 dots of pixels in the vertical direction, as shown in FIG. 23C.

FIG. 23D is an enlarged view of the upper left edge of FIG. 23C. The latent image portion dither matrix 33 and the background portion dither matrix 34 are both 32 cell×32 cell matrices, and each matrix is pasted like a tile sequentially from the upper left. In the screen processing of the latent image portion, however, the latent image portion dither matrix is shifted and corresponded to the pixels such that the halftone dot center of the dither matrix is superimposed on the center of gravity position in the cell.

The printer driver compares the grayscale values of the corrected camouflage pattern and the thresholds of the dither matrices 33 and 34, and if the grayscale value is the threshold or more, the pixel dot is set to ON, and if the grayscale value is less than the threshold, the pixel dot is set to OFF. The grayscale values of the corrected camouflage pattern are set only in a 0 to 254 range. Or if the input grayscale value is 255, such pixel dots are all set to OFF. The comparison target dither matrix is selected corresponding to black or white of the latent image mask pattern.

The tint block image generation processing of the present embodiment includes a screen processing for the background portion (S25 to S28 in FIG. 19), and the screen processing for the latent image portion (S30 to S39 in FIG. 20) for each cell (S23, S40 and S41), and the respective screen processing's are different. First cell No=0 is set as an initial value (S23).

[Screen Processing for Background Portion]

The screen processing for the background portion shown in FIG. 19 will be described. First if the latent image mask pattern is not black at a pixel (i, j) (NO in S24), the pixel is in a background portion, so the corrected camouflage pattern grayscale value In and the threshold of the corresponding element of the normalized background portion dither matrix 34N are compared (S25). If the corrected grayscale value Ai is the threshold or more, the tint block image data (i, j) becomes dot ON (S26), and if the corrected grayscale value Ai is less than the threshold, the tint block image data (i, j) becomes dot OFF (S27). If the latent image mask pattern is black (YES in S24), no operation is performed since this pixel is in the latent image portion. The above mentioned processing is performed for all pixels in the cell (S28), and each pixel of the background portion of the cell is set to either dot ON or dot OFF.

By the above processing, in the background portion of the cell, a number of second dots corresponding to the corrected camouflage pattern grayscale value Ai are generated in the pixels corresponding to the black elements at the positions of the displacement vectors (−2, 2) and (2, 2).

[Screen Processing for Latent Image Portion]

The screen processing for the latent image portion of a cell is performed according to the flow chart in FIG. 20. The screen processing for the latent image portion, which is more complicated than the background portion, will be described using an example. The screen processing for the latent image portion is similar to the processing disclosed in Patent Document No. WO2005/109851.

Figure 24:
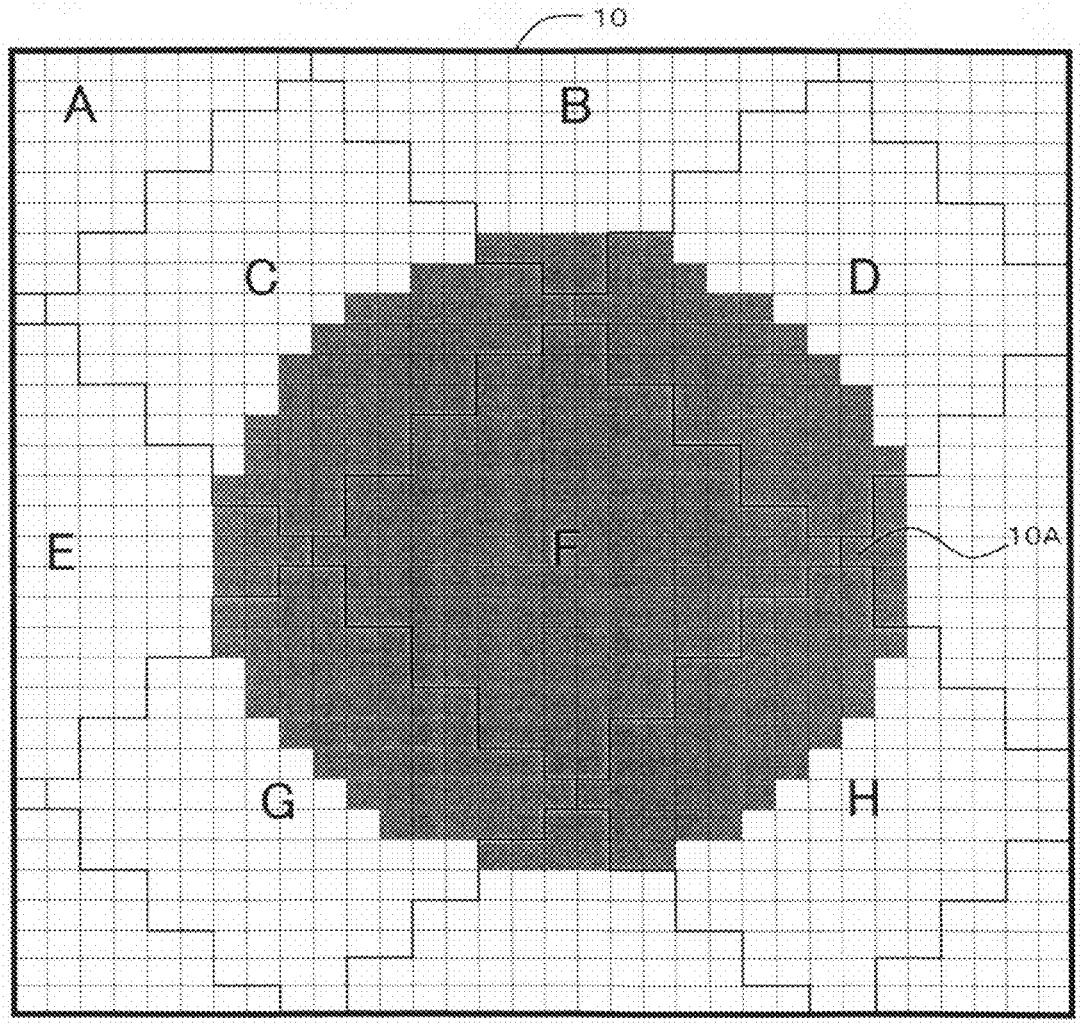
FIG. 24 shows an example of a latent image mask pattern.

FIG. 24 shows an example of the latent image mask pattern. The latent image mask pattern 10 is formed in a 32×32 matrix. Inside the pattern 10A corresponds to the latent image portion and outside the pattern 10A corresponds to the background portion. Therefore in the matrix data of the latent image mask pattern, each pixel of the 32×32 matrix has 1 bit of either "0" (latent image portion) or "1" (background portion). In the latent image mask pattern 10, 8 cells A to H are shown.

Figure 25:
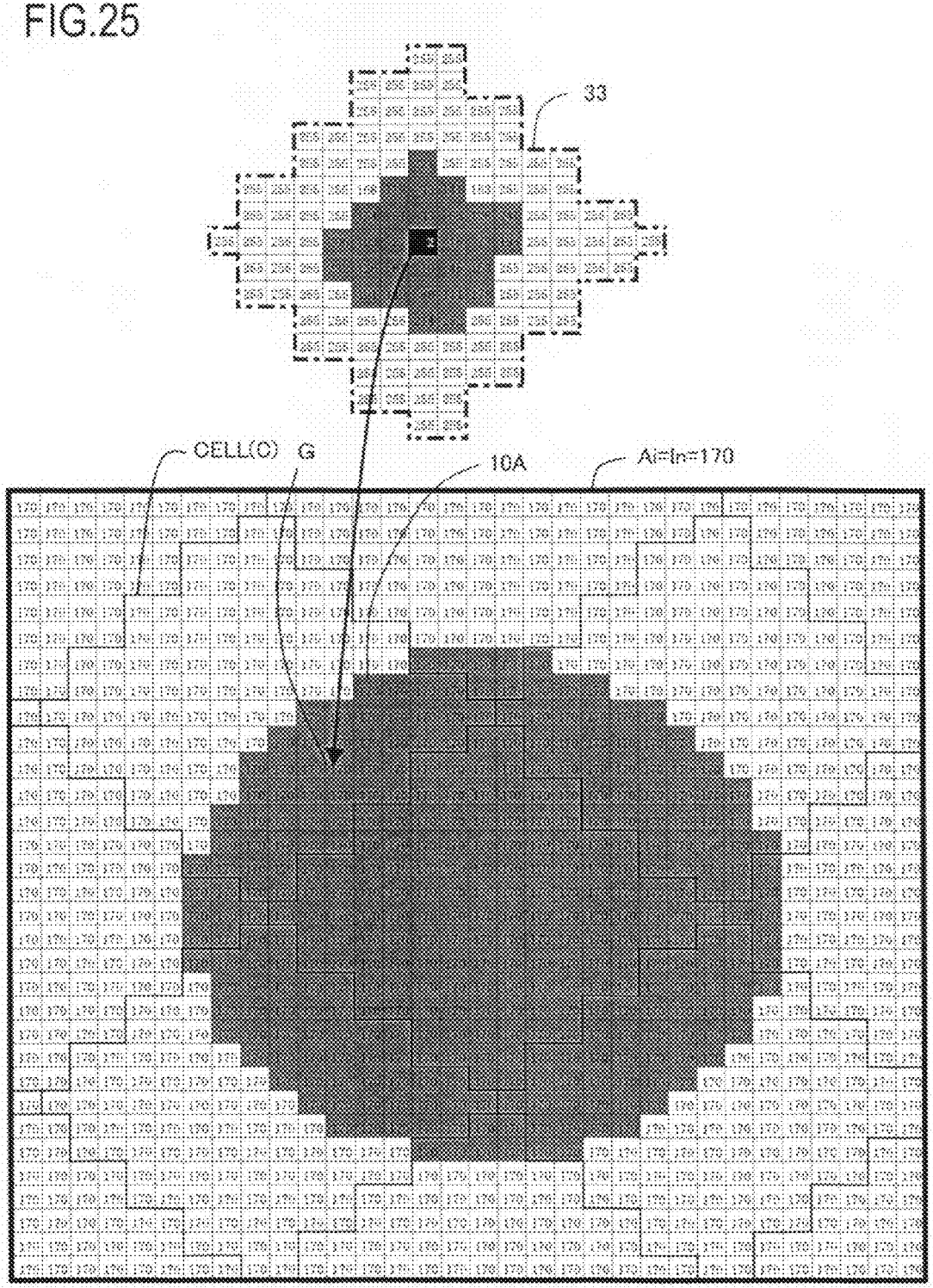
FIG. 25 shows a corrected camouflage pattern grayscale value data Ai.

FIG. 25 shows the corrected camouflage pattern grayscale value data Ai. To make understanding easier, the grayscale value Ai is written in each element of the 32×32 matrix. This example does not use a camouflage pattern, hence the corrected camouflage pattern grayscale value Ai is the same as the input grayscale value In=170 based on Expression (1).

According to the flow chart in FIG. 20, the center of gravity position in a cell is computed for the image of the latent image portion (S30). The center of gravity coordinates in the cell (X (center of gravity) and Y (center of gravity I)) are computed using the following Expressions (3) and (4). For the "grayscale value of a pixel" and the "grayscale value in a cell", the corrected camouflage pattern grayscale value Ai is used if it is a pixel in the latent image portion indicated by the latent image mask pattern, and the grayscale value 0 is used if it is a pixel in the background portion.

$X$(center of gravity)=$\Sigma\{$($X$ coordinate of each pixel)× (grayscale value of each pixel)$\}$/total of grayscale values in cell  (3)

$Y$(center of gravity)=$\Sigma\{$($Y$ coordinate of each pixel)× (grayscale value of each pixel)$\}$/total of grayscale values in cell  (4)

In the case of the example in FIG. 25, the coordinate of the center of gravity G of the image in the latent image portion in the cell CELL (C) is (2.7, 2.5).

Then the average input grayscale value in the cell is computed (S31). This computation is based on the following Expression (5). For "the grayscale value of a pixel", the corrected camouflage pattern grayscale value Ai is used if it is a pixel in the latent image portion, and the grayscale value O is used if it is a pixel in the background portion. The number of elements in the cell is 128.

$$\text{Average input grayscale value} = \Sigma(\text{grayscale value of each pixel})/\text{number of elements in the cell} \quad (5)$$

In the case of the cell CELL (C) in the corrected camouflage pattern grayscale value Ai in FIG. 25, for example, the number of gray elements which indicate the latent image portion (latent image mask pattern 10A) in the cell CELL (C) is 46, and the grayscale value Ai of each element is 170, so the average input grayscale value is 46×170/128=61.09 according to the above Expression (5).

Then it is assumed that the above average input grayscale value "61.09" is input to all pixels in the cell, and the number of dots which are generated based on the comparison result of the average input grayscale value and the thresholds of the latent image portion dither matrix 33 is counted. This dot count becomes the ideal output dot count which indicates the upper limit value of the number of dots that should be generated in the latent image portion of the cell (S32). This is because the average input grayscale value corresponds to the output density of the latent image portion in the cell.

Figure 26:
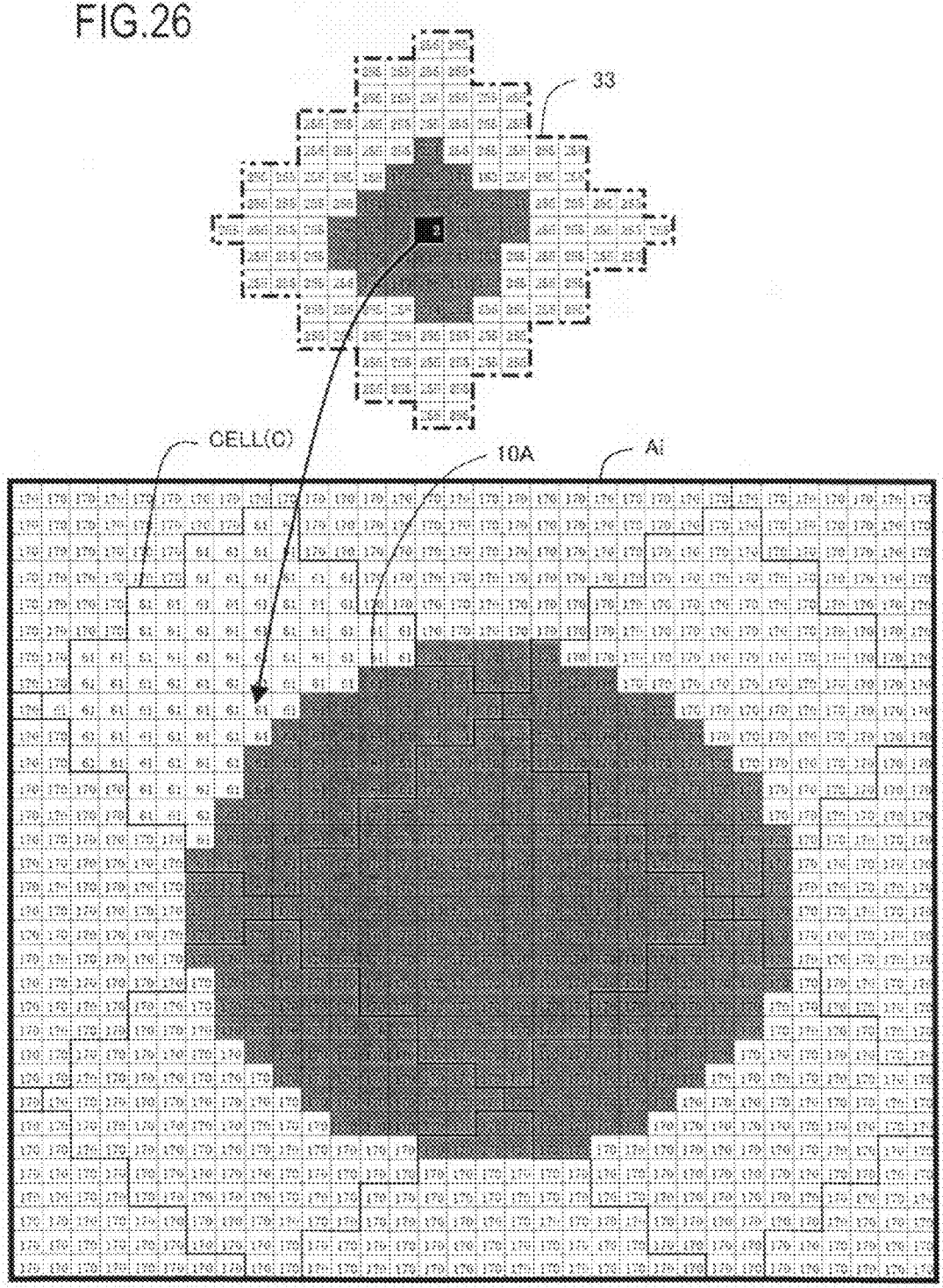
FIG. 26 describes the ideal output dot computing processing.

FIG. 26 is a diagram depicting count processing for the ideal output dot count. Each pixel in the cell CELL (C) is the average input grayscale value "61". In this state, the element at the center of the latent portion dither matrix 33 is corresponded to the pixel at the center of the cell CELL (C) and the thresholds of the latent portion dither matrix and the average input grayscale value "61" are compared, then the ideal output dot count which satisfies average input grayscale value≥latent image portion dither matrix 33 threshold is 8.

Then the latent image portion dither matrix 33 is shifted so that the center element of the halftone dot of the latent image portion dither matrix 33 matches the position of the center of gravity G (S33), the corrected camouflage pattern grayscale value Ai and the threshold of the latent image portion dither matrix 33 are compared (S34 and S35), and screen processing to set a pixel of Ai≥threshold to dot ON (S36) and a pixel of Ai<threshold to dot OFF (S37) is repeated until the number of generated dots reach the ideal output dot count (=8) (YES in S38), or processing is completed for the pixels in the cell (YES in S39).

In this case, the latent image portion dither matrix 33 is shifted so that the center element of the halftone dot of the latent image portion dither matrix 33 matches with the position of the center of gravity G, but the latent image portion dither matrix 33 may be shifted so that the center element of the halftone dot of the latent image portion dither matrix 33 matches with a position shifted from the center in the latent image in the cell.

In other words, as FIG. 25 shows, the center of gravity G of the latent image portion in the cell CELL (C) and the center element of the halftone dot of the latent image portion dither matrix 33 are corresponded, and the corrected camouflage pattern grayscale value Ai=170 and the threshold of the latent image portion dither matrix 33 are compared in a sequence of a pixel closer to the center of the halftone dot (center of gravity). Then a dot is generated in a pixel of Ai≥threshold. The upper limit of the number of dots generated in the cell is the ideal output dot count.

The above mentioned screen processing in the latent image portion has the following merits. Firstly, the average of the input grayscale values in the latent image portion in the cell is determined to determine the ideal output dot count, then the center element of the halftone dot of the dither matrix is shifted to the center of gravity position of the image of the latent image portion, and dots are generated with the ideal output dot count as the upper limit, so the density of the latent image portion is reproduced with certainty. Secondly, the center element of the halftone dot of the dither matrix is shifted to the center of gravity position, so the dots concentrated at the center of the gravity position of the latent image portion in the cell (first dots D1) can be generated, and therefore the first dots D1 in the latent image portion and the second dots D2 in the background portion are never combined. Thirdly, the center element of the halftone dot is shifted to the center of gravity position, so dots can be generated in the latent image portion in the cell even if the background portion or a dot OFF camouflage pattern occupies the center area of the cell, and no low density enhanced area is generated in the boundary with the background portion.

The screen processing for the background portion (S25 to S28 in FIG. 19) and the screen processing for the latent image portion (S30 to S39 in FIG. 20) are repeated until the processing is completed for all the cells (S40).

The generated tint block image data and the print target image data 36 are combined as follows.

After the print target image data is converted from the RGB bit map data having RGB grayscale values into CMYK bit map data having printer colors, the tint block image is combined with the bit map data having a color of the tint block specified by the user (one of cyan, magenta and black, in the case of this example), out of the CMYK bit map data of the print target image data.

In this combining method, the dot ON data of the tint block image is converted into the grayscale value corresponding to the maximum density of the above mentioned bit map data, and the dot OFF data is converted into the grayscale value corresponding to the minimum density "0" of the bit map data. In the printer, if the values of RGB are 8-bit grayscale values respectively, then the grayscale value corresponding to the maximum density is "255", and the grayscale value corresponding to the minimum density is "0". This tint block image data converted into the maximum grayscale value or the minimum grayscale value is overwritten by the grayscale data of the pixels having a grayscale value greater than the grayscale value "0" in the bit map data of the specified tint block color of the print target image data. By this, the tint block image is formed in the pixels having the grayscale value "0" in the print target image, and the print target image is generated in other pixels.

Another combining method is overwriting the tint block image data on the bit map data with the specified tint block color of the print target image data. For example, if the print target image data is data to generated a black character, the CMY bit map data has the grayscale value "0" in all the pixels. Therefore the bit map data with the specified tint block color, out of CMY, does not have information of the print target image data, so all bit map data having this color is replaced with the tint block image data.

The combining method is not limited to the above mentioned overwriting, but may blend the print target image and the tint block image at a predetermined ratio based on the type of image (e.g. text, image, graphic) and the grayscale value of each pixel of the print target image data. The tint block data may be overwritten only on a portion where the grayscale value of the print target data is "0" for all of CMYK out of the bit map data having the specified tint block color, that is, a portion where an image is not formed on the print medium based on the print target image data.

The combined image data is printed on the print medium via ordinary binary processing (screen processing) of a printer.

Out of the combined image data, the portion comprised of only the tint block image is comprised of pixels having the maximum density grayscale value and the minimum grayscale value, so regardless what the threshold matrix of the screen processing is like, the grayscale is converted such that the density value of the portion having the maximum density "255" remains as this density value, and the portion having the minimum density "0" remains as density "0" even after screen processing. As a result, the tint block image generated in the tint block generation processing is printed on the print medium.

[Example of Tint Block Image without Camouflage Pattern]

Figure 27:
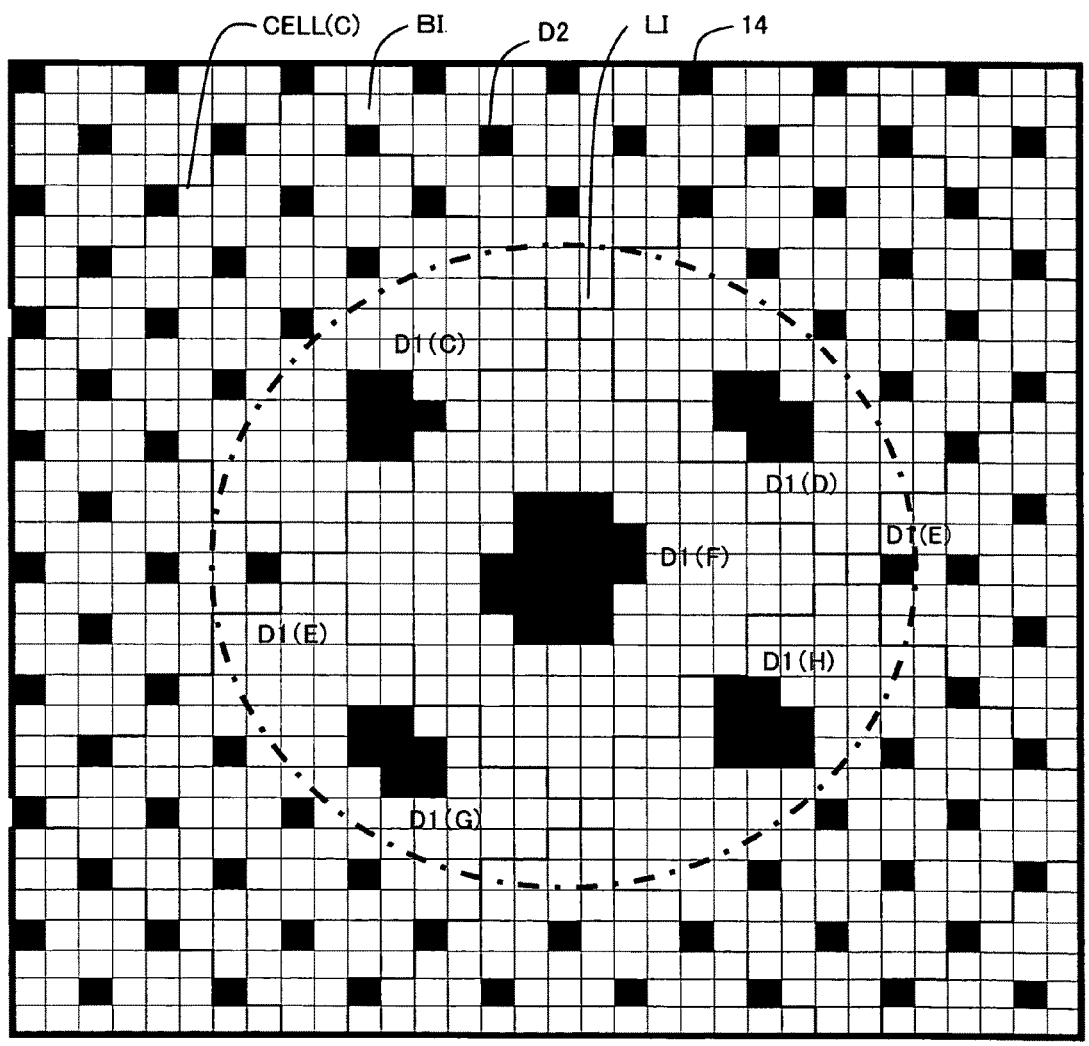
FIG. 27 shows an example of the tint block image generated by the screen processing of the present embodiment.

FIG. 27 shows an example of a tint block image generated by the screen processing of the present embodiment. The dispersed dots D2 having high screen ruling are generated in the background portion BI in the processing S24 to S28 in FIG. 19, and large dots D1 having low screen ruling are generated in each cell in the latent image portion L1 in the processing in FIG. 20. In the latent image portion LI inside the circle of the dash and dotted line, a large dot D1 having a size corresponding to the output density of the latent image in the cells is reproduced in each cell at the center of gravity position of the latent image in the cell. As a result, a large dot D1 (F) having a size corresponding to the input grayscale value 170 (19 dots) is generated at the cell center in the cell F, and large dots D1 (C), D1 (D), D1 (E), D1 (G) and D1 (H), of which sizes are smaller than the large dot D1 (F), are generated in the peripheral cells C, D, E, G and H, at positions (center of gravity positions) shifted from the respective cell center. However, because of these large dots, the shape of the latent image LI becomes close to the latent image mask pattern.

Figure 28:
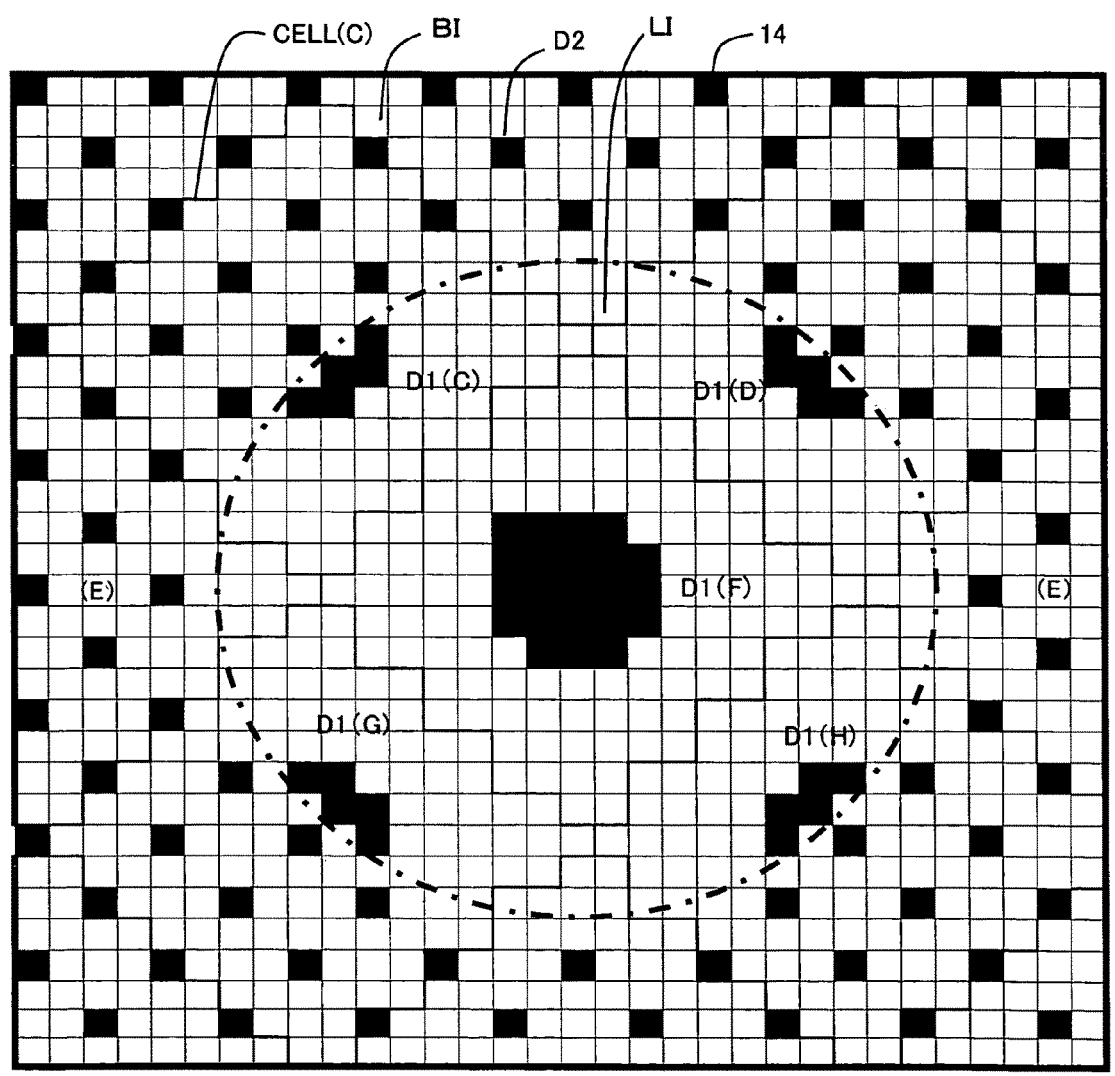
FIG. 28 shows an example of the tint block image generated by a general screen processing referring to the dither matrices 33 and 34N for both the latent image portion and the background portion.

FIG. 28 shows an example of the tint block image generated by a general screen processing referring to the dither matrices 33 and 34N for both the latent image portion and the background portion. In other words, this is a result when the center pixel of the cell and the center element of the halftone dot of the latent image portion dither matrix are corresponded for all cells, and screen processing is performed. As the comparison with FIG. 27 shows, in FIG. 28, the dots D1 (C), D1 (D), D1 (G) and D1 (H) generated in the cells C, D, G and H are smaller than those in FIG. 27, and are formed near the boundary with the background portion BI. The large dot D1 is not generated in the cell E. As a result, the small dot D2 in the background portion BI and the large dot D1 of the latent image portion are combined in the boundary area, and a high density enhanced area (cells C, D, G and H) is formed, or a low density enhanced area (cell E), where the large dot D1 is not generated, is formed.

[Example of Tint Block Image with Camouflage Pattern]

Figure 29:
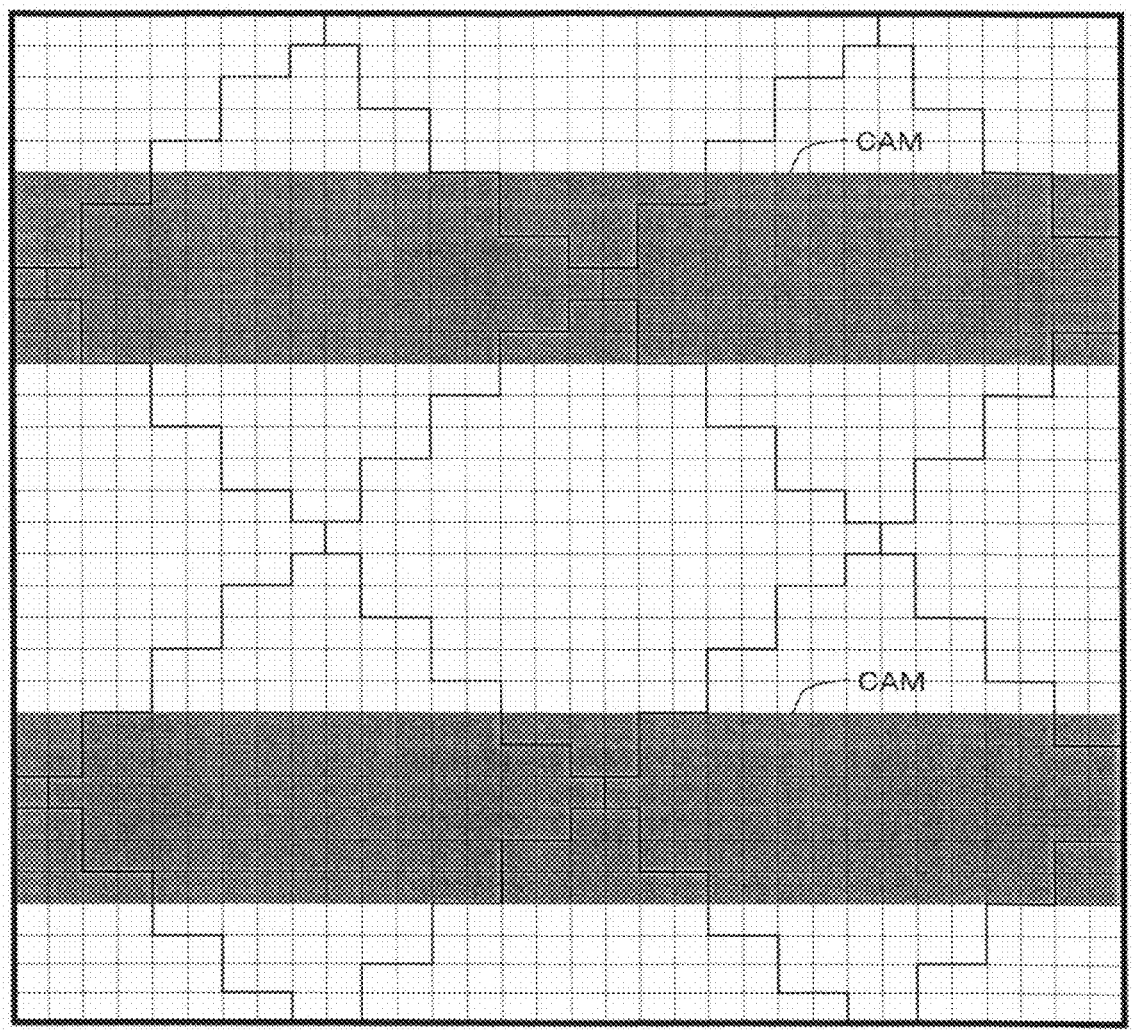
FIG. 29 shows an example of a camouflage pattern.

FIG. 29 shows an example of the camouflage pattern. This example is a camouflage pattern CAM comprised of 2 strips which stretches in horizontal directions. In the black portion, dots of the tint block are OFF.

Figure 30:
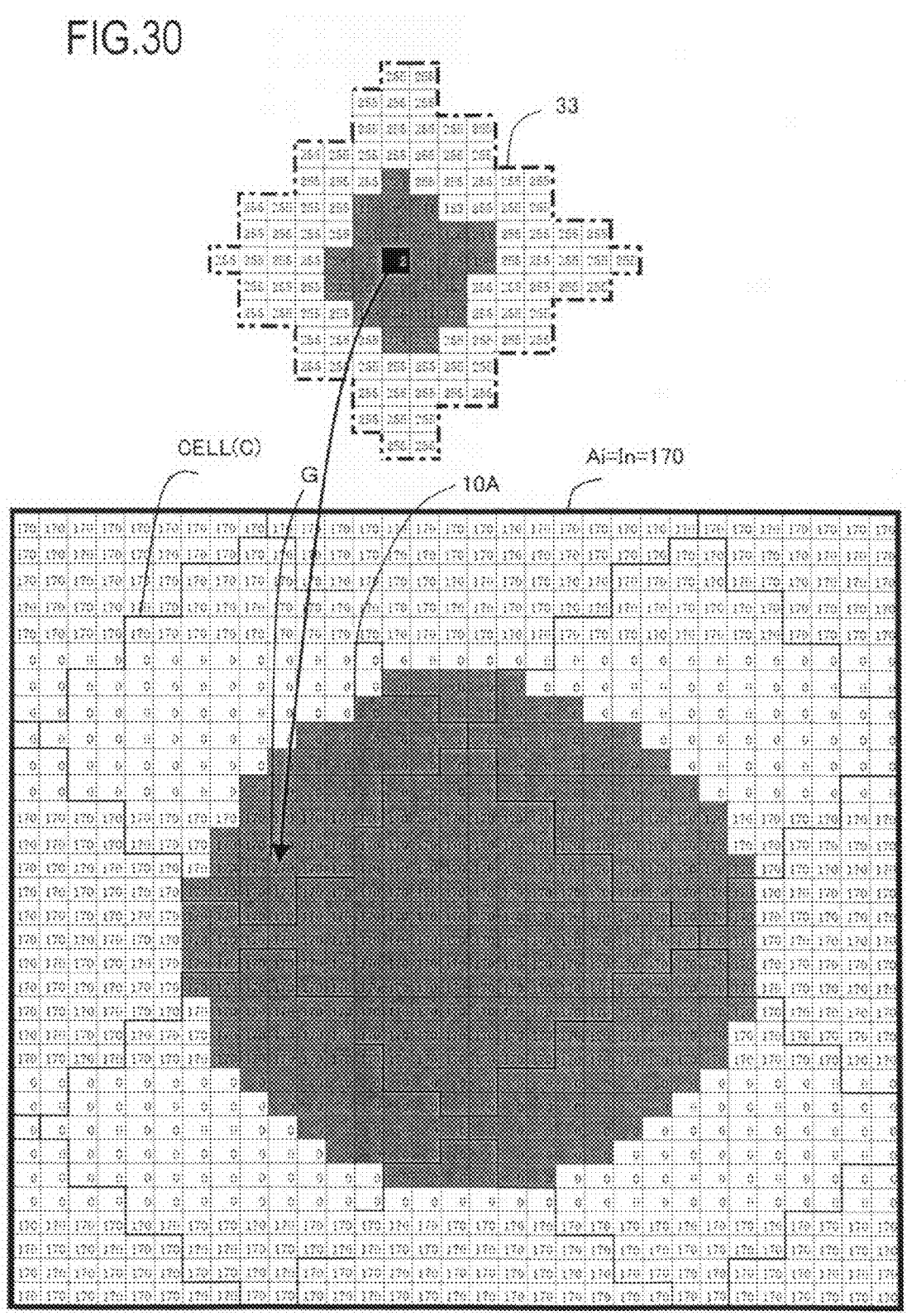
FIG. 30 shows corrected camouflage pattern grayscale values.

FIG. 30 shows corrected camouflage pattern grayscale values, which correspond to FIG. 25. If corrected camouflage pattern grayscale value Ai is determined with reflecting the camouflage pattern in FIG. 29, then Ai=0 in the camouflage area CAM and Ai=In=170 in the other area. FIG. 30 shows the relationship of the cells CELL, the latent image mask pattern 10A, and the corrected camouflage pattern grayscale value in the 32×32 matrix.

In the background portion area, small dots D2 are generated at each center position of the halftone dots according to the normalized background portion dither matrix 34N. In the latent image portion area, according to the procedure shown in FIG. 20, the center of gravity position of the latent image portion in the cell is determined, the average input grayscale value is computed, and the ideal output dot count is computed, the center of halftone dots of the latent image portion dither matrix is shifted to the center of gravity position G, the corrected camouflage pattern grayscale values and the thresholds of the shifted latent image portion dither matrix are compared, and dot ON/OFF is judged for each pixel.

Figure 31:
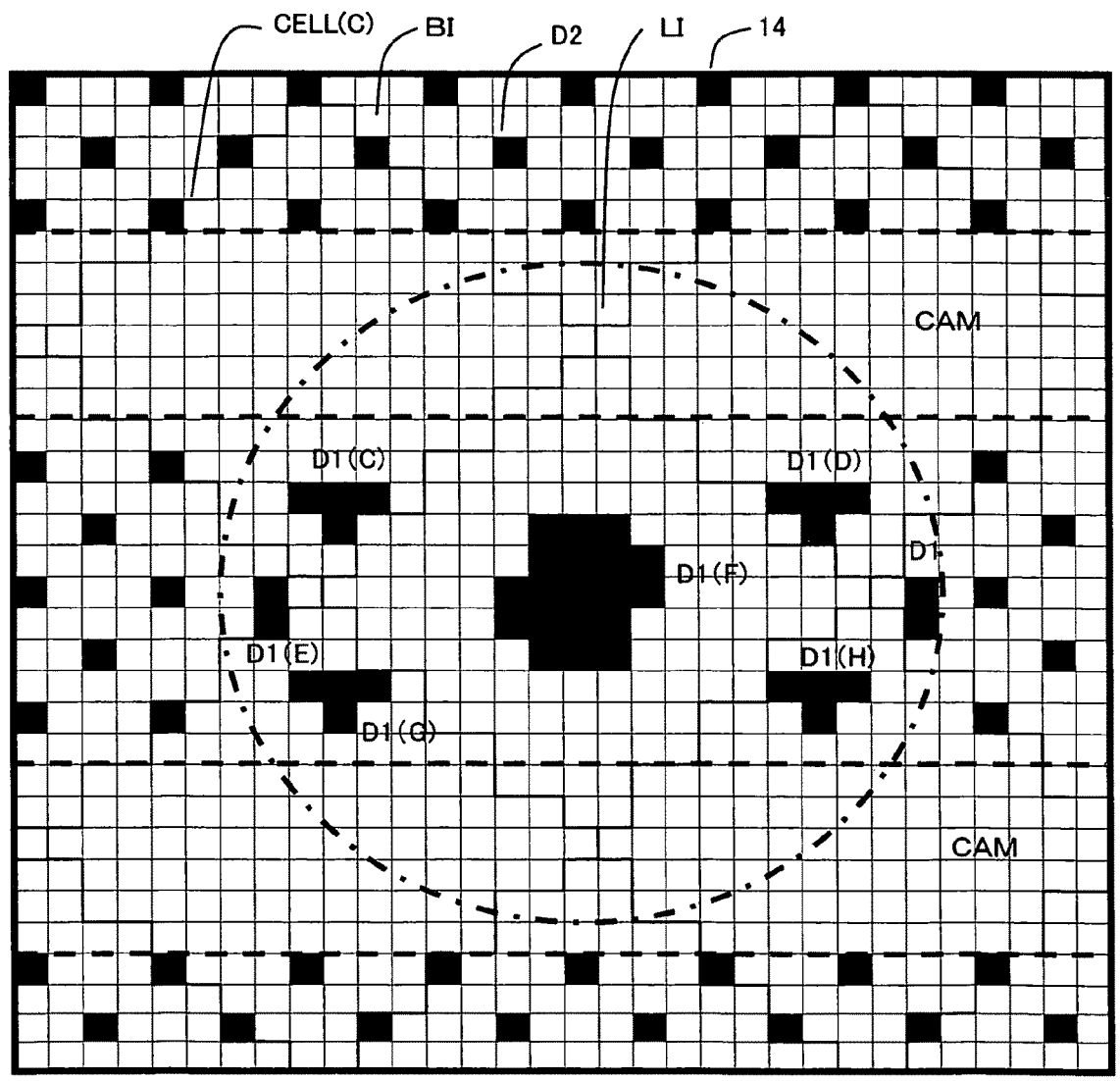
FIG. 31 shows an example of the tint block image generated by the screen processing of the present embodiment based on the corrected camouflage pattern thresholds in FIG. 30.

FIG. 31 shows an example of the tint block image generated by the screen processing of the present embodiment based on the corrected camouflage pattern threshold values in FIG. 30.

In cell A, all pixels are screened as the background portion. The thresholds of the dither matrix of the background portion have been normalized with the input grayscale values, as shown in FIG. 21 and FIG. 22, so dot D2 is generated only at the centers of the halftone dots of the background portion.

In cell B, the latent image portion area exists, but the corrected camouflage pattern grayscale value of the latent image portion is "0", because of the camouflage pattern, so dot D2 is generated only in the background portion.

In cell C, the corrected camouflage pattern grayscale values are generated in the background portion and latent image portion, and for the background portion, the same processing as cells A and B is performed. For the latent image portion, the center of gravity position is X center of gravity=1.1 and Y center of gravity=4.6, and the average input grayscale value is 29. Therefore, the thresholds of the latent image portion dither matrix 33 in FIG. 13 and the average input grayscale value "29" are compared, then the ideal output dot count to be generated is "4" dots. So the latent image portion dither matrix is shifted to the center of gravity position, and the screen processing is performed in the sequence of a pixel closer to the center of gravity, with the input grayscale as 170, then the dots of 4 pixels at the center, bottom, left and right become ON, and processing ends since the number of dots reaches the ideal output dot count of "4". In other words, a large dot D1 (C) comprised of 4 pixel dots is generated in the latent image portion LI in the cell CELL (C).

In the same way, the corrected grayscale values are also generated in the cell D, in the positions shown in the background portion and the latent image portion. Particularly in the latent image portion, X center of gravity=−1.0, Y center of gravity=4.6, and the average input grayscale value is 31, and the ideal output dot count is "4" dots. Therefore the 4 pixel dots at the center, bottom, left and right of the center of gravity position become ON, and processing ends since the number of dots reaches the ideal output dot count. As a result, a large dot D1 (D) comprised of 4 pixel dots is generated in the latent image portion LI in cell D.

In the same way, the corrected grayscale values are generated in cell E in the positions shown in the background portion and latent image portion. Particularly in the latent image portion, X center of gravity=6.7, Y center of gravity=0, the average input grayscale value is 9.3 and the ideal output dot count is "2". Therefore 2 pixel dots at the center and bottom of the center of gravity position become ON, and processing ends since the number of dots reaches the ideal output dot count. As a result, a large dot D1 (E) comprised of 2 pixel dots is generated in the latent image portion LI of cell E.

In cell F, the corrected grayscale values are generated only in the latent image portion. Here X center of gravity=0.2, Y center of gravity=0, the average input grayscale value is 154 and the ideal output dot count is "19". Therefore 19 pixel dots with the center of gravity position as the center become ON, and processing ends since the number of dots reaches the ideal output dot count. As a result, a large dot D1 (F) comprised of 19 pixel dots is generated in the latent image portion LI of cell F.

In cell G as well, the corrected grayscale values are generated in portions indicating the background portion and the latent image portion. Particularly in the latent image portion, X center of gravity=1.0, Y center of gravity=−5.0, the average input grayscale value is 31 and the ideal output dot count is "4". Therefore 4 pixel dots at the center, and bottom, left and right of the center of gravity position become ON, and processing ends since the number of dots reaches the ideal output dot count. As a result, a large dot D1 (G) comprised of 4 pixel dots is generated in the latent image portion LI of cell G.

Finally in cell H as well, the corrected grayscale values are generated in the positions of the background portion and the latent image portion. Particularly in the latent image portion, X center of gravity=−1.0, Y center of gravity=−5.0, the average input grayscale value is 31 and the ideal output dot count is "4". Therefore 4 pixel dots at the center, bottom, left and right of the center of gravity become ON, and processing ends since the number of dots reaches the ideal output dot count. As a result, a large dot D1 (H) comprised of 4 pixel dots is generated in the latent image portion LI of cell H.

As FIG. 31 shows, in an area of the circular latent image portion LI, excluding the dot OFF area of the camouflage pattern CAM, the first dots D1 are generated. Particularly in cells C, D, E, G and H, a large dot D1, which is smaller than the first dot D1 in cell F, is generated respectively.

Figure 32:
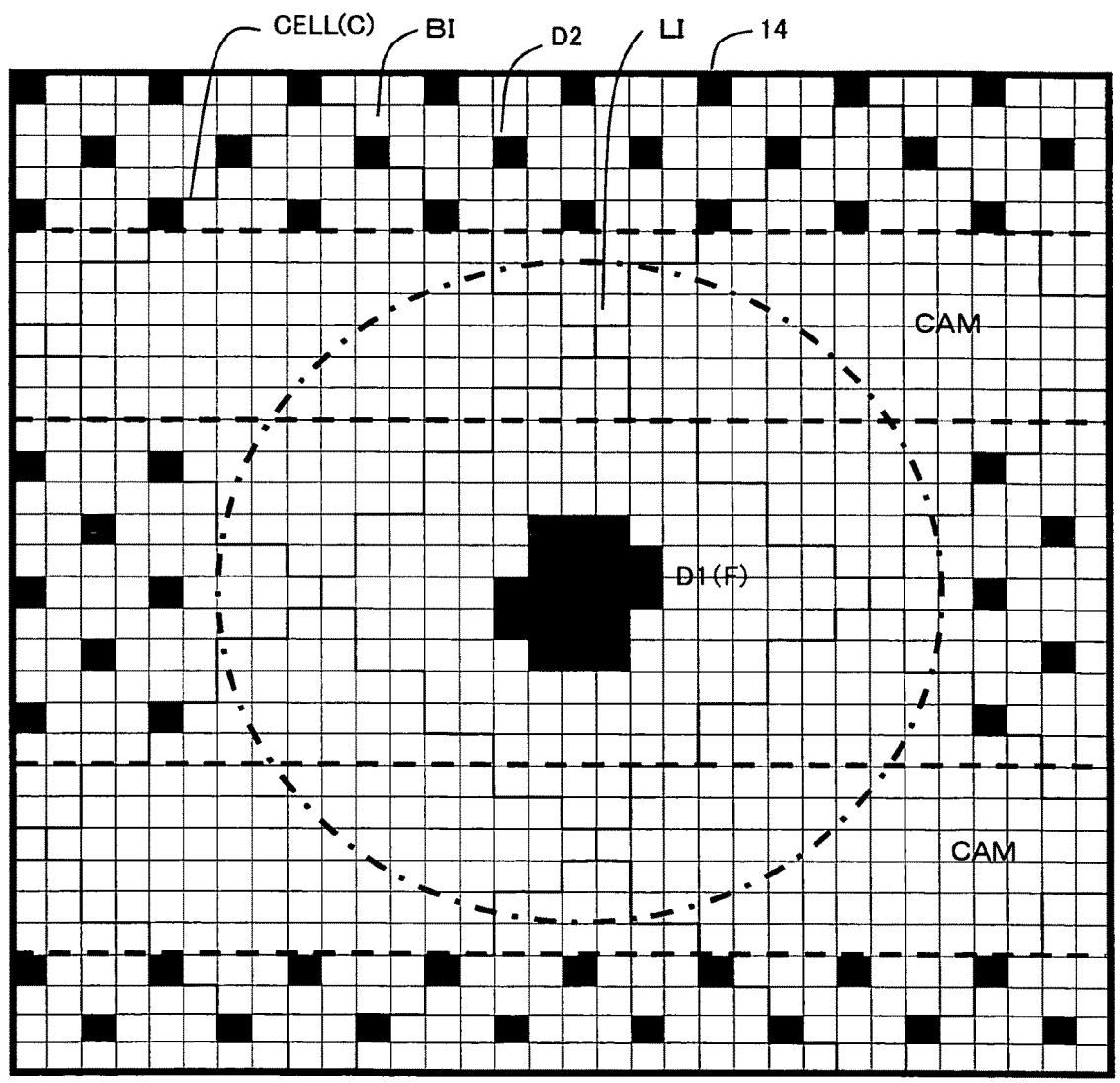
FIG. 32 shows an example of the tint block image generated by the general screen processing referring to the dither matrices 33 and 34N for both the latent image portion and background portion based on the corrected camouflage pattern thresholds in FIG. 30.

FIG. 32 shows an example of a tint block image generated by a general screen processing referring to the dither matrices 33 and 34N, concerning the corrected camouflage pattern thresholds in FIG. 30, for both the latent image portion and the background portion. As the comparison of FIG. 31 and FIG. 32 shows, in FIG. 32, a large dot D1 is not generated in cells C, D, E, G and H within the circle indicating the latent image portion LI. A large dot D1 is generated only in cell F. This means that in FIG. 32, space is generated in the boundary of the latent image portion and the background portion, and the low density (white) of this space is enhanced. In the case of FIG. 31 of the present embodiment, on the other hand, this low density area is not generated, and the shape of the latent image portion LI is reproduced accurately.

[Other Examples of Tint Block Image]

Figure 33A:
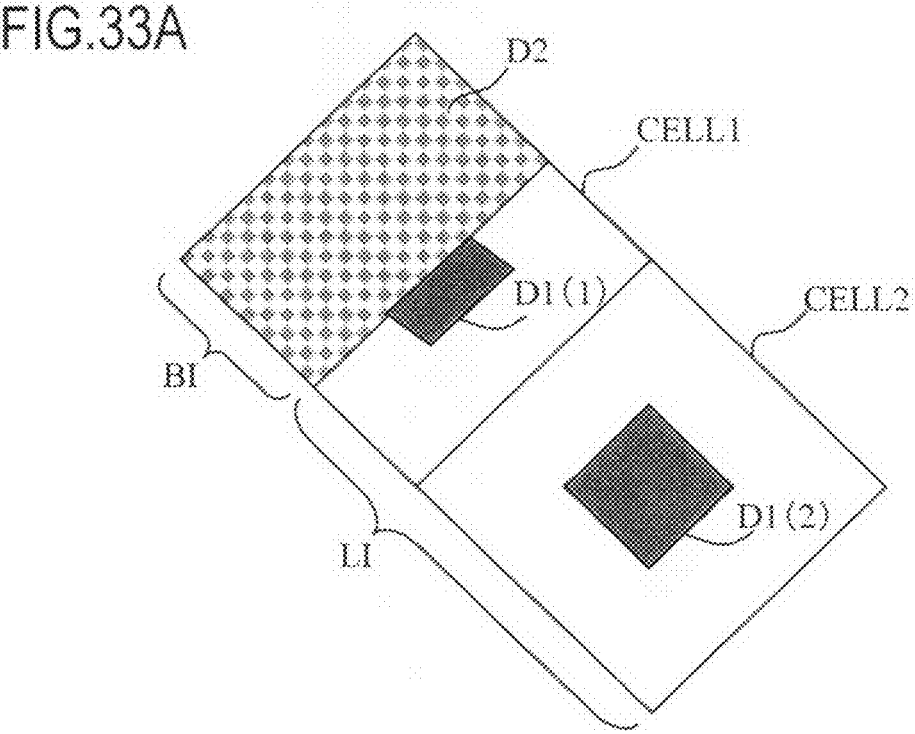
FIG. 33 shows a functional effect of the present embodiment on an example of a tint block image without a camouflage pattern.
Figure 33B:
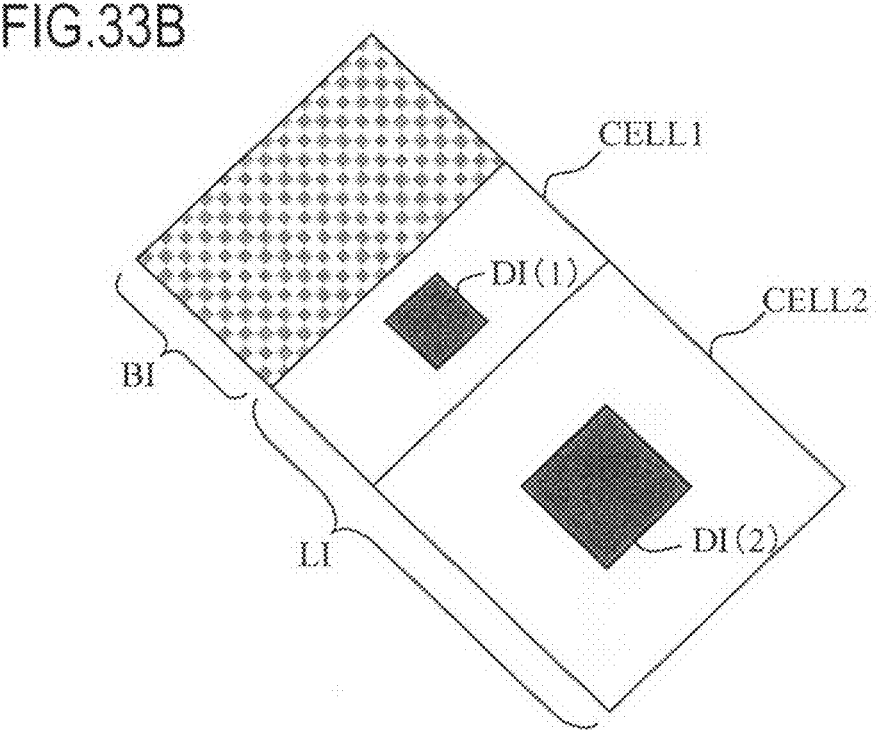

FIG. 33 shows an effect of the present embodiment on an example of a tint block image without a camouflage pattern. FIG. 33A is a tint block image generated by a general screen processing, and FIG. 33B is a tint block image generated by the screen processing of the present embodiment. In the cells CELL 1 and 2, the background portion BI and the latent image portion LI are positioned as illustrated. In the case of the general processing for FIG. 33A, small dots D2 are formed in the background portion BI of the cell CELL 1, and a large dot D1 (1) is formed in the latent image portion LI. The large dot D1 (1), which corresponds to a lower right part of the large dot D1 (2) in the cell CELL 2, is combined with the small dots D2 in the background portion BI. In the case of the processing for FIG. 33B of the present embodiment, on the other hand, small dots D2 are formed in the background portion BI of the cell CELL 1, and a large dot D1 (1) is formed in the latent image portion LI, at a position away from the background portion BI. In other words, the center of the halftone dot of the latent image portion dither matrix is shifted to the center of gravity position of the latent image portion LI, so the large dot D1 (1) is not combined with the small dots 2 of the background portion BI. Furthermore, the large dot D1 (1) has a size corresponding to the output density of the latent image portion LI of the cell CELL 1.

Figure 34A:
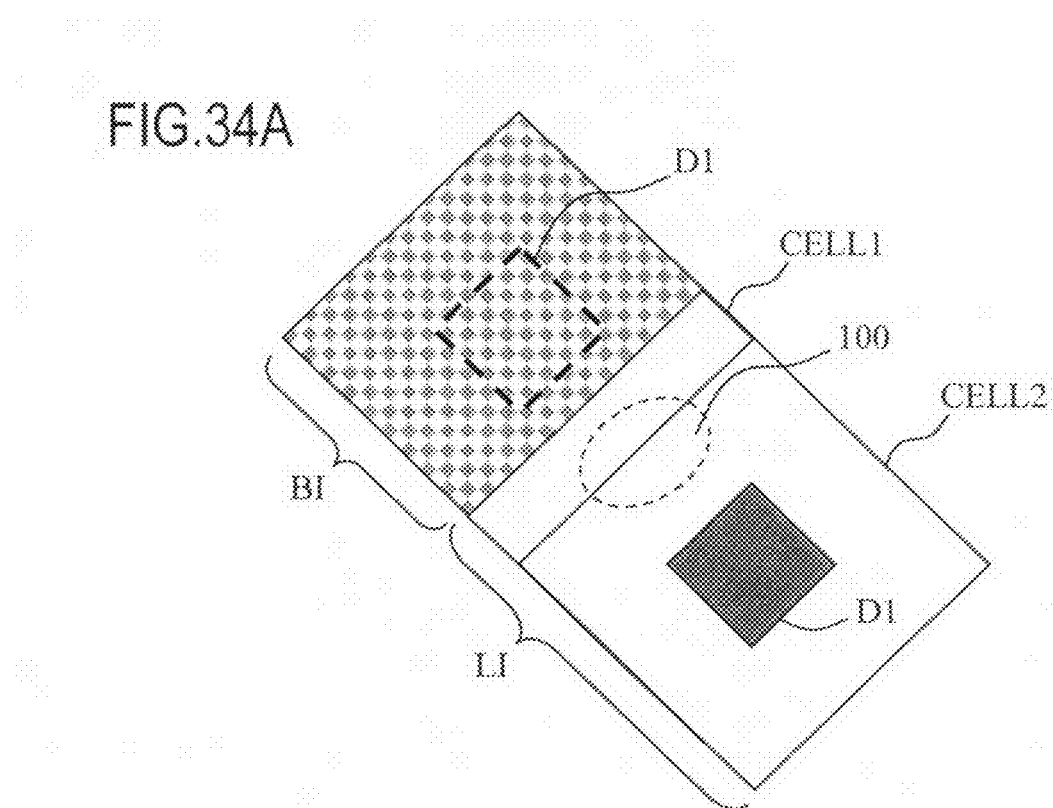
FIG. 34 shows a functional effect of the present embodiment on an example of a tint block image without a camouflage pattern.
Figure 34B:
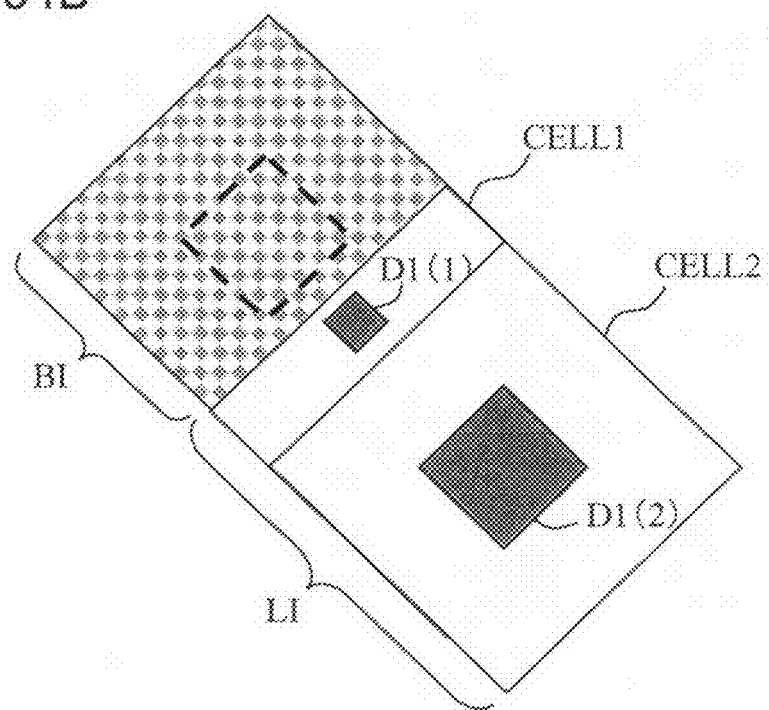

FIG. 34 shows an effect of the present embodiment on an example of a tint block image without a camouflage pattern. FIG. 34A is a tint block image generated by a general screen processing, and FIG. 34B is a tint block image generated by the screen processing of the present embodiment. In this example, the area of the background portion BI of the cell CELL 1 is larger than FIG. 33.

Therefore, in the case of the general processing in FIG. 34A, the background portion BI of the cell CELL 1 occupies the area where the large dot D1 is supposed to be generated, and the large dot of the latent image portion LI is not generated in the cell CELL 1. This means that a low density enhanced area 100 is formed in the boundary of the background portion BI and the latent image portion LI. In the case of the processing of the present embodiment in FIG. 34B, on the other hand, a relatively small dot D1 (1) is formed in the area of the latent image portion LI of the cell CELL 1. In other words, the low density enhanced area is not formed.

FIG. 35 shows an effect of the present embodiment on an example of a tint block image with a camouflage pattern. FIG. 35A is a tint block image generated by a general processing, and FIG. 35B is a tint block image generated by the processing of the present embodiment. In this example, the cells CELL 1, 2 and 3 are all latent image areas, and a camouflage pattern CAM, where dots are OFF, is positioned in a part of the cells CELL 1 and 2.

In the case of the general processing in FIG. 35A, a large dot D1 (1) is partially generated outside the camouflage pattern CAM in the cell CELL 1, no large dot is generated in the cell CELL 2, and a large dot D1 (3) is generated in the cell CELL 3. In other words, a low density enhanced area 102 is formed in the cells CELL 2 and 3.

In the case of the present embodiment in FIG. 35B, on the other hand, a relatively small dot D1 (1) is generated in a position outside the camouflage pattern CAM at a position away from the pattern in the cell CELL 1. In the cell CELL 2 as well, a relatively small dot D1 (2) is generated outside the camouflage pattern CAM. In this way, in the present embodiment in FIG. 35B, a dot is generated in a shifted position so that the center of the halftone dot of the latent image dither matrix corresponds to the center of gravity position in the latent image portion, therefore the dots D1 (1) and D1 (2) are generated, and the large dots D1 are generated so as to accurately reproduce the shape of the camouflage pattern CAM, where a low density enhanced area is not formed.

Figure 36A:
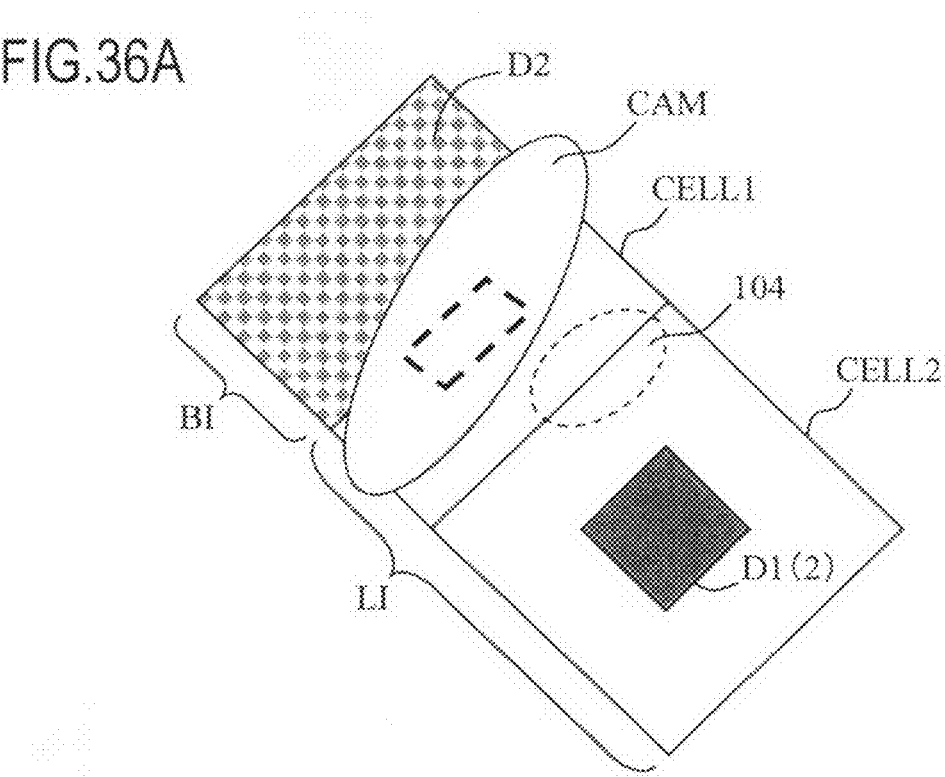
FIG. 36 shows a functional effect of the present embodiment on an example of a tint block image with a camouflage pattern.
Figure 36B:
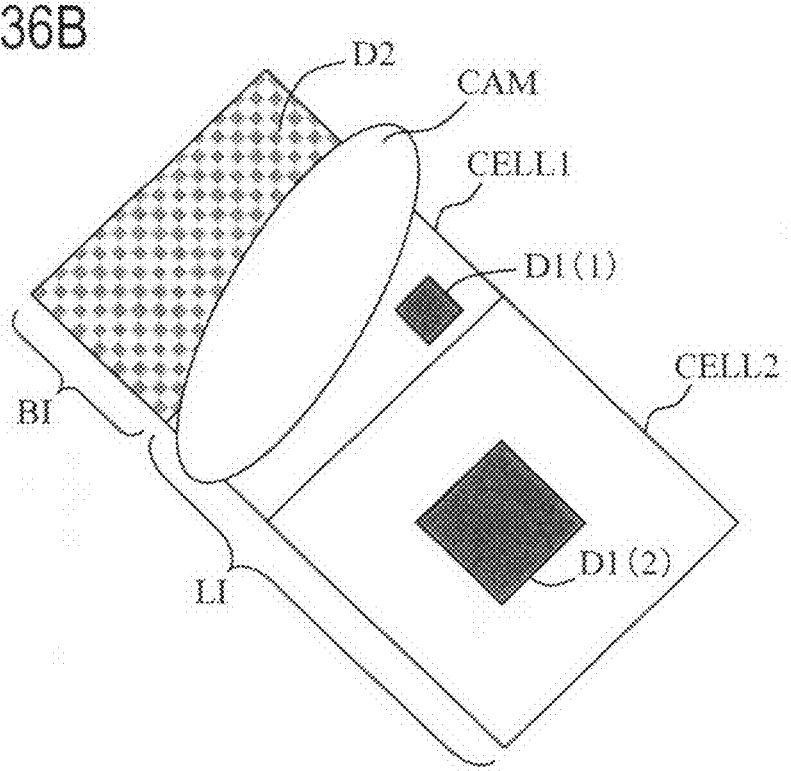

FIG. 36 shows an effect of the present embodiment on an example of a tint block image with a camouflage pattern. In this example, a boundary of the background portion BI and the latent image portion LI and a camouflage pattern CAM, where dots are OFF, are positioned in a cell CELL 1. In the case of general processing FIG. 35A, no large dot is formed in the cell CELL 1, since the camouflage pattern CAM occupies the area where a large dot is supposed to be generated (rectangular area indicated by a broken line), and a low density enhanced area 104 is formed. In the case of the processing of the present embodiment in FIG. 35B, on the other hand, a relatively small sized large dot D1 (1) is formed in the cell CELL 1. Therefore the low density enhanced area is not formed, and the camouflage pattern CAM is more accurately reproduced.

[Variant Form]

Figure 37:
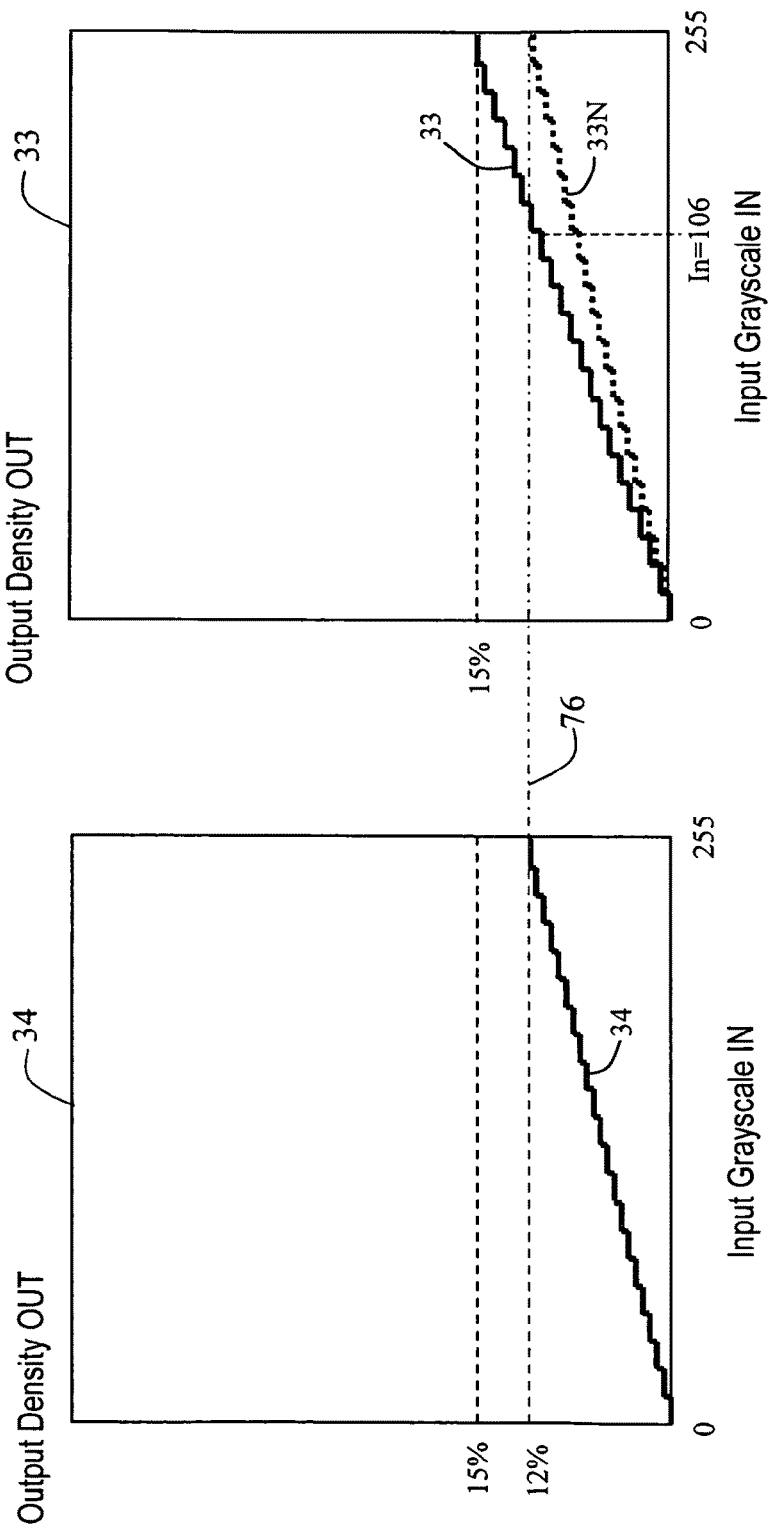
FIG. 37 shows the input/output density characteristics of a background portion dither matrix and a normalized latent image portion dither matrix according to a variant form of the present embodiment.

FIG. 37 shows the input/output density characteristics of the background portion dither matrix and the normalized latent image portion dither matrix according to a variant form of the present embodiment. In the above mentioned embodiment, the screen processing is performed referring to the normalized background portion dither matrix 34N shown in FIG. 21 and the latent image portion dither matrix 33 shown in FIG. 13. In the variant form in FIG. 37, the background portion dither matrix 34 is the same as FIG. 14, but the normalized latent image portion dither matrix 33N is used for the latent image portion dither matrix, so that the input grayscale value "170" for the output density (12%) becomes the maximum input grayscale value "255".

The following Expressions (6) and (7) are used for normalization.

$$\text{Normalization threshold} = (\text{threshold}/In) \times 254 \quad (1 \le \text{threshold} \le In) \qquad (6)$$

$$\text{Normalization threshold} = 255 (\text{if } In < \text{threshold}) \qquad (7)$$

In other words, the thresholds 1 to In (=170) in the latent image portion dither matrix 33 in FIG. 13 are converted into the normalized thresholds 1 to 254, and the thresholds In to 254 are converted into the normalized threshold "255". Thereby the image data, of which output density with respect to the grayscale value Ai is in a 0 to 12% range, is generated.

When the background portion dither matrix 34 and the normalized latent image portion dither matrix 33N in FIG. 37 are used, the input grayscale value In of the tint block image is set to In=255. In other words, the background portion and the latent image portion of the tint block image both become the output density 12%. As a result, the above Expression (1), when In=255, becomes Ai=(A/255)×In=A, and the grayscale value Ai of the camouflage pattern after correction becomes the same as the grayscale value A of the camouflage pattern before correction.

In other words, the step of computing the grayscale values of the corrected camouflage pattern (S3 in FIG. 9 and S21 in FIG. 19) is not required. And the grayscale value Ai of the camouflage pattern after correction becomes one of the maximum grayscales range 0 to 255. Therefore the multi-grayscale representation of the camouflage pattern can be fully utilized.

However, it is necessary that the output density characteristics with respect to the possible input grayscale value range 0 to 255 of the latent image portion dither matrix 33N and the background portion dither matrix 34 match, and the input grayscale value In of the latent image portion and the background portion of the tint block image are the input grayscale value "255", which is the maximum in the possible input grayscale value range of the latent image portion dither matrix and background portion dither matrix. In other words, if the latent image portion and background portion dither matrices are designed to be optimum output densities at the maximum input grayscale value In=255, as mentioned above, then the tint block image with a camouflage pattern can be generated by performing halftone processing, in which these dither matrices are referred to for the grayscale values (0 or 255) of the camouflage pattern according to the latent image mask pattern.

The normalized dither matrix 34N in FIG. 21 and the normalized dither matrix 33N in FIG. 37 to be used are generated based on the engine characteristics before shipment. If the output density characteristics of the engine change by age deterioration, it is preferable to normalize the dither matrices at an appropriate timing or when the tint block image is generated.

[Experiment Example of Tint Block Image]

Figure 38:
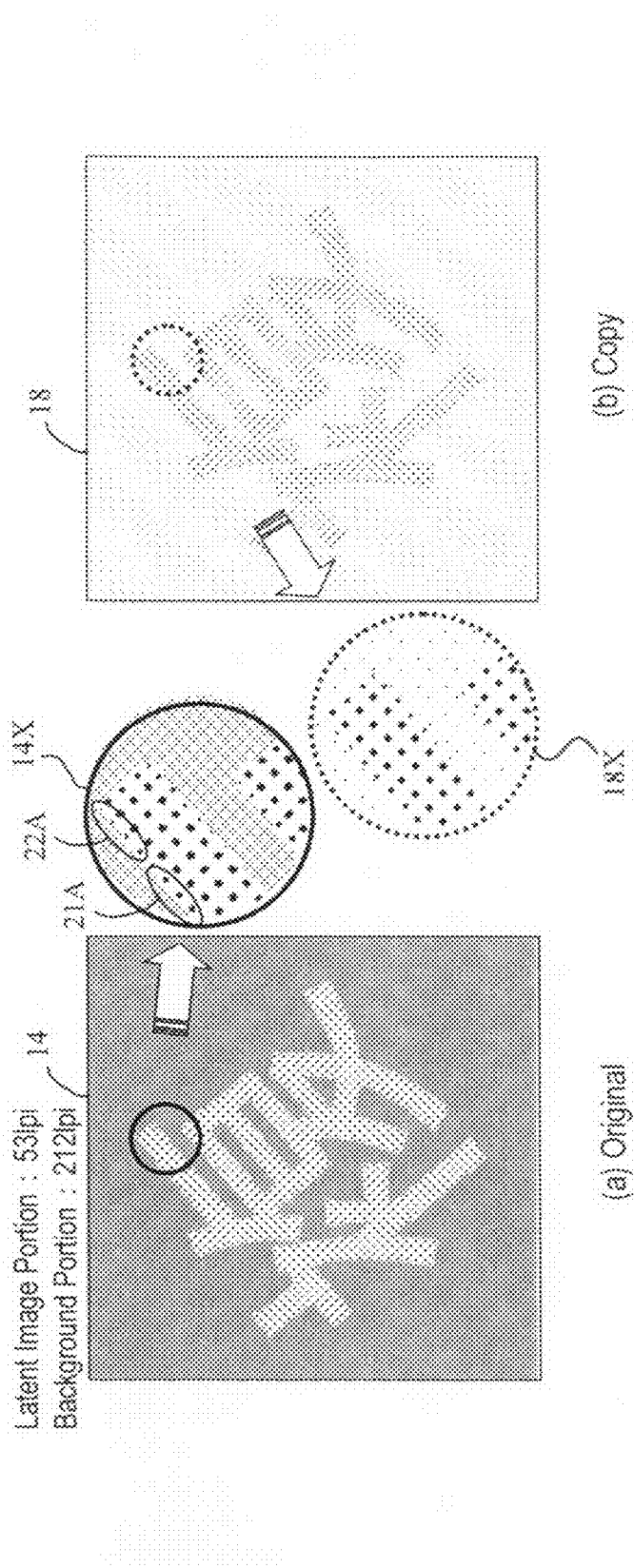
FIG. 38 shows an experiment example of a tint block image generated by the screen processing of the present embodiment.
Figure 39:
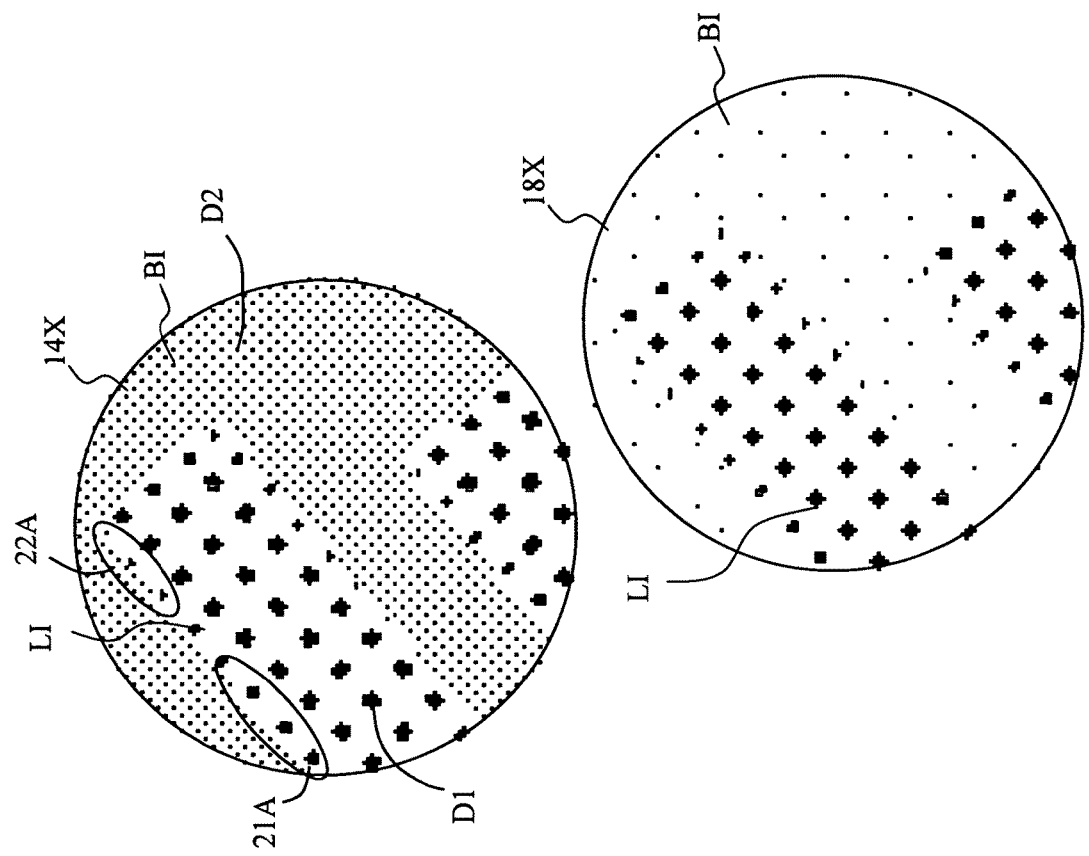
FIG. 39 are enlarged views of FIG. 38.

FIG. 38 shows an experiment example of the tint block image generated by the screen processing of the present embodiment. FIG. 39 are enlarged views thereof. This experiment example is a tint block image without a camouflage pattern. An original 14 and a copy 18 thereof are shown. Particularly, as the original 14 and the enlarged view 14X thereof show, a high density enhanced area due to combining of dots or a low density enhanced area due to no dots being generated in the latent image portion are not generated in the boundary areas 21A and 22A of the background portion BI and the latent image portion LI. The comparison with FIG. 4 and FIG. 6 clearly shows the degree of improvement. In other words, the concealment capability for the latent image "COPY" in the original can be kept high.

Figure 6:
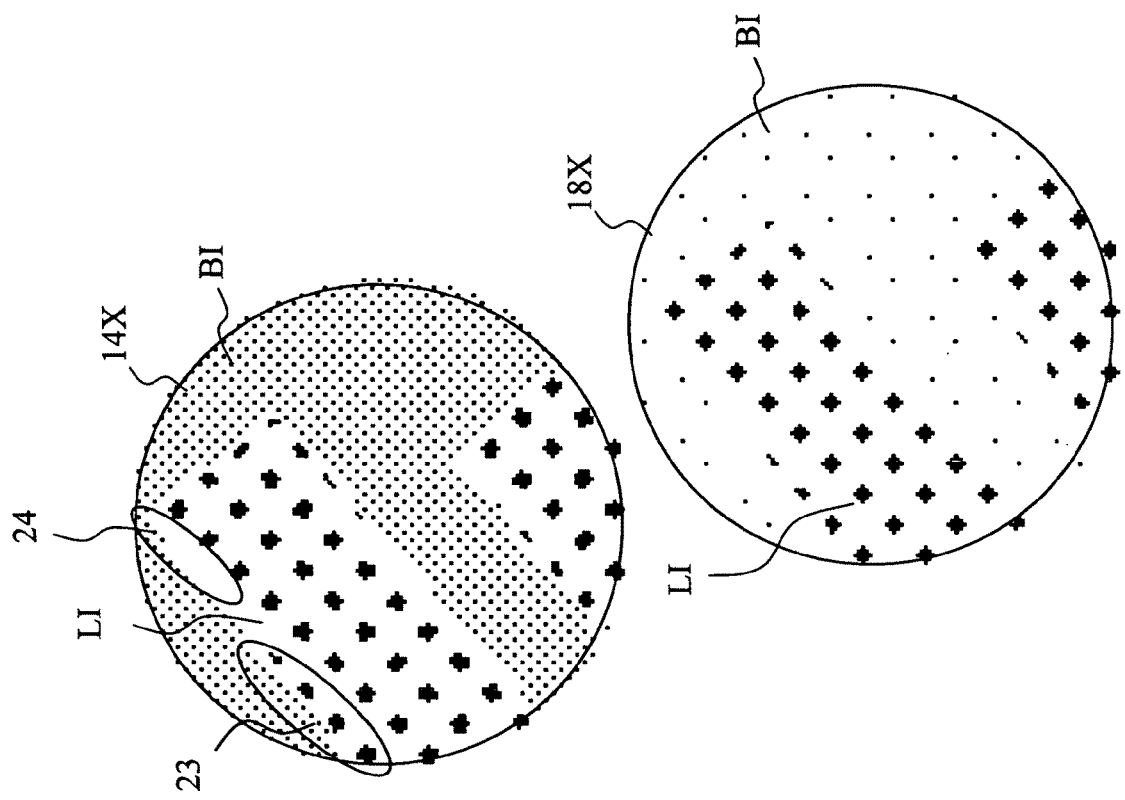
FIG. 6 are enlarged views of FIG. 5.
Figure 40B:
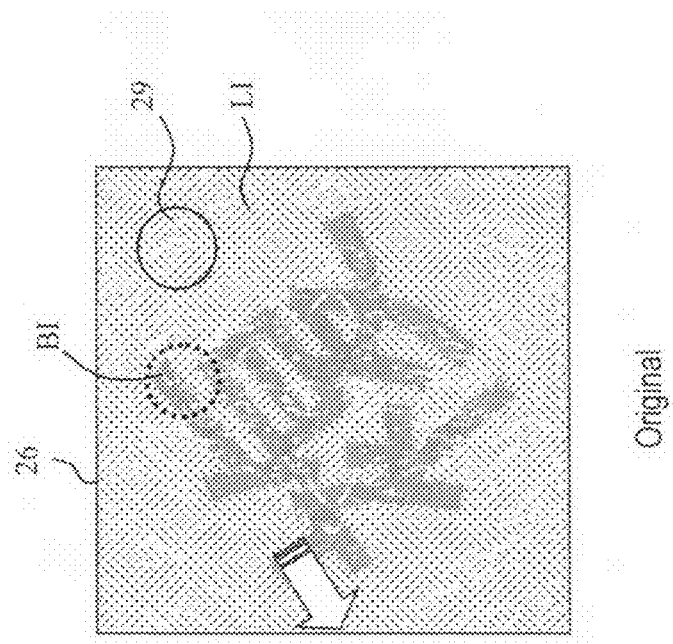
FIG. 40 shows an experiment example of a tint block image generated by the screen processing of the present embodiment.
Figure 40A:
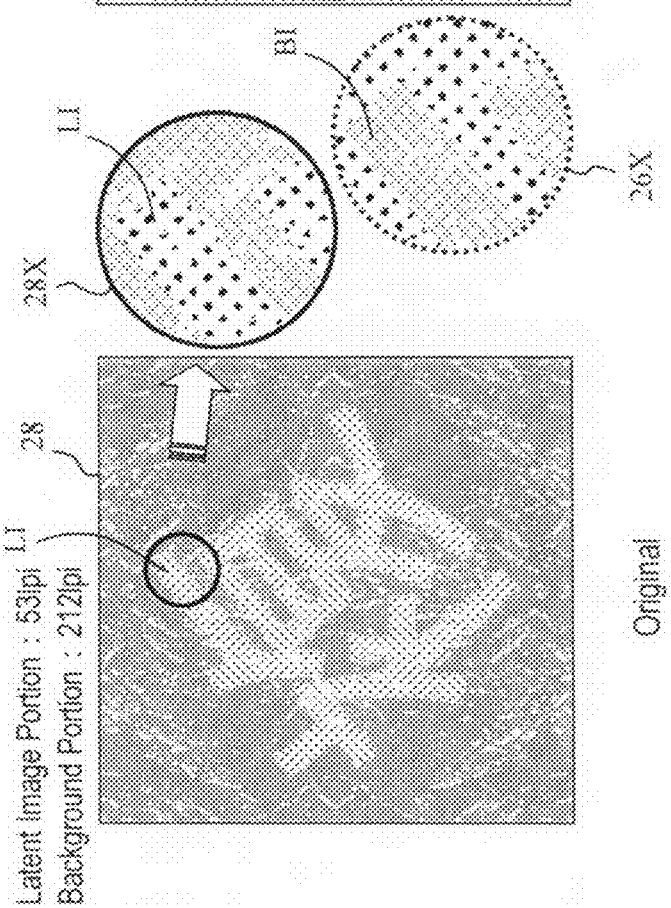

FIGS. 40A, 40B show an experiment example of a tint block image generated by the screen processing of the present embodiment. This experiment example shows tint block images when the camouflage pattern 25 in FIG. 6 is used, and both show original tint block images. The tint block image 28 in FIG. 40A shows an example when the mask pattern of the latent image "COPY" becomes the latent image portion LI, and the tint block image 26 in FIG. 40B shows an example when the mask pattern of the latent image "COPY" becomes the background image portion BI. The tint block image 26 corresponds to the tint block image 26 in FIG. 7B.

As the comparison of the tint block image 26 in FIG. 40B and the tint block image 26 in FIG. 7B shows, the generation of the low density area due to missing dots in the area 29 of the latent image portion LI is suppressed in the tint block image 26 in FIG. 40B.

According to the present embodiment, combining of dots or missing of dots in the boundary of the background portion and latent image portion of the original can be prevented, and concealment capability for the latent image can be increased. Also a camouflage pattern with high resolution can be more accurately reproduced.

[Second Embodiment]

Now a second embodiment, applying the present invention to an image other than the tint block image, will be described. In the above embodiment, the tint block having the latent image portion and the background portion was described. The present invention, however, can also be applied to a general image where 2 areas, in which a screen processing using an AM screen with low screen ruling and a screen processing using an AM screen or an FM screen based on an error diffusion method or dispersed dither matrix, with a screen ruling are performed respectively.

Figure 42:
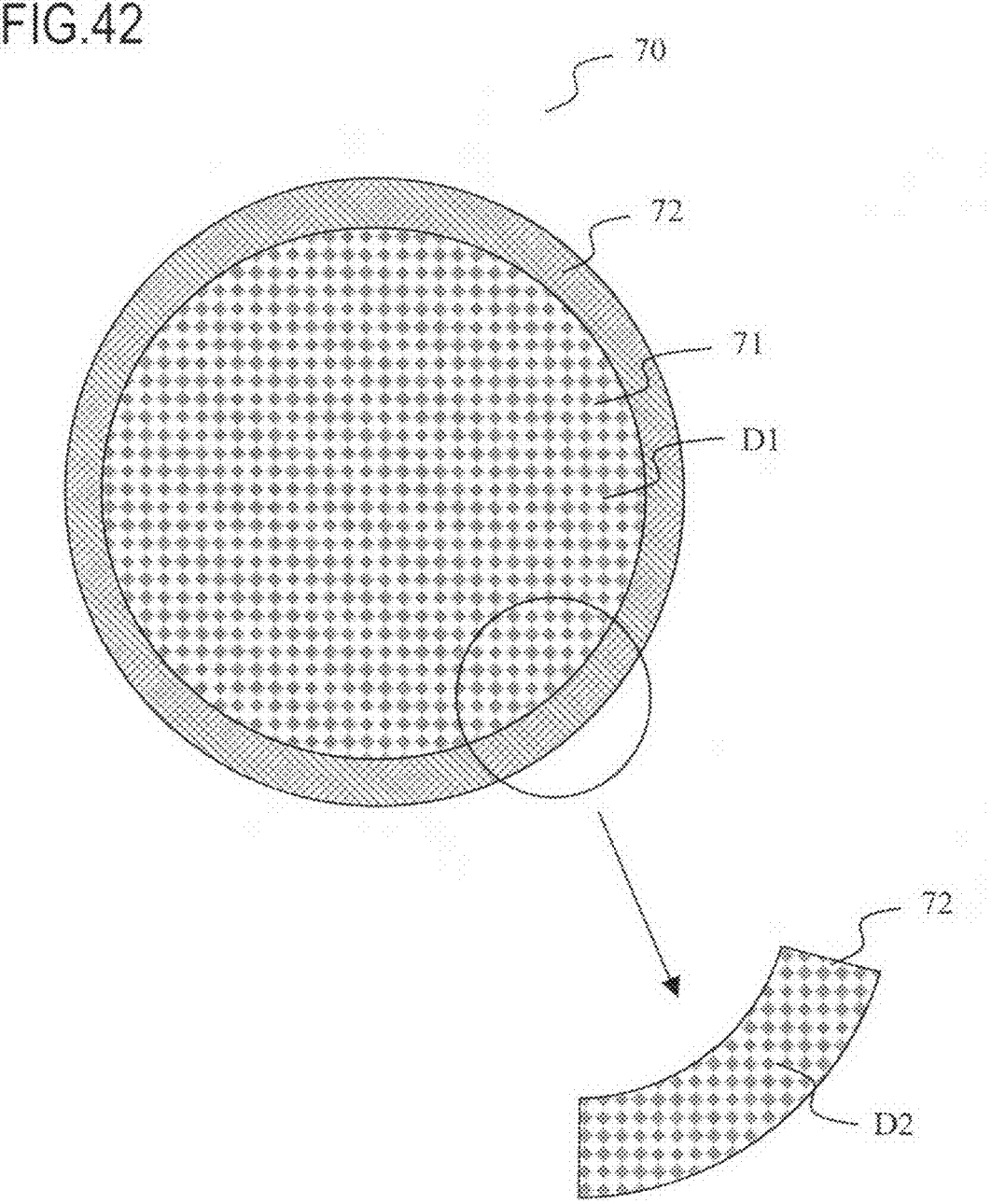
FIG. 42 shows an image example according to the second embodiment.

FIG. 41 is a flow chart depicting an image data generation procedure according to the second embodiment. FIG. 42 shows an image example according to the second embodiment. The image data generation procedure in FIG. 41 will be described with reference to FIG. 42.

First the image data generation program is executed on the host computer to generate image data (S61). As FIG. 42 shows, this image is comprised of a circular first image 71, where screen processing using an AM screen with low screen ruling is performed, and a second concentric image 72, where screen processing using an AM screen or an FM screen based on an error diffusion method or dispersed dither matrix, with a screen ruling is performed. In the case of the example in FIG. 42, the outer circumference of the circular first image 71 is the second image 72. For example, the inner part of the circle is the first image 71, where importance is placed on grayscale representation, and the edge of the circle is the second image 72 of which resolution is high. Therefore the generated image data has a mask pattern 60 for distinguishing whether each pixel is the first image 71 or the second image 72, and grayscale value data 61 which has the grayscale values of each pixel. The mask pattern 60 is comprised of 1 bit for each pixel. The grayscale data 61 is comprised of 8 bits for each pixel R, G and B, totaling 24 bits.

The image data generation program of the host computer performs a first screen processing for the first image 71, using a first screen 133, such as an AM screen with low screen ruling. The image data generation program performs a second screen processing for the second image 72, using a second screen 134, such as an AM screen or an FM screen based on an error diffusion method or dispersed dither matrix, with a screen ruling higher than the first screen 133. As a result, large dots D1, of which screen ruling is low, are formed in the area of the first image 71, and small dots D2, of which screen ruling is high, are formed in the area of the second image 72, as shown in the enlarged view in FIG. 42.

In the second embodiment, it is preferable that the first screen 133 and the second screen 134 have the same output density characteristics with respect to a same input grayscale value. If the generated images are all low density images, the first and second screens can be the dither matrices 133-1 and 134-1, having low output density areas for all the input grayscale values, as mentioned above. If the generated images include images widely distributed over minimum density to maximum density, then the first and second screens can be dither matrices 133-2 and 134-2, which can change the density from a minimum output density to a maximum output density for all the input grayscale values.

In the second embodiment as well, the screen processing described in FIG. 19 and FIG. 20 is used. In other words, the second screen processing (S25, S26, S27 and S28) is performed for the pixels of the second image 72 at first for each cell, then the first screen processing (S30 to S39) is performed for the remaining pixels in the first image 71. By performing screen processing in this way, the high density enhancement due to dot combining and low density enhancement due to dots not being generated are suppressed in the boundary of the first and second images 71 and 72, and image quality can be improved.

As described above, the present invention can be applied not only to a tint block image, but also to general images. In this case, the center of gravity position, average input grayscale value and ideal dot count are determined for the pixels of the first image 71, for each cell, and the center of a halftone dot in the dither matrix 33 is shifted to the center of gravity position of the first image, and then screen processing is performed, so the image quality can be improved.

What is claimed is:

1. A non-transitory computer-readable medium which stores a tint block image generation program for causing a computer to execute a tint block image generation step of generating tint block image data which forms, on a print medium, a tint block image including a latent image portion and a background portion, having different output densities to be reproduced by copying, wherein the tint block image generation step comprises:

a first screen processing step of generating latent image portion image data by an area modulation screen having a first screen ruling, for pixels of the latent image portion; and a second screen processing step of generating background portion image data by an area modulation screen or a density modulation screen having a second screen ruling which is higher than the first screen ruling, for pixels of the background portion, and wherein in the first screen processing step, the latent image portion image data is generated to form a halftone dot at a center of gravity position of an image of the latent image portion in a cell corresponding to a halftone dot formation area in the area modulation screen, when the image of the latent image portion and the image of the background portion exist in the cell.

2. The non-transitory computer-readable medium which stores the tint block image generation program according to claim 1, wherein the halftone dot formed in the first screen processing step has a size corresponding to grayscale values of the latent image portion in the cell as the upper limit.

3. The non-transitory computer-readable medium which stores the tint block image generation program according to claim 1, wherein the first screen processing step further comprises:

a center of gravity position generation step of determining a center of gravity position of the image in the latent image portion in the cell;

an average input grayscale value generation step of determining an average input grayscale value by dividing the total of grayscale values of the image in the latent portion in the cell by a number of pixels in the cell;

an ideal output dot count generation step of determining, as an ideal output dot count, a number of dots generated when an image in which all the pixels have the average input grayscale value is screen-processed using the area modulation screen; and a halftone dot generation step of generating a halftone dot having a size of which upper limit is the ideal output dot count at the center of gravity position.

4. The non-transitory computer-readable medium which stores the tint block image generation program according to claim 1, wherein the area modulation screen having the first screen ruling is a dot clustered dither matrix, and the latent image portion image data is image data for forming a halftone dot having a size corresponding to the input grayscale values of the latent image portion, and the area modulation screen having the second screen ruling is a dot dispersed dither matrix, and the background portion image data is image data for forming a halftone dot which has a density corresponding to the input grayscale values of the background portion and is smaller than the halftone dot of the latent image portion image data.

5. The non-transitory computer-readable medium which stores the tint block image generation program according to claim 1, wherein the tint block image is combined with a camouflage pattern in the latent image portion and background portion of the tint block image, the tint block image generation program further comprises a step of generating a corrected camouflage pattern grayscale value by correcting the grayscale value of the camouflage pattern according to the input grayscale values of the latent image portion and background portion, in the first screen processing step, the latent image portion image data is generated referring to the dither matrix of the area modulation screen having the first screen ruling, for the corrected camouflage pattern grayscale value, and in the second screen processing step, the background portion image data is generated referring to the dither matrix of the area modulation screen having the second screen ruling, for the corrected camouflage pattern grayscale value.

6. The non-transitory computer-readable medium which stores the tint block image generation program according to claim 5, wherein
the latent image portion and background portion are assigned with the same input grayscale values, and
the area modulation screen having the first screen ruling and the area modulation screen having the second screen ruling have the same output density characteristics in a possible range of input grayscale values.

7. The non-transitory computer-readable medium which stores the tint block image generation program according to claim 1, wherein the first screen processing step further comprises:
a center of gravity position generation step of determining a center of gravity position of the image in the latent image portion in the cell; and
a halftone dot generation step of generating a halftone dot having a size corresponding to a grayscale value which is determined by correcting a grayscale value of a pixel of the latent image portion in the cell based on a ratio of a size of the latent image portion in the cell and a size of the cell, at the center of gravity position.

8. A non-transitory computer-readable medium which stores an image generation program for causing a computer to execute an image generation step of generating image data for forming, on a print medium, an image including a first image portion and a second image portion, wherein the image generation step comprises:
a first screen processing step of generating image data by an area modulation screen having a first screen ruling, for pixels of the first image portion; and
a second screen processing step of generating image data by an area modulation screen or a density modulation screen having a second screen ruling which is higher than the first screen ruling, for pixels of the second image portion, wherein
in the first screen processing step, a halftone dot is generated at a center of gravity position of an image of the first image portion in a cell corresponding to a halftone dot formation area in the area modulation screen processing, when the image of the first image portion and the image of the second image portion exist in the cell.

9. The non-transitory computer-readable medium which stores the tint block image generation program according to claim 8, wherein the first screen processing step further comprises:
a center of gravity position generation step of determining a center of gravity position of the image in the first image portion in the cell; and
a halftone dot generation step of generating a halftone dot having a size corresponding to a grayscale value which is determined by correcting a grayscale value of a pixel of the first image portion in the cell based on a ratio of a size of the first image portion in the cell and a size of the cell, at the center of gravity position.

10. The tint block image generation device according to claim 9, wherein the first screen processing unit determines a center of gravity position of the image in the first image portion in the cell, and generates a halftone dot having a size corresponding to a grayscale value which is determined by correcting a grayscale value of a pixel of the first image portion in the cell based on a ratio of a size of the first image portion in the cell and a size of the cell, at the center of gravity position.

11. A tint block image generation device that generates, on a print medium, a tint block image including a latent image portion and a background portion having different output densities to be reproduced by copying, comprising:
a first screen processing unit which generates latent image portion image data by an area modulation screen having a first screen ruling, for pixels of the latent image portion; and
a second screen processing unit which generates background portion image data by an area modulation screen or a density modulation screen having a second screen ruling which is higher than the first screen ruling, for pixels of the background portion, wherein
the first screen processing unit generates the latent image portion image data for forming a halftone dot at a center of gravity position of an image of the latent image portion in a cell corresponding to a halftone dot formation area in the area modulation screen, when the image of the latent image portion and the image of the background portion exist in the cell.

12. The tint block image generation device according to claim 11, wherein the first screen processing unit determines a center of gravity position of the image in the latent image portion in the cell, and generates a halftone dot having a size corresponding to a grayscale value which is determined by correcting a grayscale value of a pixel of the latent image portion in the cell based on a ratio of a size of the latent image portion in the cell and a size of the cell, at the center of gravity position.

13. An image generation device that generates, on a print medium, an image including a first image portion and a second image portion, comprising:
a first screen processing unit which generates image data by an area modulation screen having a first screen ruling, for pixels of the first image portion; and
a second screen processing unit which generates image data by an area modulation screen or a density modulation screen having a second screen ruling which is higher than the first screen ruling for pixels of the second image portion, wherein
the first screen processing unit generates a halftone dot at a center of gravity position of an image of the first image portion in a cell corresponding to a halftone dot formation area in the area modulation screen processing, when the image of the first image portion and the image of the second image portion exist in the cell.

* * * * *